US008639694B1

(12) United States Patent
Wolfe

(10) Patent No.: US 8,639,694 B1
(45) Date of Patent: *Jan. 28, 2014

(54) CLIENT-SIDE PROCESSING OF PRELOAD OPERATIONS

(75) Inventor: Mark A. Wolfe, Woodbury, MN (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,504

(22) Filed: May 23, 2012

Related U.S. Application Data

(63) Continuation of application No. 12/182,124, filed on Jul. 29, 2008, now Pat. No. 8,224,801, which is a continuation of application No. 11/469,953, filed on Sep. 5, 2006, now Pat. No. 7,467,137, which is a continuation of application No. 10/611,077, filed on Jul. 1, 2003, now Pat. No. 7,103,594, which is a continuation of application No. 09/974,242, filed on Oct. 9, 2001, now Pat. No. 6,604,103, which is a continuation of application No. 09/620,651, filed on Jul. 20, 2000, now abandoned, which is a continuation of application No. 09/083,382, filed on May 22, 1998, now abandoned.

(60) Provisional application No. 60/047,554, filed on May 22, 1997.

(51) Int. Cl.
*G06F 17/30* (2006.01)

(52) U.S. Cl.
USPC ........... 707/736; 707/706; 709/203; 709/219; 711/118

(58) Field of Classification Search
USPC ................... 707/706, 736, E17.108, 999.003, 707/999.01, 999.107; 709/203, 219; 711/3, 711/118–144
See application file for complete search history.

(56) References Cited

U.S. PATENT DOCUMENTS

| | | |
|---|---|---|
| 4,722,005 A | 1/1988 | Ledenbach |
| 4,723,211 A | 2/1988 | Barker et al. |
| 4,730,252 A | 3/1988 | Bradshaw |
| 4,737,912 A | 4/1988 | Ichikawa |
| 4,760,606 A | 7/1988 | Lesnick et al. |
| 4,815,029 A | 3/1989 | Barker et al. |
| 4,839,853 A | 6/1989 | Deerwester et al. |
| 4,855,725 A | 8/1989 | Fernandez |
| 4,860,197 A | 8/1989 | Langendorf et al. |
| 4,899,292 A | 2/1990 | Montagna et al. |
| 4,931,935 A | 6/1990 | Ohira et al. |
| 4,943,908 A | 7/1990 | Emma et al. |
| 4,945,476 A | 7/1990 | Bodick et al. |
| 4,954,969 A | 9/1990 | Tsumura |
| 4,980,823 A | 12/1990 | Liu |
| 4,982,344 A | 1/1991 | Jordan |

(Continued)

OTHER PUBLICATIONS

U.S. Appl. No. 09/784,469, filed Feb. 16, 2001 (inventor: Mark Wolfe).

(Continued)

*Primary Examiner* — Leslie Wong
(74) *Attorney, Agent, or Firm* — Lerner, David, Littenberg, Krumholz & Mentlik, LLP

(57) ABSTRACT

An improved information retrieval system. In response to detecting that the user has interacted with a display element in a first web page browser window, retrieving information from a second web page before the user requests that the second web page be displayed within the web browser window. Other enhanced information retrieval techniques.

30 Claims, 43 Drawing Sheets

(56) References Cited

U.S. PATENT DOCUMENTS

| | | |
|---|---|---|
| 4,996,642 A | 2/1991 | Hey |
| 5,014,327 A | 5/1991 | Potter et al. |
| 5,021,989 A | 6/1991 | Fujisawa et al. |
| 5,057,915 A | 10/1991 | Von Kohorn |
| 5,062,074 A | 10/1991 | Kleinberger |
| 5,122,951 A | 6/1992 | Kamiya |
| 5,123,088 A | 6/1992 | Kasahara et al. |
| 5,157,783 A | 10/1992 | Anderson et al. |
| 5,206,949 A | 4/1993 | Cochran et al. |
| 5,208,745 A | 5/1993 | Quentin et al. |
| 5,220,648 A | 6/1993 | Sato |
| 5,224,206 A | 6/1993 | Simoudis |
| 5,235,680 A | 8/1993 | Bijnagte |
| 5,239,644 A | 8/1993 | Seki et al. |
| 5,241,671 A | 8/1993 | Reed et al. |
| 5,243,149 A | 9/1993 | Comerford et al. |
| 5,253,337 A | 10/1993 | Hirose |
| 5,255,386 A | 10/1993 | Prager |
| 5,257,186 A | 10/1993 | Ukita et al. |
| 5,257,367 A | 10/1993 | Goodlander et al. |
| 5,261,071 A | 11/1993 | Lyon |
| 5,265,065 A | 11/1993 | Turtle |
| 5,289,569 A | 2/1994 | Taniguchi |
| 5,295,243 A | 3/1994 | Robertson et al. |
| 5,301,109 A | 4/1994 | Landauer et al. |
| 5,305,389 A | 4/1994 | Palmer |
| 5,311,591 A | 5/1994 | Fischer |
| 5,325,298 A | 6/1994 | Gallant |
| 5,341,293 A | 8/1994 | Vertelney et al. |
| 5,345,551 A | 9/1994 | Shelley et al. |
| 5,347,632 A | 9/1994 | Filepp et al. |
| 5,390,281 A | 2/1995 | Luciw et al. |
| 5,392,387 A | 2/1995 | Fitzpatrick et al. |
| 5,404,442 A | 4/1995 | Foster et al. |
| 5,408,655 A | 4/1995 | Oren et al. |
| 5,414,811 A | 5/1995 | Parulski et al. |
| 5,418,948 A | 5/1995 | Turtle |
| 5,421,008 A | 5/1995 | Banning et al. |
| 5,444,615 A | 8/1995 | Bennett et al. |
| 5,444,823 A | 8/1995 | Nguyen |
| 5,448,262 A | 9/1995 | Lee et al. |
| 5,471,575 A | 11/1995 | Giansante |
| 5,471,619 A | 11/1995 | Messina |
| 5,485,575 A | 1/1996 | Chess et al. |
| 5,485,609 A | 1/1996 | Vitter et al. |
| 5,495,581 A | 2/1996 | Tsai |
| 5,511,160 A | 4/1996 | Robson |
| 5,523,945 A | 6/1996 | Satoh et al. |
| 5,524,193 A | 6/1996 | Covington et al. |
| 5,526,520 A | 6/1996 | Krause |
| 5,535,422 A | 7/1996 | Chiang et al. |
| 5,544,342 A * | 8/1996 | Dean .................. 711/119 |
| 5,544,352 A | 8/1996 | Egger |
| 5,572,643 A | 11/1996 | Judson |
| 5,590,360 A | 12/1996 | Edwards |
| 5,597,307 A | 1/1997 | Redford et al. |
| 5,617,526 A | 4/1997 | Oran et al. |
| 5,619,247 A | 4/1997 | Russo |
| 5,623,589 A | 4/1997 | Needham et al. |
| 5,623,679 A | 4/1997 | Rivette et al. |
| 5,625,781 A | 4/1997 | Cline et al. |
| 5,627,994 A | 5/1997 | Levy et al. |
| 5,630,066 A | 5/1997 | Gosling |
| 5,631,825 A | 5/1997 | van Weele et al. |
| 5,632,022 A | 5/1997 | Warren et al. |
| 5,644,686 A | 7/1997 | Hekmatpour |
| 5,649,139 A | 7/1997 | Weinreb et al. |
| 5,664,109 A | 9/1997 | Johnson et al. |
| 5,675,788 A | 10/1997 | Husick et al. |
| 5,692,107 A | 11/1997 | Simoudis et al. |
| 5,694,594 A | 12/1997 | Chang |
| 5,696,965 A | 12/1997 | Dedrick |
| 5,699,528 A * | 12/1997 | Hogan ..................... 705/40 |
| 5,706,452 A | 1/1998 | Ivanov |
| 5,706,493 A | 1/1998 | Sheppard, II |
| 5,706,507 A | 1/1998 | Schloss |
| 5,714,971 A | 2/1998 | Shalit et al. |
| 5,715,445 A | 2/1998 | Wolfe |
| 5,715,453 A | 2/1998 | Stewart |
| 5,717,914 A | 2/1998 | Husick et al. |
| 5,721,827 A | 2/1998 | Logan et al. |
| 5,721,902 A | 2/1998 | Schultz |
| 5,727,129 A * | 3/1998 | Barrett et al. ................... 706/10 |
| 5,729,594 A | 3/1998 | Klingman |
| 5,732,216 A | 3/1998 | Logan et al. |
| 5,737,619 A | 4/1998 | Judson |
| 5,737,734 A | 4/1998 | Schultz |
| 5,740,549 A | 4/1998 | Reilly et al. |
| 5,742,284 A | 4/1998 | Duggan et al. |
| 5,742,768 A | 4/1998 | Gennaro et al. |
| 5,742,816 A | 4/1998 | Barr et al. |
| 5,752,238 A | 5/1998 | Dedrick |
| 5,754,766 A | 5/1998 | Shaw et al. |
| 5,754,939 A | 5/1998 | Herz et al. |
| 5,758,154 A | 5/1998 | Qureshi |
| 5,758,257 A | 5/1998 | Herz et al. |
| 5,765,138 A | 6/1998 | Aycock et al. |
| 5,768,578 A | 6/1998 | Kirk et al. |
| 5,774,670 A | 6/1998 | Montulli |
| 5,778,372 A | 7/1998 | Cordell et al. |
| 5,778,398 A | 7/1998 | Nagashima et al. |
| 5,781,189 A | 7/1998 | Holleran et al. |
| 5,781,894 A | 7/1998 | Petrecca et al. |
| 5,784,619 A | 7/1998 | Evans et al. |
| 5,794,229 A | 8/1998 | French et al. |
| 5,796,393 A | 8/1998 | MacNaughton et al. |
| 5,796,952 A | 8/1998 | Davis et al. |
| 5,801,702 A | 9/1998 | Dolan et al. |
| 5,802,292 A | 9/1998 | Mogul |
| 5,802,299 A | 9/1998 | Logan et al. |
| 5,806,077 A | 9/1998 | Wecker |
| 5,808,611 A | 9/1998 | Johnson et al. |
| 5,809,242 A | 9/1998 | Shaw et al. |
| 5,813,007 A | 9/1998 | Nielsen |
| 5,815,830 A | 9/1998 | Anthony |
| 5,819,092 A | 10/1998 | Ferguson et al. |
| 5,822,537 A | 10/1998 | Katseff et al. |
| 5,822,539 A | 10/1998 | van Hoff |
| 5,822,731 A | 10/1998 | Schultz |
| 5,823,879 A | 10/1998 | Goldberg et al. |
| 5,826,025 A | 10/1998 | Gramlich |
| 5,826,261 A | 10/1998 | Spencer |
| 5,826,267 A | 10/1998 | McMillan |
| 5,826,269 A | 10/1998 | Hussey |
| 5,835,087 A | 11/1998 | Herz et al. |
| 5,835,922 A | 11/1998 | Shima et al. |
| 5,848,424 A | 12/1998 | Scheinkman et al. |
| 5,860,074 A | 1/1999 | Rowe et al. |
| 5,862,325 A | 1/1999 | Reed et al. |
| 5,864,850 A | 1/1999 | Nordman |
| 5,870,552 A | 2/1999 | Dozier et al. |
| 5,870,770 A | 2/1999 | Wolfe |
| 5,873,076 A | 2/1999 | Barr et al. |
| 5,877,760 A | 3/1999 | Onda et al. |
| 5,878,421 A | 3/1999 | Ferrel et al. |
| 5,890,164 A | 3/1999 | Nielsen |
| 5,890,172 A | 3/1999 | Borman et al. |
| 5,892,904 A | 4/1999 | Atkinson et al. |
| 5,893,914 A | 4/1999 | Clapp |
| 5,894,554 A | 4/1999 | Lowery et al. |
| 5,901,287 A * | 5/1999 | Bull et al. ..................... 709/218 |
| 5,903,317 A | 5/1999 | Sharir et al. |
| 5,905,492 A | 5/1999 | Straub et al. |
| 5,913,040 A | 6/1999 | Rakavy et al. |
| 5,915,256 A | 6/1999 | Rogers et al. |
| 5,918,014 A | 6/1999 | Robinson |
| 5,933,604 A | 8/1999 | Inakoshi |
| 5,933,811 A | 8/1999 | Angles et al. |
| 5,933,827 A | 8/1999 | Cole et al. |
| 5,937,163 A * | 8/1999 | Lee et al. ..................... 709/218 |
| 5,946,682 A | 8/1999 | Wolfe |
| 5,948,040 A | 9/1999 | DeLorme et al. |
| 5,948,061 A | 9/1999 | Merriman et al. |
| 5,950,173 A | 9/1999 | Perkowski |

(56) References Cited

U.S. PATENT DOCUMENTS

| | | | |
|---|---|---|---|
| 5,951,620 A | 9/1999 | Ahrens et al. | |
| 5,953,005 A | 9/1999 | Liu | |
| 5,956,716 A | 9/1999 | Kenner et al. | |
| 5,959,621 A | 9/1999 | Nawaz et al. | |
| 5,959,623 A | 9/1999 | van Hoff et al. | |
| 5,959,632 A | 9/1999 | Hashimoto et al. | |
| 5,960,409 A | 9/1999 | Wexler | |
| 5,963,205 A | 10/1999 | Sotomayor | |
| 5,970,472 A | 10/1999 | Allsop et al. | |
| 5,973,692 A | 10/1999 | Knowlton et al. | |
| RE36,422 E | 11/1999 | Pazel | |
| 5,978,841 A * | 11/1999 | Berger | 709/217 |
| 5,987,611 A | 11/1999 | Freund | |
| 5,995,976 A | 11/1999 | Walker et al. | |
| 6,002,402 A | 12/1999 | Schacher | |
| 6,006,252 A | 12/1999 | Wolfe | |
| 6,011,537 A | 1/2000 | Slotznick | |
| 6,012,053 A | 1/2000 | Pant et al. | |
| 6,012,071 A | 1/2000 | Krishna et al. | |
| 6,023,698 A | 2/2000 | Lavey, Jr. et al. | |
| 6,023,726 A | 2/2000 | Saksena | |
| 6,029,175 A | 2/2000 | Chow et al. | |
| 6,031,904 A | 2/2000 | An et al. | |
| 6,034,680 A | 3/2000 | Kessenich et al. | |
| 6,038,601 A | 3/2000 | Lambert et al. | |
| 6,049,831 A | 4/2000 | Gardell et al. | |
| 6,055,570 A | 4/2000 | Nielsen | |
| 6,061,057 A | 5/2000 | Knowlton | |
| 6,088,032 A | 7/2000 | Mackinlay | |
| 6,088,717 A | 7/2000 | Reed et al. | |
| 6,094,675 A | 7/2000 | Sunaga et al. | |
| 6,098,096 A * | 8/2000 | Tsirigotis et al. | 709/213 |
| 6,119,101 A | 9/2000 | Peckover | |
| 6,125,384 A | 9/2000 | Brandt et al. | |
| 6,138,128 A | 10/2000 | Perkowitz et al. | |
| 6,144,962 A | 11/2000 | Weinberg et al. | |
| 6,151,021 A | 11/2000 | Berquist et al. | |
| 6,151,603 A | 11/2000 | Wolfe | |
| 6,151,643 A | 11/2000 | Cheng et al. | |
| 6,152,369 A * | 11/2000 | Wilz et al. | 235/462.01 |
| 6,182,068 B1 | 1/2001 | Culliss | |
| 6,182,072 B1 | 1/2001 | Leak et al. | |
| 6,182,122 B1 * | 1/2001 | Berstis | 709/217 |
| 6,183,366 B1 | 2/2001 | Goldberg et al. | |
| 6,185,625 B1 * | 2/2001 | Tso et al. | 709/247 |
| 6,199,076 B1 | 3/2001 | Logan et al. | |
| 6,216,141 B1 | 4/2001 | Straub et al. | |
| 6,226,655 B1 | 5/2001 | Borman et al. | |
| 6,253,188 B1 | 6/2001 | Witek et al. | |
| 6,263,351 B1 | 7/2001 | Wolfe | |
| 6,263,505 B1 | 7/2001 | Walker et al. | |
| 6,264,560 B1 | 7/2001 | Goldberg et al. | |
| 6,275,989 B1 * | 8/2001 | Broadwin et al. | 725/37 |
| 6,282,548 B1 | 8/2001 | Burner et al. | |
| 6,285,987 B1 | 9/2001 | Roth et al. | |
| 6,292,813 B1 | 9/2001 | Wolfe | |
| 6,301,576 B1 | 10/2001 | Wolfe | |
| 6,321,991 B1 | 11/2001 | Knowles | |
| 6,336,131 B1 | 1/2002 | Wolfe | |
| 6,341,305 B2 | 1/2002 | Wolfe | |
| 6,341,353 B1 | 1/2002 | Herman et al. | |
| 6,345,288 B1 | 2/2002 | Reed et al. | |
| 6,353,822 B1 | 3/2002 | Lieberman | |
| 6,366,947 B1 | 4/2002 | Kavner | |
| 6,373,502 B1 | 4/2002 | Nielsen | |
| 6,373,950 B1 | 4/2002 | Rowney | |
| 6,415,319 B1 | 7/2002 | Ambroziak | |
| 6,421,733 B1 | 7/2002 | Tso et al. | |
| 6,434,598 B1 | 8/2002 | Gish | |
| 6,460,036 B1 | 10/2002 | Herz | |
| 6,539,377 B1 | 3/2003 | Culliss | |
| 6,539,429 B2 | 3/2003 | Rakavy et al. | |
| 6,542,739 B1 * | 4/2003 | Garner | 455/427 |
| 6,584,498 B2 * | 6/2003 | Nguyen | 709/219 |
| 6,594,692 B1 * | 7/2003 | Reisman | 709/219 |
| 6,604,103 B1 | 8/2003 | Wolfe | |
| 6,622,919 B1 * | 9/2003 | Wilz et al. | 235/472.01 |
| 6,712,702 B2 | 3/2004 | Goldberg et al. | |
| 6,757,710 B2 | 6/2004 | Reed | |
| 6,769,009 B1 * | 7/2004 | Reisman | 709/201 |
| 6,807,570 B1 * | 10/2004 | Allen et al. | 709/219 |
| 6,816,850 B2 | 11/2004 | Culliss | |
| 7,020,700 B1 | 3/2006 | Bennett et al. | |
| 7,043,526 B1 | 5/2006 | Wolfe | |
| 7,072,849 B1 | 7/2006 | Filepp et al. | |
| 7,103,594 B1 | 9/2006 | Wolfe | |
| 7,149,332 B2 * | 12/2006 | Bacus et al. | 382/128 |
| 7,225,142 B1 | 5/2007 | Apte et al. | |
| 7,257,604 B1 | 8/2007 | Wolfe | |
| 7,302,638 B1 * | 11/2007 | Wolfe | 715/273 |
| 7,433,874 B1 * | 10/2008 | Wolfe | 1/1 |
| 7,467,137 B1 * | 12/2008 | Wolfe | 1/1 |
| 7,496,943 B1 | 2/2009 | Goldberg et al. | |
| 7,536,385 B1 * | 5/2009 | Wolfe | 1/1 |
| 8,051,450 B2 | 11/2011 | Robarts et al. | |
| 8,131,665 B1 | 3/2012 | Wolfe | |
| 8,161,370 B2 * | 4/2012 | Nguyen | 715/206 |
| 8,321,499 B2 * | 11/2012 | Reisman | 709/203 |
| 2001/0039579 A1 | 11/2001 | Trcka et al. | |
| 2002/0147788 A1 | 10/2002 | Nguyen | |

OTHER PUBLICATIONS

U.S. Appl. No. 09/903,923, filed Jul. 12, 2001 (inventor: Mark Wolfe).
U.S. Appl. No. 09/912,932, filed Jul. 26, 2001 (inventor: Mark Wolfe).
U.S. Appl. No. 09/974,242, filed Oct. 9, 2001, now U.S. Patent No. 6,604,103 (inventor: Mark Wolfe).
U.S. Appl. No. 10/021,761, filed Dec. 12, 2001 (inventor: Mark Wolfe).
U.S. Appl. No. 10/021,761, Wolfe, filed Dec. 12, 2001.
U.S. Appl. No. 10/634,318, Mark Wolfe, filed Aug. 5, 2003 (continuation-in-part of U.S. Patent No. 6,292,813).
U.S. Appl. No. 10/634,318, Wolfe, filed Aug. 5, 2003.
U.S. Appl. No. 10/652,670, Mark Wolfe, filed Aug. 29, 2003 (continuation of U.S. Patent No. 6,263,351).
U.S. Appl. No. 10/652,670, Wolfe, filed Aug. 29, 2003.
U.S. Appl. No. 11/140,556, filed May 27, 2005, Wolfe.
U.S. Appl. No. 11/141,692, Wolfe, filed May 31, 2005.
U.S. Appl. No. 11/322,602, Wolfe, filed Dec. 30, 2005.
U.S. Appl. No. 11/328,299, filed Jan. 9, 2006, Wolfe.
U.S. Appl. No. 11/469,948, filed Sep. 5, 2006, Wolfe.
U.S. Appl. No. 11/470,289, Wolfe, filed Sep. 6, 2006.
U.S. Appl. No. 11/552,529, filed Oct. 24, 2006, Wolfe.
".More" product literature (one page) (.Copyrgt.1995 Lexis/Nexis).
".More" Product Literature (two pages), (.Copyrgt. 1995 Lexis/Nexis).
"Internet 101: Web Rings," CNET.COM, Jul. 17, 1977 (www.cnet.com).
"More" product literature (one page) (.Copyrgt.1995 Lexis/Nexis).
"Netscape's DDE Implementation," (from www.netscape.com) Mar. 22, 1995.
Andrews, ""Hyper-G and Harmony: Towards the Next Generation of Networked Information Technology,"" Proceedings of the Conference on Human Factors in Computing Systems, May 1995, pp. 33-34.
Bederson, ""Pad plus plus: A Zoomable Graphical Interface System,"" Proceedings of the Conference on Human Factors in Computing Systems, May 1995, pp. 23-24.
Bell, "Make Java Fast: Optimize!," JavaWorld Apr. 1997 (JavaWorld 1997) (available at http://www.javaworld.com/).
Bell, "Make Java Fast: Optimize!" JavaWorld Apr. 1997 (JavaWorld 1997) (available at http://www.javaworld.com/).
Bieber, ""Backtracking in a Multiple-Window Hypertext Environment,"" ACM European Conference on Hypermedia Technology, Sep. 1994, pp. 158-166.
Bieber, ""Backtracking in a Multiple-Window Hypertext Environment,"" ACM European Conference on Hypermedia Technology, Sep. 1994, pp. 158-166.

(56) References Cited

OTHER PUBLICATIONS

Blight, "'Annotated Reference List Agents,'" IEEE 1997 Conference on Communications, Power and Computing WESCANEX97 Proceedings, May 22, 1997, pp. 7-12.
Blight, "'Annotated Reference List Agents,'" IEEE 1997 Conference on Communications, Power, and Computing WESCANEX97 Proceedings, May 22, 1997, pp. 7-12.
Brown, Using Netscape 2, pp. 773-786 (Que 1995).
Campione and Walrath, The Java Tutorial (Addison Wesley 1996).
Cantu, Mastering Delphi 3, (2d ed. Sybex 1996).
Cao, "Application-Controlled File Caching Policies," Princeton University, 1994 no date on document, but believed to be published in 1994.
Cao, "Implementation and Performance of Integrated Application-Controlled File Caching, Prefetching, and Disk Scheduling," 1996 no date on document, but believed to be published in 1996.
Chapman, Building Internet Applications with Delphi 2 (Que 1996).
Chappell, Understanding ActiveX and OLE, (Microsoft Press 1996).
U.S. Appl. No. 11/735,423, Wolfe, filed Apr. 13, 2007.
U.S. Appl. No. 60/047,554, filed May 22, 1997 (inventor: Mark Wolfe).
U.S. Appl. No. 11/624,826, filed Jan. 19, 2007, Wolfe.
Wolfe, U.S. Appl. No. 08/474,921, filed Jun. 7, 1995, now U.S. Pat. No. 5,715,445.
Wolfe, U.S. Appl. No. 08/918,912, filed Aug. 27, 1997, now U.S. Pat. No. 5,946,682, Wolfe.
Wolfe, U.S. Appl. No. 09/083,382, filed May 22, 1998, now abandoned.
Wolfe, U.S. Appl. No. 09/620,651, filed Jul. 20, 2000, Wolfe, now abandoned.
Wolfe, U.S. Appl. No. 60/047,554, filed May 22, 1997, now expired.
Wolfe, U.S. Appl. No, 08/300,343, filed Sep. 2, 1994, now abandoned.
U.S. Appl. No. 08/828,709 filed Mar. 31, 1997.
".More" Product Literature (two pages), (.Copyrgt.1995 Lexis/Nexis).
"And Now, the Webtop," PC Magazine, Jun. 24, 1997, p. 9.
"Blaze Web Performance Pack: xSpeed Technology," (from http://www.xspeed.com/xspeed.htm), Dec. 30, 1996.
"Internet 101: Web Rings," cnet.com, Jul. 17, 1997 (www.cnet.com).
"Internet Performance Products: Peak Net.Jet" (available at http://www.peak-media.com/netjet/netjet.html), Dec. 29, 1996.
Andrews et al., "Hyper-G and Harmony: Towards the Next Generation of Networked Information Technology," Proceedings of the Conference on Human Factors in Computing Systems, May 1995, pp. 33-34.
Ayre & Reichard, "The Web Untangled," PC Magazine, Feb. 7, 1995, pp. 173-196.
Ayre and Mace, "Internet Access: Just Browsing," PC Magazine, Mar. 12, 1996, pp. 100-146.
Bannan, "Navigating Made Easy," PC Magazine, Jul. 1997, p. 81.
Bederson, "Pad plus plus: A Zoomable Graphical Interface System," Proceedings of the Conference on Human Factors in Computing Systems, May 1995, pp. 23-24.
Bell, "Make Java Fast: Optimize!," JavaWorld Apr. 1997 (JavaWorld 1997) <http://www.javaworld.com/jw-04-1997/jw-04-optimize.html>.
Bieber, "Backtracking in a Multiple-Window Hypertext Enviroment," ACM European Conference on Hypermedia Technology, Sep. 1994, pp. 158-166.
Blight, "Annotated Reference List Agents," IEEE 1997 Conference on Communications, Power and Computing WESCANEX97 Proceedings, May 22, 1997, pp. 7-12.
Blythe, "Netscape's DDE Implementation," Mar. 22, 1995. <http://www3.di.uminho.pt/~fln/NetscapeAPI/ddeapi.html>.
Bremser, "HTML Workshop: Making Frames Fit," Internet World, Sep. 1997, pp. 90-92.
Brockschmidt, Inside OLE (2d ed. Microsoft Press 1995).
Brown, "Using Netscape 2," pp. 773-786 (Que 1995).

Campione and Walrath, "The Java Tutorial." (Addison Wesley 1996).
Canter, "Internet Search Tools," PC Magazine, May 14, 1996, pp. 207-210.
Cantu, "Mastering Delphi 3." (2d ed. Sybex 1996).
Cao et al., "Application-Controlled File Caching Policies," Princeton University, no date on document, but believed to be published in 1994.
Cao et al., "Implementation and Performance of Integrated Application-Controlled File Caching, Prefetching, and Disk Scheduling," ACM Transactions on Computer Systems, vol. 14, No. 4, Nov. 1996, pp. 311-343.
Castro, "Netscape Communicator for Windows," pp. 57-71 (Peachpit Press 1997).
Chapman, "Building Internet Applications with Delphi 2." (Que 1996).
Chappell, "Understanding ActiveX and OLE." (Microsoft Press 1996).
CheckCite 3.0, The Definitive Citation Checker, User's Manual, by Jurisoft Mead Data Central, Inc., 1992, pp. 11-33, 67-81, 83-112, 127-129, and 131.
Clyman, Mendelson, and Nadel, "In Your Face Browsing," PC Magazine, Apr. 22, 1997, pp. 45-48.
Comer, Internetworking with TCP/IP, vols. 1, 2 & 3 (Prentice Hall 1994-1997).
Danesh, " Teach Yourself JavaScript in a Week." (Sams.net 1996).
Davis and Huttenlocher, "Shared Annotation for Cooperative Learning," Xerox Corporation, Design Research Institute, Sep. 1995.
Davis and Lagoze, "'Drop-in' publishing with the World Wide Web," Computer Systems and ISDN Networks, vol. 28 (1995).
Davis, "A Server for Distributed Digital Technical Report Library," Xerox Corporation, Jan. 15, 1994.
Davis, "Believable Advice," Cornell University, Feb. 2, 1994.
Denning, "OLE Controls Inside Out." (Microsoft 1995).
Discovering Westlaw: The Essential Guide(4th ed.) (.Copyrgt.1995 West Publishing Corporation).
Dragan, "Advice From the Web," PC Magazine, Sep. 9, 1997, pp. 133-144.
Finnie, "Not Just Browsing," PC Magazine, Aug. 1997, pp. 45-54.
Finnie, "The Browser Push Is On," PC Magazine, Sep. 9, 1997, pp. 123-128.
Foss, "Tools for Reading and Browsing Hypertext," Information Processing & Management, vol. 25, No. 4, pp. 405-418, 1988.
Fowler et al., "Experience with the Virtual Notebook System: Abstraction in Hypertext," Transcending Boundaries, Proceedings of the Conference on Computer Supported Cooperative Work, Oct. 1994, pp. 133-143.
Freestyle Quick Reference (pamphlet) (.Copyrgt.1994 Lexis/Nexis).
Freestyle Quick Reference (pamphlet) (1995 Lexis/Nexis).
Frelechoux, "An Architecture to Support Personalized Web Applications," Apr. 7, 1997 <http://www.ra.ethz.ch/CDstore/www6/Posters/726/POSTER726.html>.
Glassman, "A Caching Relay for the World Wide Web," Comouter Networks and ISDN Systems, vol. 27, No. 2 (Nov. 1994).
Graham, HTML Sourcebook (John Wiley & Sons 1996).
Griffioen and Appleton, "Automatic Prefetching in a WAN," University of Kentucky, Oct. 1993.
Griffioen and Appleton, "Reducing File System Latency Using a Predictive Approach," University of Kentucky, Jun. 1994.
Grunin, "Publish Without Paper," PC Magazine, Feb. 7, 1995, pp. 110-171.
Hannon, "New Window on Web Ads," PC Week, Feb. 2, 1998.
Haskin, "Clearing a Path on the Web," PC Magazine, Nov. 19, 1996, p. 58.
Hastings, "WebEx: Download Now, Hyperbrowse Later," PC World, Oct. 1996, p. 98.
Hawblitzel et al., "SLK: A Capability System Based on Safe Language Technology," Cornell University, Apr. 15, 1997.
How to Shepardize, 1993 Edition (.Copyrgt.1993 McGraw-Hill, Inc.).
Huser et el., "Knowledge-based Edidting and Visualization for Hypermedia Encyclopedias," Communications of the Association of Computing Machinery, vol. 38, Apr. 1995, pp. 49-51.

(56) References Cited

OTHER PUBLICATIONS

Instone et al., "Empirically-based Re-design of a Hypertext Encyclopedia," Conference Proceedings on Human Factors in Computing Systems, Apr. 1993, pp. 500-506.
Intercast Press Releases, Apr. 7-8, 1997 (from www.intercast.com).
Isaacs, "Inside Dynamic HTML." (Microsoft Press 1997).
Jamsa, "Internet Programming." (Jamsa Press 1995).
Joachims et al., "WebWatcher: A Tour Guide for the World Wide Web," Carnegie Mellon University, Sep. 1996.
Joel Snyder, "Taming the Internet," MacWorld, Dec. 1994, pp. 115-117.
Kidder & Harris, "Netscape Navigator Quick Tour for Windows," pp. 32 (Ventana 1995).
Kovel, Quirk, & Gabin, "The Lotus Notes Idea Book." (Addison-Wesley 1996).
Lemay, "Official Marimba Guide to Castnet." (SamsNet 1997).
Lemay, "Teach Yourself Java in 21 Days." (SamsNet 1996).
Levin, "New Web Tool Reads Minds," PC Magazine, Sep. 10, 1996, p. 36.
Levin, "Searching for Meaning," PC Magazine, Sep. 24, 1996, p. 36.
Lewis, "Best Web Browsers," PC World, Jun. 1995, p. 122.
Lidsky, "Personal Webcasting," PC Magazine, Dec. 17, 1996, p. 40.
Lidsky, "The Web Delivers," PC Magazine, Feb. 18, 1997, pp. 128-143.
Lieberman, "Letizia: An Agent That Assists Web Browsing," Proceedings of the Fourteenth International Joint Conference on Artificial Intelligence, vol. 1 (Aug. 1995).
Livingston, "Java-based app speeds Web pages to your browser," Infoworld, Nov. 4, 1996. <http://brianlivingston.com/windowmanager/archive/cgi-bin/new/livingst/bl110496.htm>.
Livingston, "Will Too Many Users Destroy the Internet? I Hardly Think So," Infoworld, Dec. 9, 1996, p. 35.
Mark Brownstein, "Fast Drives, Tiny Packages, " PC/Computing, Nov. 1994, pp. 140-41.
Mendelson, "Internet Off-line Search Utilities," PC Magazine, Apr. 8, 1997, pp. 207-218 and 227-232.
Mendelson, "The Finder of Lost Sites," PC Magazine, Nov. 5, 1996, p. 48.
Metz, "PC Broadcast News: PointCast Delivers over the Internet," PC Magazine, Jul. 1996, p. 60.
Minatel, "Easy World Wide Web with Netscape," pp. 25 (Que 1996).
Moeller, "Caching Software Speeds Browsing," PC Week, Dec. 2, 1996, p. 33.
Munro, "Internet Filtering Utilities," PC Magazine, Apr. 8, 1997, pp. 235-240.
Nelson, "Caching in the Sprite Network File System," Transactions on Computer Systems and Programs, vol. 6, No. 1 (1988).
Netscape Communicator Plug-in Guide (Netscape Communications Corporation Jan. 1998).
Nick Wingfield, "Web-wise apps," Infoworld, Aug. 28, 1995 pp. 1, 20.
Ousterhout, "Why Aren't Operating Systems Getting Faster as Fast as Hardware?", Digital Western Research Laboratory, Oct. 1989.
Padmanabhan and Mogul, "Using Predictive Prefetching to Improve World Wide Web Latency," 1996 no date on document, but believed to be published in 1996.
PatentWorks Workbench User's Guide, Waverly Systems, Inc., pp. 1-6, 67-95, and Quick Reference Card, Copyrgt.1994 Waverly Systems, Inc.
Patterson et al., "A Status Report on Research in Transparent Informed Prefetching," Carnegie Mellon University, Feb. 1993.
Pazzani et al., "Learning from Hotlists and Coldlists: Towards a WWW Information Filtering and Seeking Agent," Seventh International Conference on Tools with Artificial Intelligence (Nov. 1995).
Perenson, "Make a Dash for the Web," PC Magazine, Jun. 11, 1996, p. 73.
Perenson, "Your Web Surfing Companion," PC Magazine, Sep. 10, 1996, p. 73.
Petzold, "Programming Windows 95." (Microsoft 1996).
Phelps, "Browsing for a Web Browser," SmartComputing, Oct. 1996.
Pike et al. "Using Mosaic," (Que Corporation 1994), pp. 31-44 & 80-85.
Proffit, "Intercast Brings the Web to TV," PC Magazine, Jan. 21, 1997, pp. 203-204.
Prosise, "Programming Windows 95 with MFC." (Microsoft Press 1996).
Pulver, "A Personal Cast," Internet World, Dec. 1996, pp. 110-112.
Questions & Answers (to Be Used With "How to Shepardize") (.Copyrgt.1993 McGraw-Hill, Inc.).
Randall, "Internetworks Surfing Cyberspace in Suite Style," PC/Computing, Feb. 1995, p. 123.
Randall, "Web Central," PC Magazine, Apr. 22, 1997, p. 65.
Rapoza, "Alexa's Theory of Relativity," PC Week, Aug. 18, 1997, p. 42.
Roberts, "Controlling Internet Explorer 4.0 with Brower Helper Objects," Microsoft Interactive Developer, May 1998, p. 66.
Robertson et al., "The Hypermedia Authoring Research Toolkit (HART)," Proceedings of European Conference on Hypermedia Technology, Sep. 1994, pp. 177-185.
Robertson, "A Personalized Web," Internet World, Apr. 1997, pp. 32-34.
Roscheisen et al., "Beyond Browsing: Shared Comments, SOAPs, Trails, and On-line Communities," Computer Networks and ISDN Systems, Apr. 1995.
Roscheisen et al., "Shared Web Annotations as a Platform for Third-Party Value-Added, Information Providers," Stanford University, no date on document, but believed to be published in 1995.
Scisco, "Best Ways to Browse the Web," PC World, Apr. 1997, p. 110.
Shankar, "Blaze browsing tool packs punch," Infoworld, Apr. 14, 1997 (retrieved from EBSCOhost Aug. 5, 2013) <http://connection.ebscohost.com/c/product-reviews/9704271944/blaze-browsing-tool-packs-punch>.
Shepard's United States Citations: CD-ROM Edition User's Manual (.Copyrgt.1994 McGraw-Hill, Inc.).
Siegel, "CORBA Fundamentals and Programming." (John Wiley & Sons 1996).
Singh and Lidsky, "All-Out Search," PC Magazine, Dec. 3, 1996, pp. 213-249.
Sirapyan, "Pushing Content Along," PC Magazine, Apr. 8, 1997, p. 40.
Software Products: Prepare to Practice (pamphlet) (.Copyrgt.1995 Lexis/Nexis).
Sun Microsystems, Inc., The JavaBeans 1.0 API Specification (Sun Microsystems 1996) (available at http://java.sun.com/beans).
Tait and Duchamp, "Detection and Exploitation of File Working Sets," Columbia University (1991).
Tanenbaum, "Computer Networks." (2d ed. Prentice Hall 1981).
The End of the Beginning (pamphlet) (.Copyrgt.1995 Lexis/Nexis).
Vanhelsuwe, "How to Make Java Applets Start Faster," NetscapeWorld, Dec. 1996 (from www.netscapeworld.com).
Venditto, "Safe Computing," Internet World, Sep. 1996, pp. 49-58.
Venditto, "Search Engine Showdown," Internet World, May 1996, pp. 79-86.
Vitter and Krishnan, "Optimal Prefetching via Data Compression," Duke University, Sep. 1996.
von Tetzchner, "MultiTorg Opera," Telenor Research 1995.
Wang and Crowcroft, "Prefetching in World Wide Web," University College London, 1996 no date on document, but believed to be published in 1996.
Wiil, "Issues in the Design of EHTS: A Multiuser Hypertext System for Collaboration," The University of Aalborg (1992).

\* cited by examiner

Profile information for Document 301

| | doc. 302 | doc. 303 | doc. 304 | doc. 319 |
|---|---|---|---|---|
| SERVER ON WHICH DOCUMENT IS STORED | GAYLORDS.COM | SAME | MFC.COM | DELTA.COM |
| % OF USERS WHO SELECT | 23% | 21% | 4% | 2% |

*Figure 14*

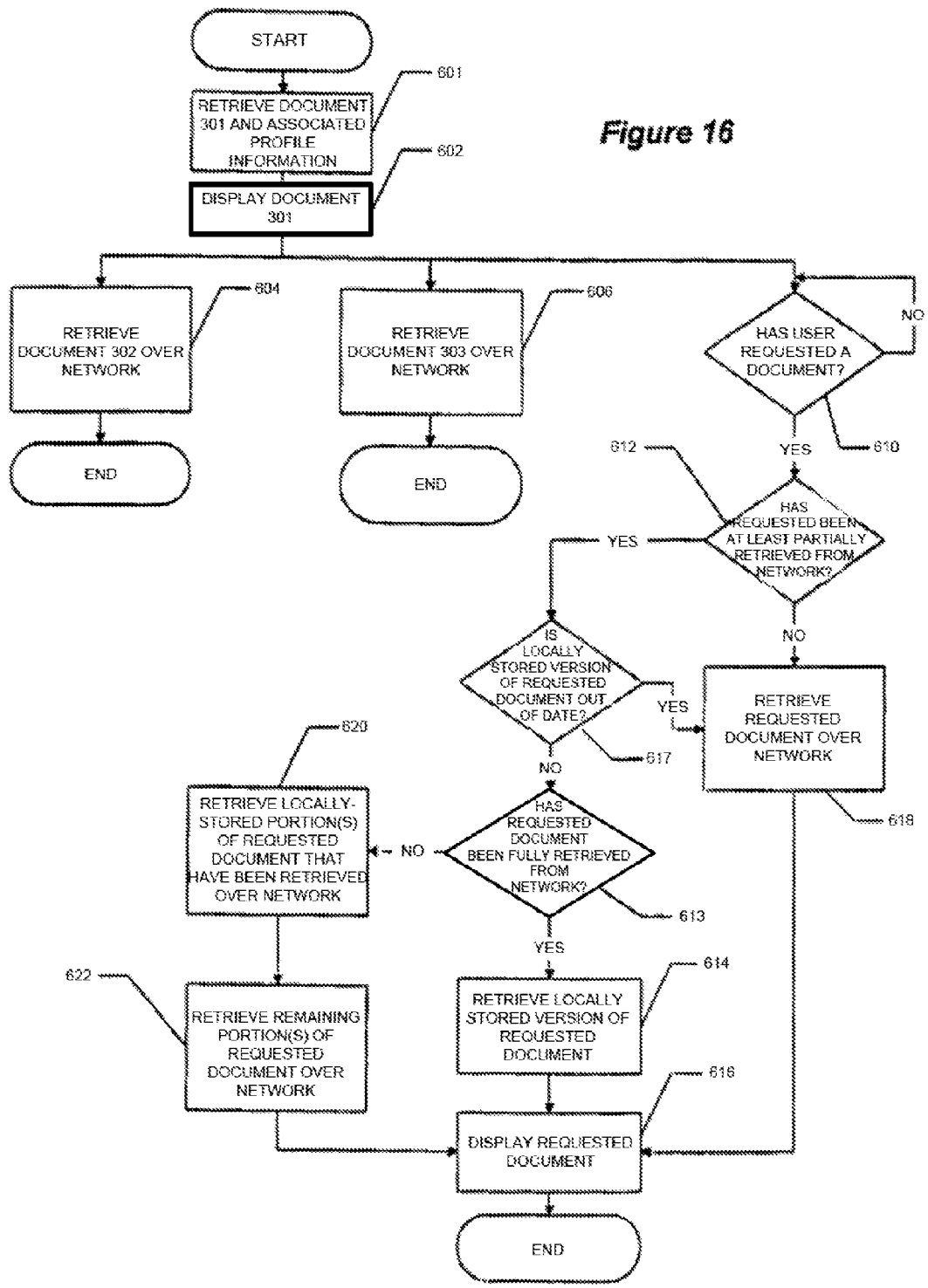

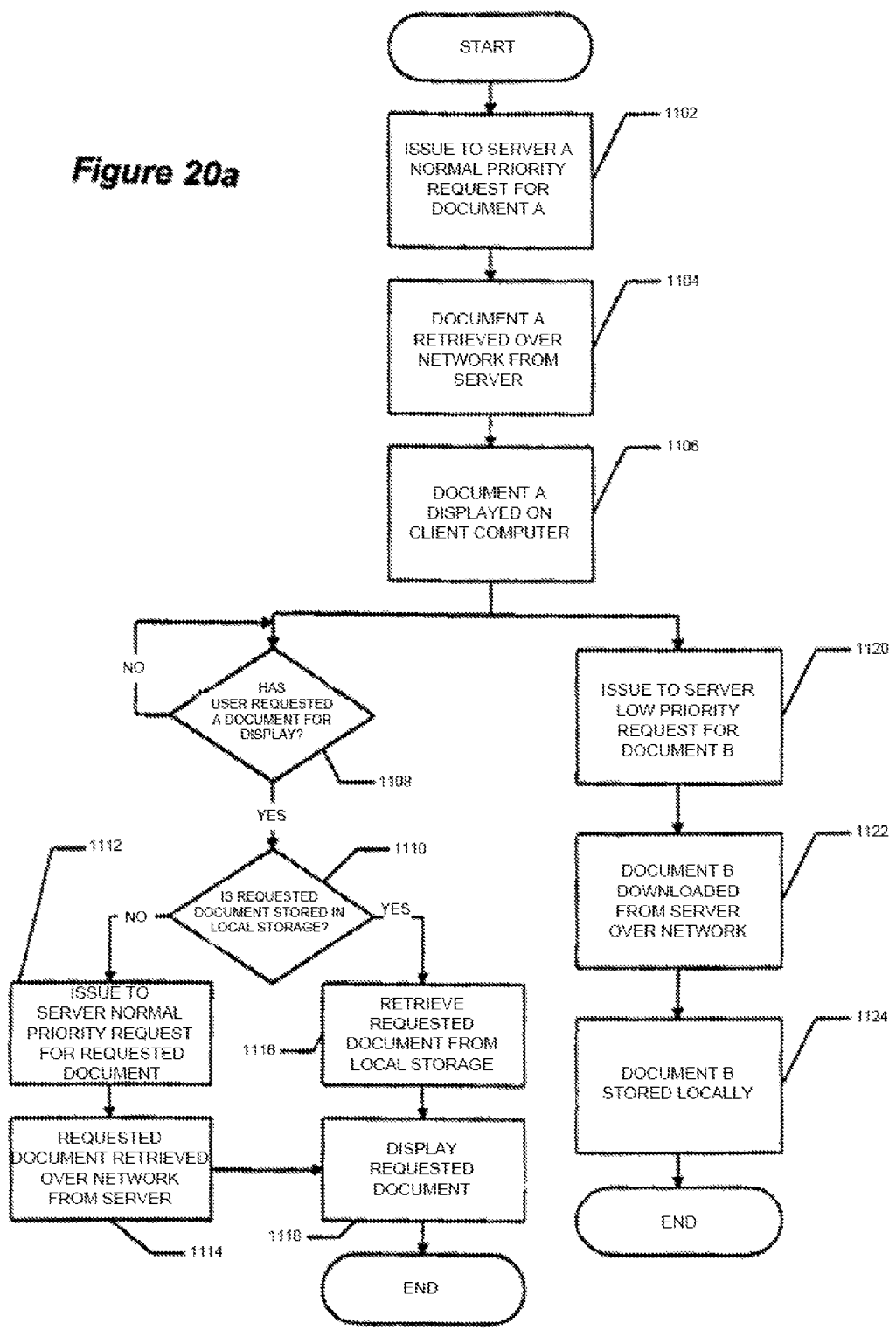

CLIENT-SIDE PROCESSING OF PRELOAD OPERATIONS

CROSS-REFERENCE TO RELATED APPLICATIONS

The present application is a continuation of U.S. patent application Ser. No. 12/182,124, filed Jul. 29, 2008, which application is a continuation of U.S. patent application Ser. No. 11/469,953, filed Sep. 5, 2006 and issued as U.S. Pat. No. 7,467,137 on Dec. 16, 2008, which application is a continuation of U.S. patent application Ser. No. 10/611,077, filed Jul. 1, 2003 and issued as U.S. Pat. No. 7,103,594 on Sep. 5, 2006, which application is a continuation of U.S. patent application Ser. No. 09/974,242, filed Oct. 9, 2001 and issued as U.S. Pat. No. 6,604,103 on Aug. 5, 2003, which application is a continuation of U.S. patent application Ser. No. 09/620,651, filed Jul. 20, 2000, which application is a continuation of U.S. patent application Ser. No. 09/083,382, filed May 22, 1998, which claims the benefit of the filing date of U.S. Provisional Application No. 60/047,554, filed May 22, 1997, entitled "Document Retrieval System Including Use of Profile Information," the entire disclosures of which are hereby incorporated herein by reference.

FIELD OF THE INVENTION

The present invention relates to a system for retrieving from a database. More specifically, the present invention improves a system's usability and/or response time so that a user's request to view new information is serviced quickly and/or efficiently.

BACKGROUND AND SUMMARY

The recent proliferation of electronic text and multimedia databases has placed at society's fingertips a wealth of information and knowledge. Typically, a computer is employed that locates and retrieves information from the database in response to a user's input. The requested information is then displayed on the computer's monitor. Modern database systems permit efficient, comprehensive, and convenient access to an infinite variety of documents, publications, periodicals, and newspapers. Yet retrieving information from databases is often slow. Sometimes, this is caused by bandwidth limitations, such as when information is retrieved from remotely-located databases over an ordinary telephone line, a very narrow bottleneck. In other cases, slow retrieval is caused by a relatively slow local mass storage device (e.g., a CD-ROM drive).

There exists a compelling need for a database system that has better usability and/or a quicker response time so that information is displayed very soon after the user requests it. In some embodiments, the present invention takes advantage of the fact that it can be useful to have the user exercise some direct control over the retrieval of information. Some embodiments of the present invention could also take advantage of the fact that the time that the user spends viewing displayed information is often sufficient to advantageously preload a substantial amount of information.

With these and other objects, advantages, and features of the invention that may become hereinafter apparent, the nature of the invention may be more clearly understood by reference to the following detailed description of the invention, the appended claims, and to the several drawings herein.

BRIEF DESCRIPTION OF THE DRAWINGS

FIG. 12 is a representation of a video display screen for a computer such as that of FIG. 1a.
FIG. 14 is a chart illustrating one example of the type of profile information that may be provided in connection with a given document.
FIG. 16 is a flow chart of the operation of a system in one embodiment of the present invention where a plurality of documents are preloaded in separate threads of execution.
FIGS. 20a, 20b, and 20c are flow charts of the operation of embodiments of the present invention illustrating how server demands can be reduced in some circumstances.

DETAILED DESCRIPTION

Figure 1A:
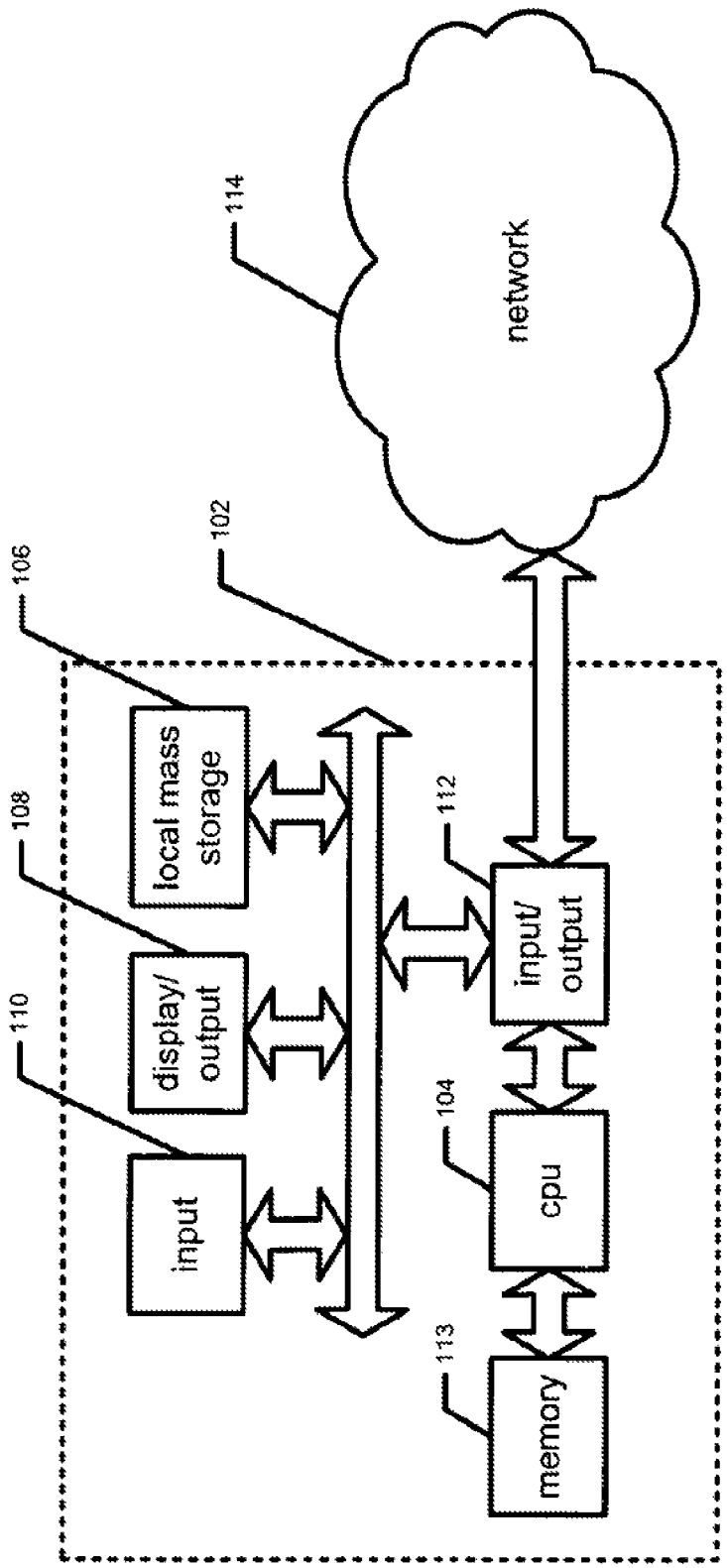
FIG. 1a is a block diagram of a general purpose computer.

FIG. 1a is a block diagram of a general purpose computer 102 that can be used to implement the present invention. The computer 102 has a central processing unit (CPU) 104, memory 113, and input/output (i/o) circuitry 112. The CPU 104 is connected to the memory 113 and the i/o circuitry 112.

The i/o circuitry permits the CPU 104 to access various peripheral devices, such as the display or monitor 108, local storage 106, and input device(s) 110. The input device(s) 110 may include a keyboard, mouse, pen, voice-recognition circuitry and/or software, or any other input device. Some type of secondary or mass storage 106 is generally used, and could be, for example, a hard disk or optical drive. The storage 106 can also be eliminated by providing a sufficient amount of memory 113. Either the storage 106 or the memory 113 could act as a program storage medium that holds instructions or source code. The i/o circuitry 112 is also connected to a network 114, thereby connecting the computer 102 to other computers or devices.

Figure 1B:
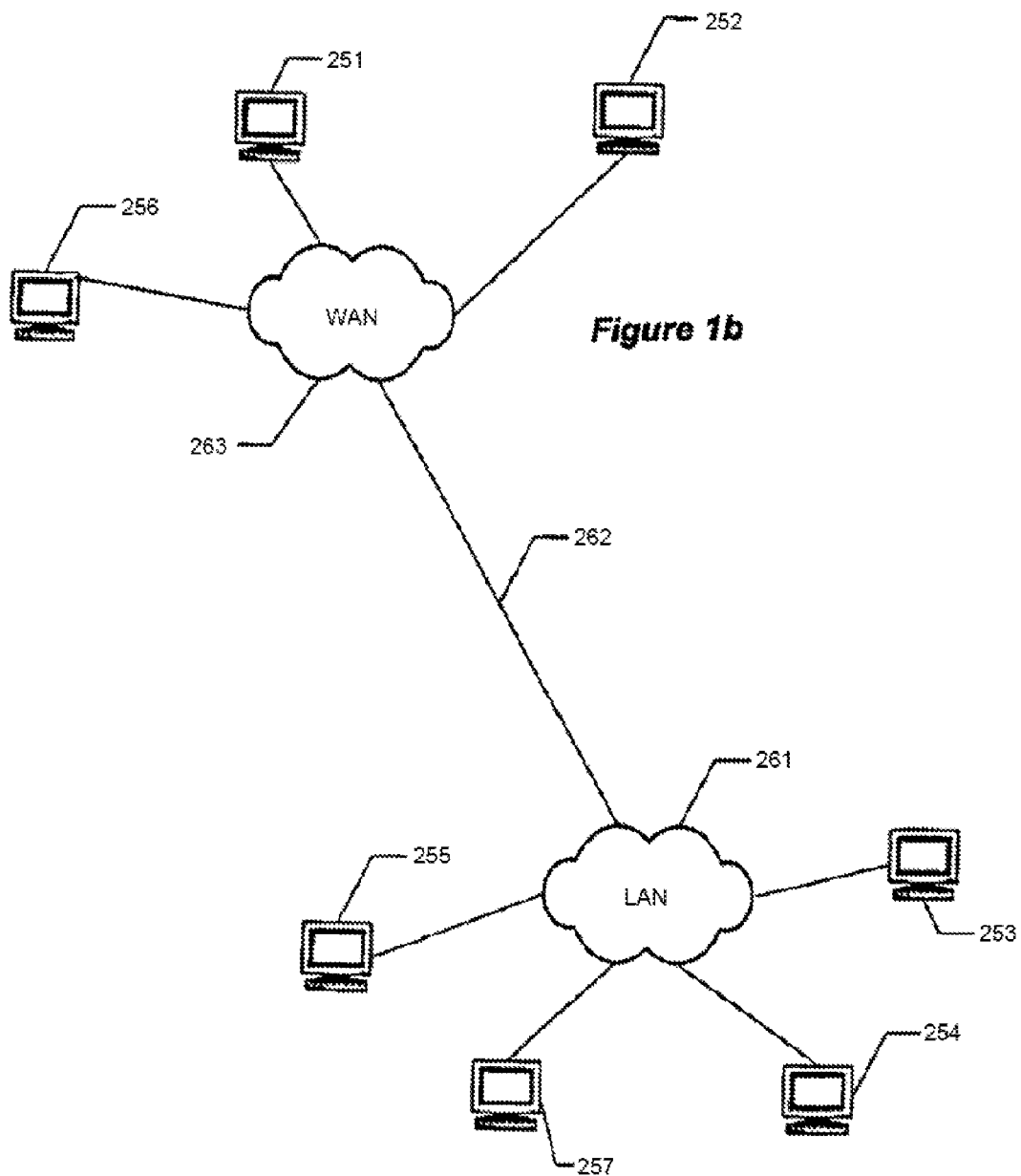
FIG. 1b is a diagram of multiple computers connected together to form a network of computers and/or networks.

FIG. 1b is a representation of multiple computers (251, 252, 253, 254, 255, 256, and 257) connected together to form a network of computers and/or networks. Computers 251, 252, and 256 are shown connected to wide area network (WAN) 263, whereas computers 253, 254, 255, and 257 are shown interconnected by local area network (LAN) 261. The LAN 261 is connected to the WAN 263 by connection 262. Various network resources, such as databases of documents or other objects, are stored on one or more the computers shown in FIG. 1b.

Figure 1C:
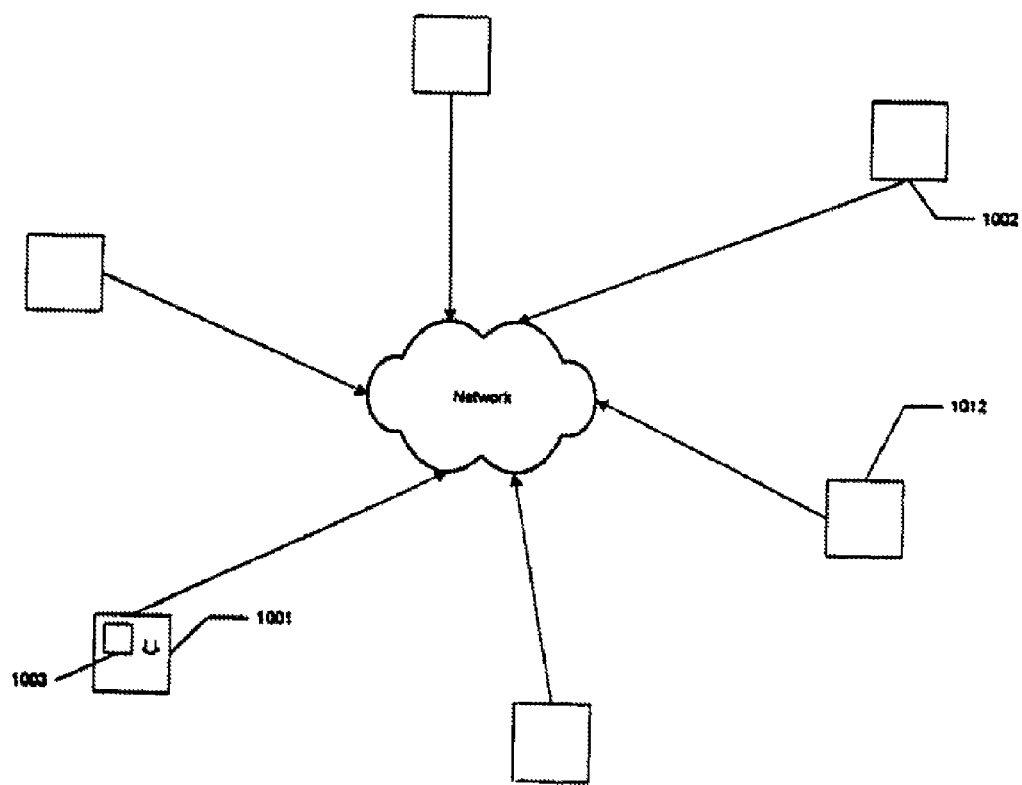
FIGS. 1c, 1d, and 1g are diagrams illustrating various procedures for installing and executing software.

In a networked environment, such as that of FIG. 1b, there are numerous ways in which software can be installed, distributed, and/or executed on the various computers on the network. FIG. 1c illustrates a conventional way in which desktop software is installed and executed. In FIG. 1c, a computer program 1003 is installed at the computer 1001 through some type of installation program typically started by the user of the computer 1001, and executed on the computer 1001. During installation, the program 1003 may need to be configured at the computer 1001 for use with the network in order to enable access to other computers on the network (e.g., 1002 and 1012). After installation, the computer program 1003 resides and executes at the computer 1001, and is persistent. When the computer 1001 is shut down or restarted, the program continues to be stored at the client on nonvolatile storage media. Upon restarting the computer 1001, the program 1003 is available for use without reinstallation.

Figure 1D:
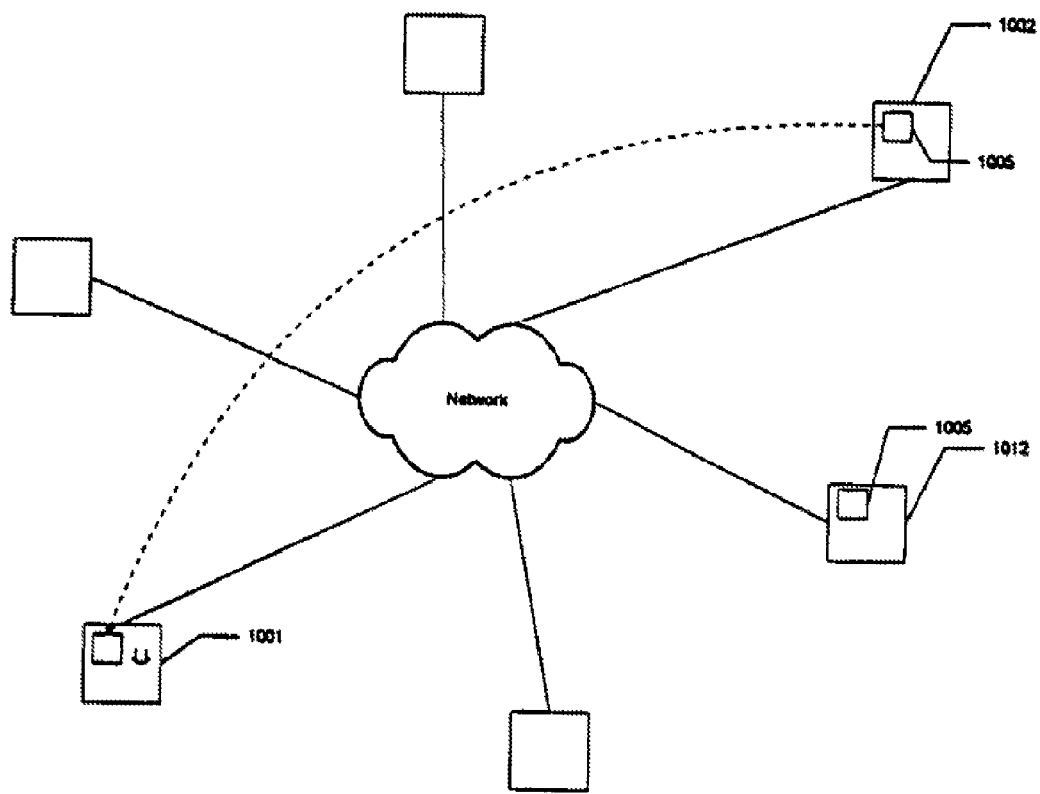
Figure 1E:
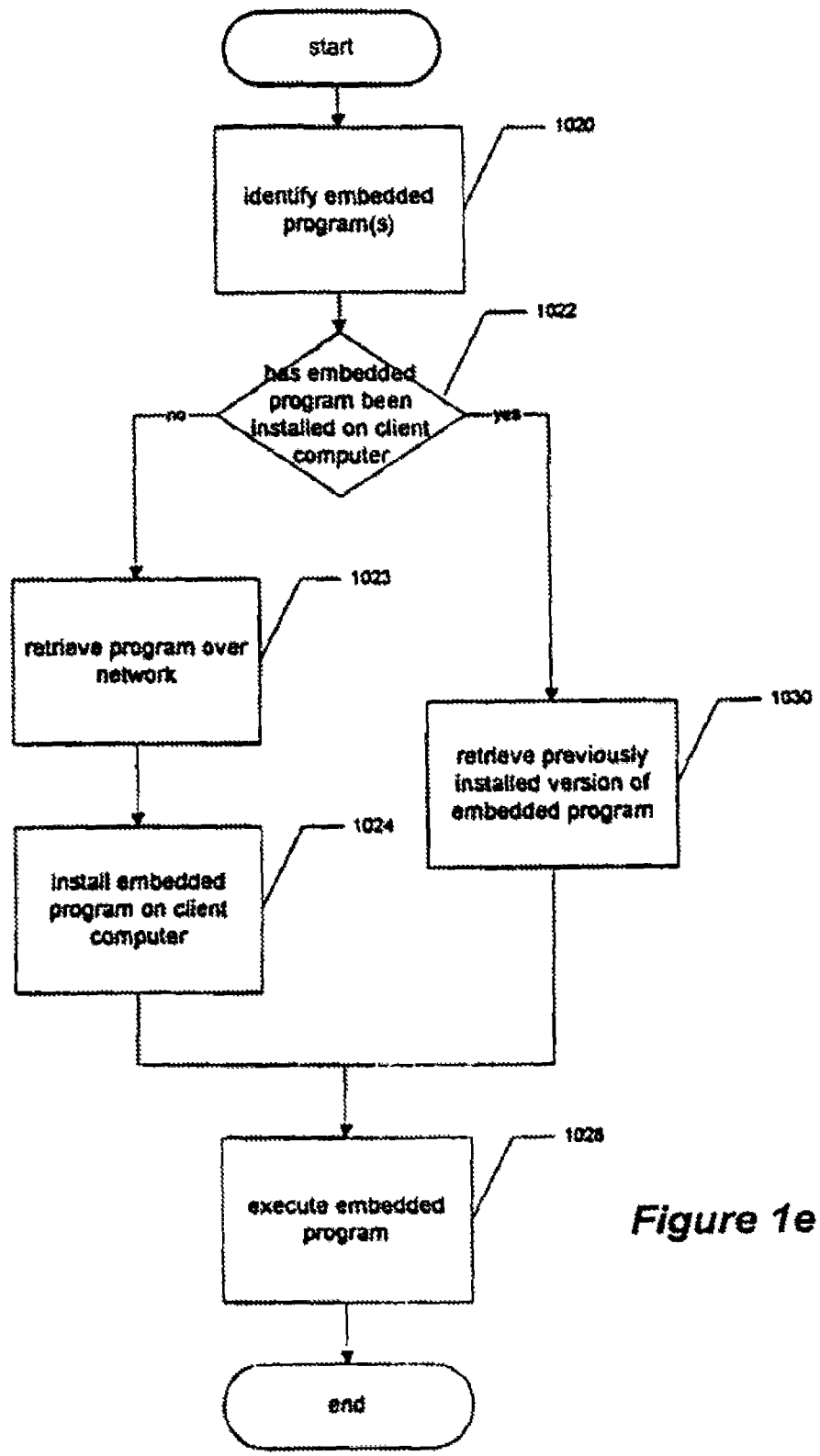
FIGS. 1e and 1f are flow charts illustrating procedures for installing and executing software.

FIG. 1d shows a different embodiment. When the network-connected computer 1001 connects to or downloads an object stored on the remote computer 1002 over the network, a program 1005 embedded within the downloaded document or object is installed on the computer 1001 and is executed on the computer 1001. FIG. 1e is a flow chart that illustrates one possible installation procedure that is carried out when the computer 1001 accesses the program 1005.

The computer 1001 identifies at 1020 one or more programs embedded within the accessed object. The client computer then determines whether each embedded program has been installed previously on the computer 1001. This can be done by searching the computer's storage or system registry for the program or for the program's identifying characteristics. In Microsoft's ActiveX/COM architecture, for example, this is done by searching the registry for an instance of the program's globally unique identifier (GUID) in the system registry.

If the embedded program has been installed on the client computer, the previously installed program is retrieved from local storage at 1030, and executed at 1028. However, if the program has not been already installed on the client computer, it is retrieved over the network (1023), and installed on the client computer. The installation process will typically involve updating a system registry or other persistent storage with identifying information on the computer 1001.

Preferably the program is installed at 1024 such that it need not be downloaded again over the network when it is encountered embedded within another object. For example, if the computer 1001 were to access an object on computer 1012 that had program 1005 embedded within it, the program 1005 would not need to be installed again because it has already been installed when computer 1002 was accessed.

Figure 1F:
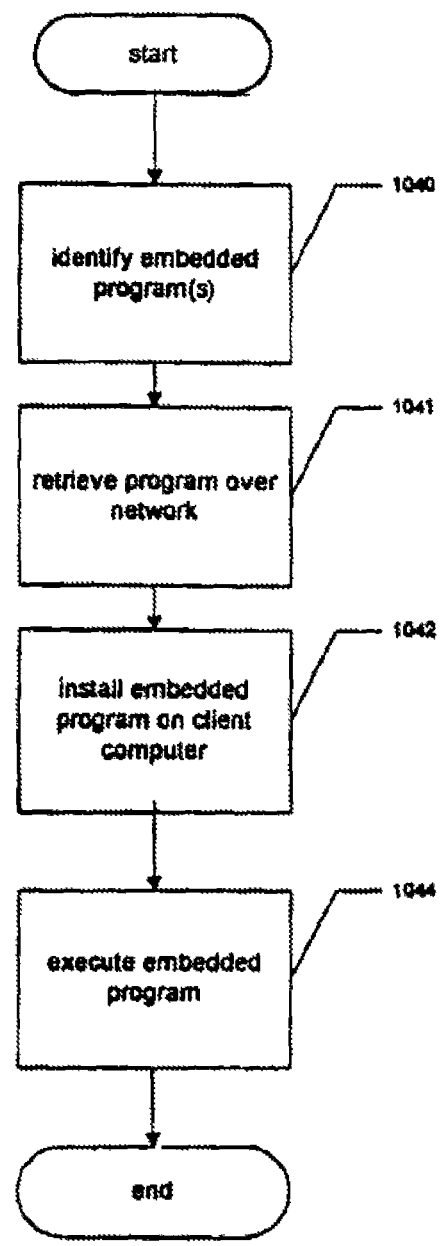

FIG. 1f is a flow chart illustrating a different embodiment of the present invention. In this system, when the computer 1001 encounters an object on computer 1002, it identifies at 1040 each program embedded within the object. It then retrieves one or more programs over the network, and then installs them at the client computer 1001, but without the use of a persistent storage mechanism. Thus, although the program is executed on the client computer 1001, the embedded program must be downloaded each time it is encountered because no persistent storage mechanism is used. This type of installation procedure may be more secure, and has been used in some of the early Java implementations.

A system in which software is downloaded over the network, perhaps from an untrusted server, has significant security risks associated with it, and for this reason, security restrictions may be placed on computer programs downloaded from the network. Thus, a downloaded computer program may be unable access some of the resources of a client computer or of the network generally. In some embodiments, however, a downloaded program may be tested for authenticity and safety through a code signing procedure, or through a code verifying procedure. If such a program passes such authenticity tests, it may be given more complete access to system or network resources.

Figure 1G:
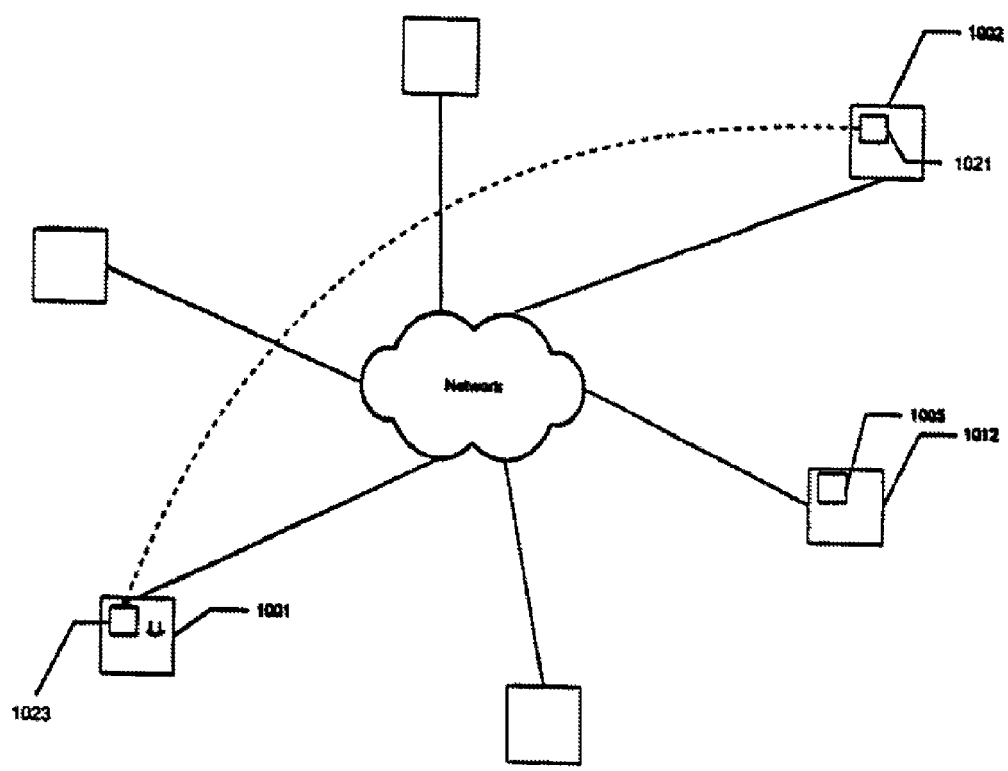

In yet another embodiment, shown in FIG. 1g, the network-connected computer 1001 connects to the remote computer 1002 over the network, but the program 1021 executes on the remote computer 1002. Display information and/or instructions are sent from the remote computer 1002 to the computer 1001, and this information and/or instructions are interpreted by a terminal program or a thin client program 1023, which updates the display. Input device events (e.g., mouse clicks and keyboard events) caused by the user at the computer 1001 are sent to the remote computer 1002 so as to appropriately alter the execution of the program 1021 executing at the remote computer. In some implementations, it appears to the user of computer 1001 that the program 1021 is executing on computer 1001, even though the program 1021 is actually executing on the computer 1002. This scenario, or one similar to it, is employed by some of the thin-client computing environments, such as Citrix Corporation's WinFrame solution, or Microsoft's forthcoming Hydra initiative.

Each of the described techniques for installation and/or use of software can be implemented in connection with the present invention. For example, software used for carrying out one or more embodiments of the present invention may be installed and executed in accordance with the techniques described above.

Figure 2:
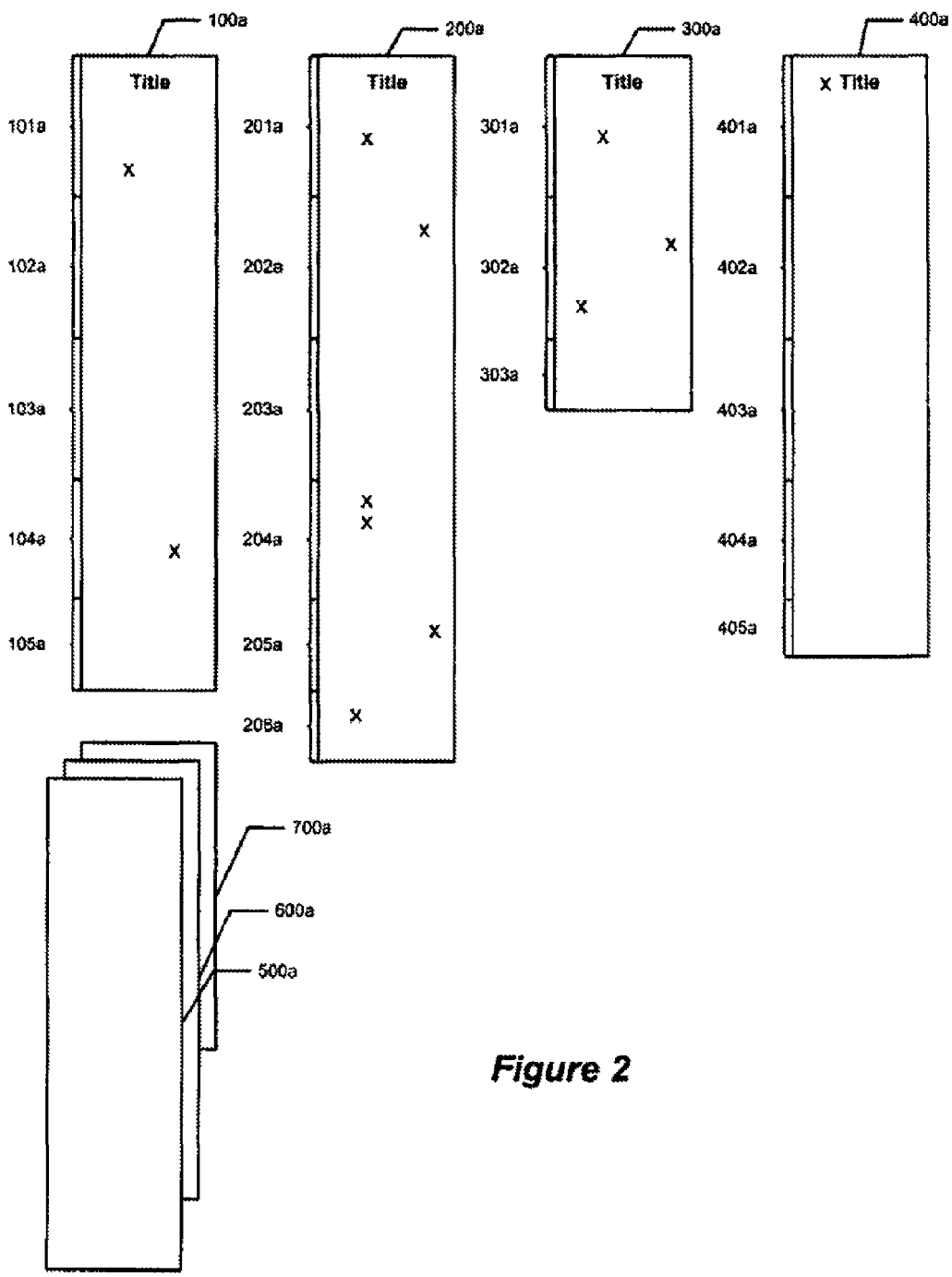
FIG. 2 is a representation of four search documents and three related documents.

In FIG. 2, four documents that might correspond to search documents found as a result of a query are shown. The query may be formulated to find all the documents in a given database that include the phrase "Hadley v. Baxendale." Each X in the search documents 100A, 200A, 300A, and 400A represents an occurrence of the phrase "Hadley v. Baxendale." As can be seen, the phrase "Hadley v. Baxendale" can be found in search document 100A at two separate locations. Document 200A has six occurrences, and search document 300A has three. Search document 400A has one occurrence—the title of search document 400A is "Hadley v. Baxendale."

There are also "related documents" (500A, 600A, and 700A) shown in FIG. 2. A related document is a document that is somehow explicitly associated, linked, or otherwise connected to one of the search documents. For example, if search document 100A is a judicial opinion, a related document might be a subsequent opinion in the same case (e.g., an decision on appeal). Other related documents might be an opinion or scholarly article that cites or discusses search document 100A, or a list of judicial opinions that cite the search document. Any document that is usefully associated with the search document can be considered a related document. Often the related document does not satisfy the query, so it is usually not one of the search documents. In some circumstances, however, the related document might satisfy the query, so it can be a search document.

Related documents may also be related only to a particular view within a search document. For example, a search document that is a judicial opinion may have numerous other judicial opinions cited in the text of the opinion. These cited opinions may be "related documents," but often they relate only to a particular view within the document. Depending on the implementation of the database system, they might not be considered to be "related" to the search document as a whole. Thus, they are available as related documents only when the corresponding cite is within the currently displayed view. In such an implementation, the related documents are dependent on the view shown on the monitor at any given time.

Figure 3:
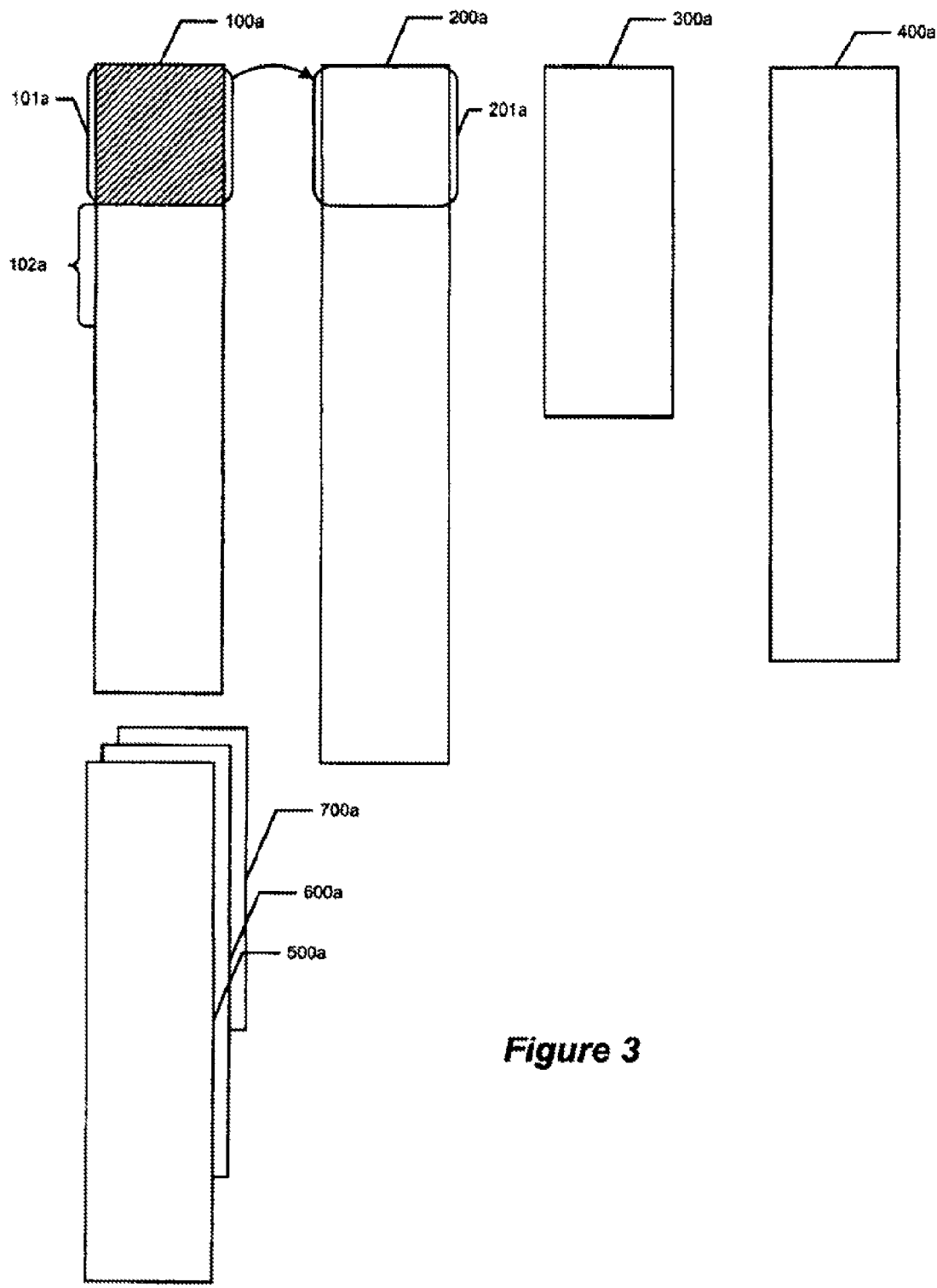
FIG. 3 is a representation of four search documents and three related documents with a display view and one anticipated view designated.

FIG. 3 shows the representation of the four search documents that satisfy the user's query. The search documents are ordered by an ordering characteristic, such as the date of publication. Other ordering characteristics can be used as appropriate for a given situation (e.g., number of query terms in a document, statistical relevance of the documents, type of document, etc.). Any ordering characteristic that permits the search documents to be distinguished from one another can be appropriate. In the example of FIG. 3, search document 100A is the first search document according to the ordering characteristic, and view 101A (shaded) in search document 100A is the display view shown on the monitor. (The view shown on the monitor at any given time is the "display view.") Once view 101A is displayed on the monitor, the user reads, studies or otherwise observes the displayed information. When the user wishes to change the display/view, he or she uses an input device to cause the system to display either (a) a different view in the search document 100A, or (b) a view from one of the other documents 200A, 300A, 400A, 500A, 600A, or 700A.

The user uses one or more input devices to request particular views. For example, an input device might be a keyboard that includes a "next page" key and a "next document" key. The "next page" key requests the next successive view (view 102A) within the document currently being viewed (document 100A). The "next document" view requests the first view (view 201A) of the next successive search document according to the ordering characteristic (document 200A). Many database systems have "next page" and "next document" commands or keys (e.g., Westlaw, LEXIS/NEXIS, and West Publishing Company's CD-ROM products), as well as others (e.g., "previous document," "previous page"). Westlaw also permits a user to request a particular search document or "page" by typing a command. For example, to view search document three (300A), the user types "r3"; to request page 2 (i.e., view 2) within the currently displayed document, the user types "p2." And in some systems, multiple commands can be executed together by separating them with a semicolon, so page two from document three (view 302A) can be requested with a single command: "r3;p2."

In the systems of the prior art, when the database system receives the command to display a different view, the requested view must be loaded from the database before it can be displayed on the monitor or display. Since retrieving information from the database is time-consuming, this loading process is undesirably slow. But in a system employing the present invention, the time required to respond to the user's request for a different view (the "requested view") is reduced by taking advantage of the fact that it is often possible to predict the requested view before the user actually requests it. In the present invention, the view(s) that the user is likely to next request are preloaded while the user is reading the displayed view.

Thus, in one embodiment of the present invention, the view or views (i.e., anticipated view(s)) that are likely to be next requested by the user are "preloaded" (e.g., in the background) to the extent permitted by the time the user spends reading or studying the display view. When the user does request that a different view be displayed (i.e., the user requests a "requested view"), the requested view can be very quickly displayed on the monitor if it has already been preloaded into memory. Thus, if the requested view is one of the anticipated views, the database system is able to quickly respond to the user's request for the requested view.

As shown in FIG. 3, while the user is reading or studying the display view 101A, view 201A is identified as an anticipated view (signified by the arrow from view 101A to view 201A). View 201A is likely to be requested by the user because it is the first view of the "next" search document (as defined by the ordering characteristic) following search document 100A. And while the display view 101A is being viewed by the user, the database system will preload view 201A from the database into memory, before it is actually requested by the user. After view 201A is preloaded into memory, the input device is checked to see if the user has requested that another view be displayed. If the user has requested that a requested view be displayed, the database system checks to see if the requested view has been loaded into memory (e.g., as the preloaded anticipated view). If the requested view is view 201A, it will have been loaded into memory as the anticipated view, so view 201A is retrieved from memory and displayed on the monitor. Since loading the requested view from memory is much faster than loading the requested view from the database, the time required to respond to the user's request for the requested view is shortened dramatically. If the requested view is not in memory, however, it must be retrieved from the database.

Instead of loading the entire anticipated view before checking the input device, in other embodiments of the present invention the input device is monitored during the time the anticipated view is being preloaded into the database. If the user requests a requested view, the preloading of the anticipated view stops and the user's request is serviced. This ensures that the system is very responsive to the user's input. Such an embodiment can be implemented by checking the input device each time a segment (i.e., a portion) of the anticipated view is preloaded. If the computer retrieving information from the database is running a multitasking and/or multithreading operating system, such an embodiment can alternatively be carried out using the various techniques appropriate for such an operating system.

FIG. 4(*a*) shows a situation where view 101A (shaded) is the display view, and the retrieval system has identified four views 102A, 501A, 201A, and 401A as anticipated views. View 102A is likely to be requested by the user when the displayed view is view 101A because it is the next view in the document that the user is currently viewing. View 501A is a candidate for the requested view because it is the first view from a document (500A) that relates to the search document (100A) that the user is currently viewing. View 401A is also an anticipated view because the user might wish to view the document that represents the opposite extreme of the ordering characteristic (e.g., the oldest document). And as described above, view 201A is also likely to be requested by the user.

Figure 4A:
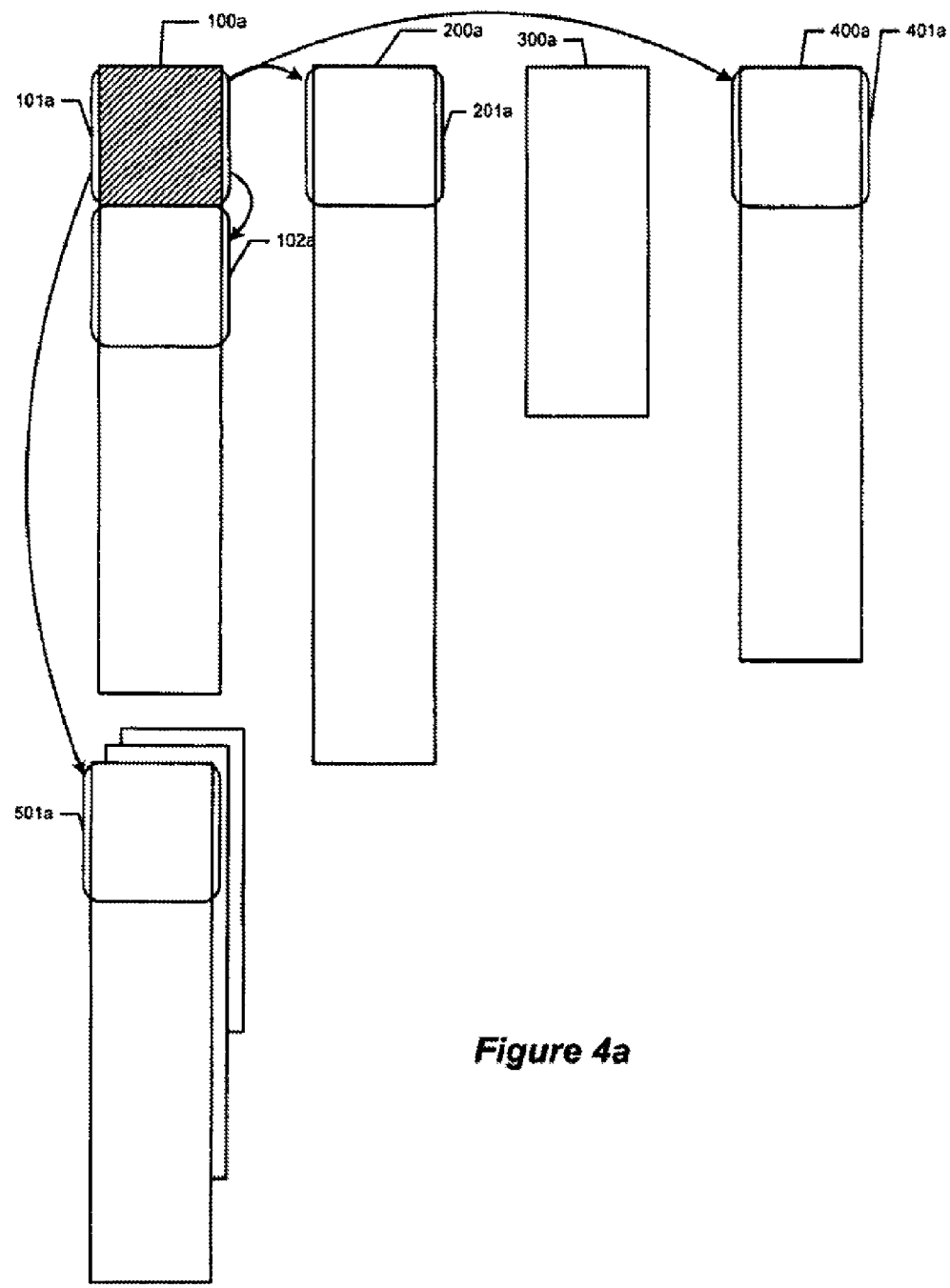
FIGS. 4(a) and 4(b) are each a representation of four search documents and three related documents showing a display view and four anticipated views.

In the embodiment of FIG. 4(a), the retrieval system will attempt to load as many of these anticipated views as possible while the user is studying the display view 101A. If enough time passes before the user requests a requested view, the retrieval system may preload all four of the anticipated views, thereby enhancing the likelihood that the next requested view will be in memory.

Figure 4B:
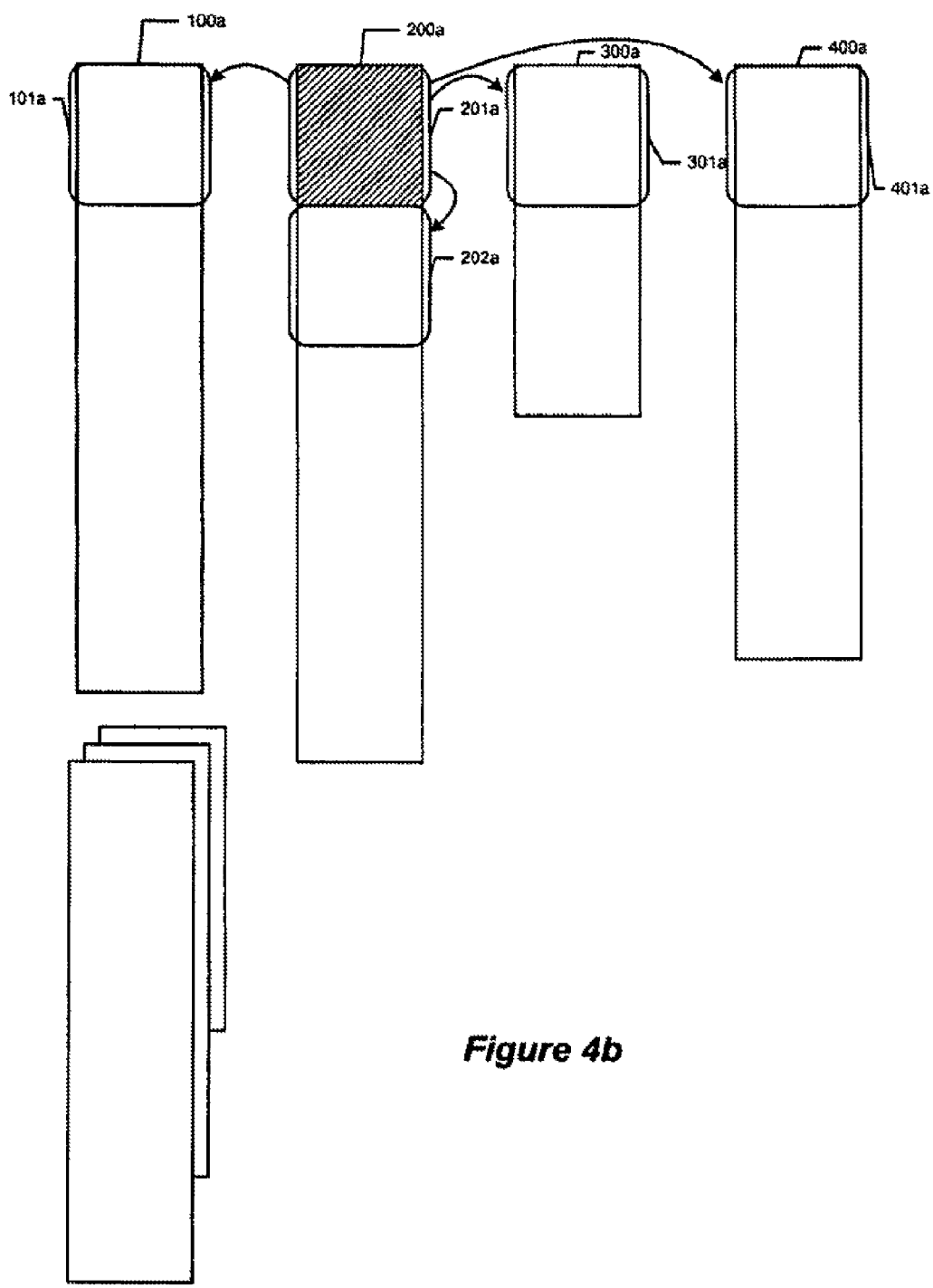

Once the user issues a request for a requested view, the requested view is loaded from memory (or from the database, if necessary) and displayed on the monitor. The process of determining and preloading anticipated views then starts over. For example, if the requested view is view 201A, the display view will then become view 201A (shaded) as shown in FIG. 4(b). The anticipated views would also change, and might be identified as indicated by the arrows.

Figure 5A:
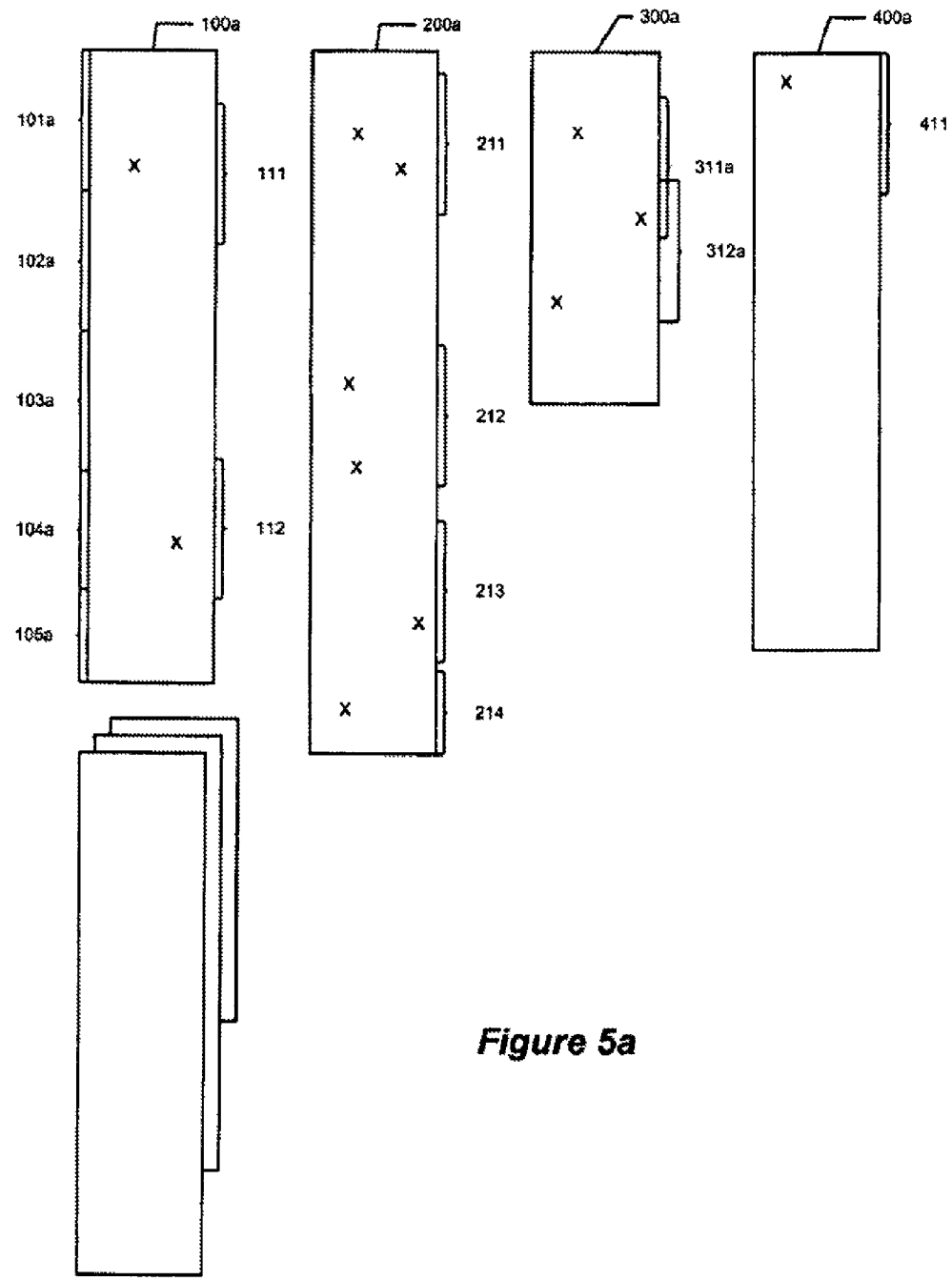
FIGS. 5(a) and 5(b) are each a representation of four search documents and three related documents showing various term views.

FIG. 5(a) shows another representation of four search documents showing term views 111, 112, 211, 212, 213, 214, 311A, 312A, and 411. In FIG. 5(a), a term view is a view that has at least one search term from the query. And as can be seen from document 100A in FIG. 5(a), the boundaries of these term views may or may not correspond to the boundaries of views 101A, 102A, 103A, and 104A. Term views may also be anticipated views because the user might request as a requested view the next view having one or more of the terms in the query. Some systems provide a command for this purpose (e.g., in Westlaw, the command is "t").

Figure 5B:
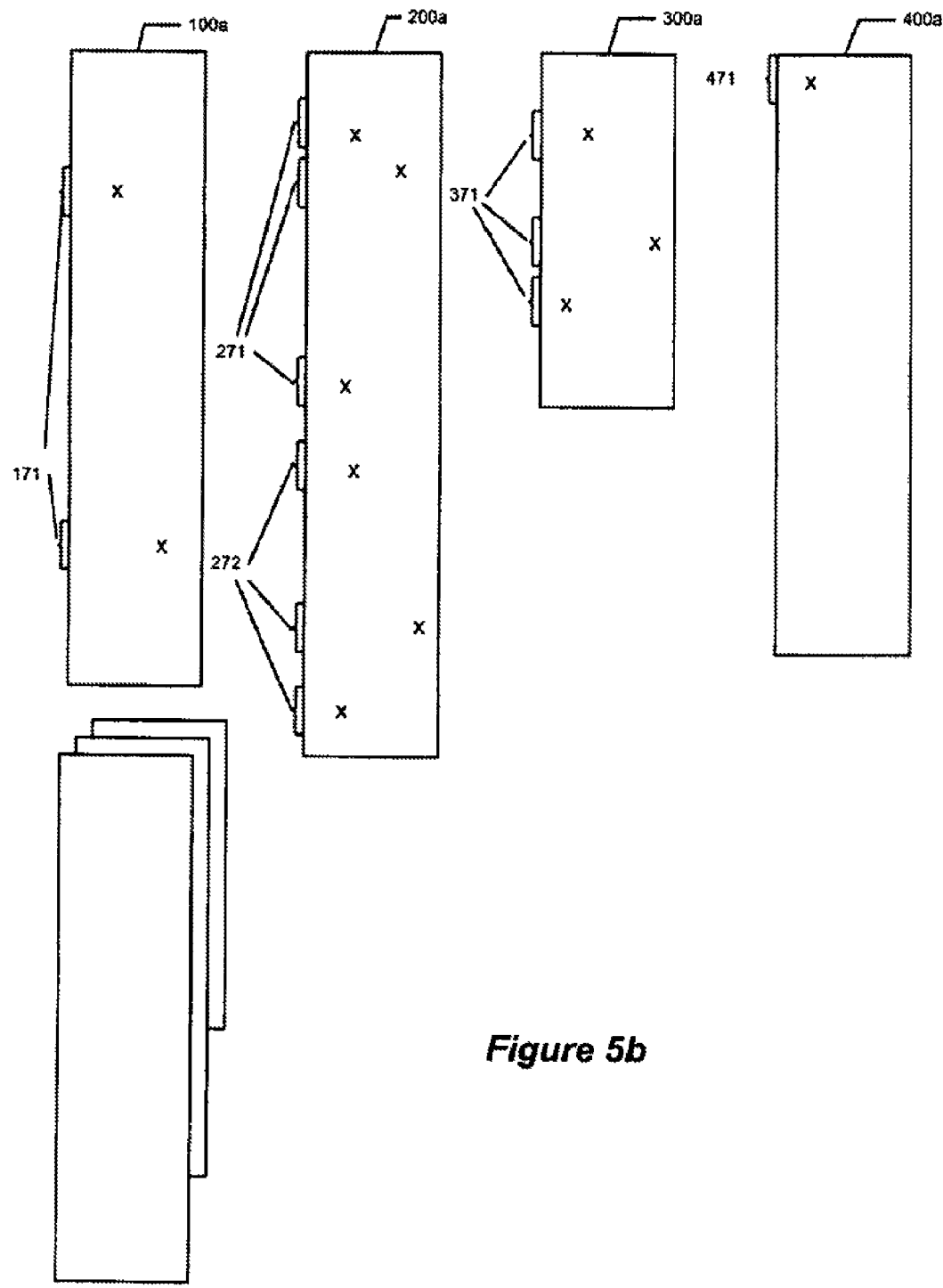

FIG. 5(b) shows the representation of the four search documents showing other term views 171, 271, 272, 371, and 471. These term views are made up of a small number of words surrounding each occurrence of a search term in the search documents. Since the number of words surrounding the search terms is small, more than one set of words can fit on the screen at a given time. Thus, the term view in this embodiment includes information from different parts of the document. The "KWIC" display format in the LEXIS/NEXIS system operates similarly.

Figure 6:
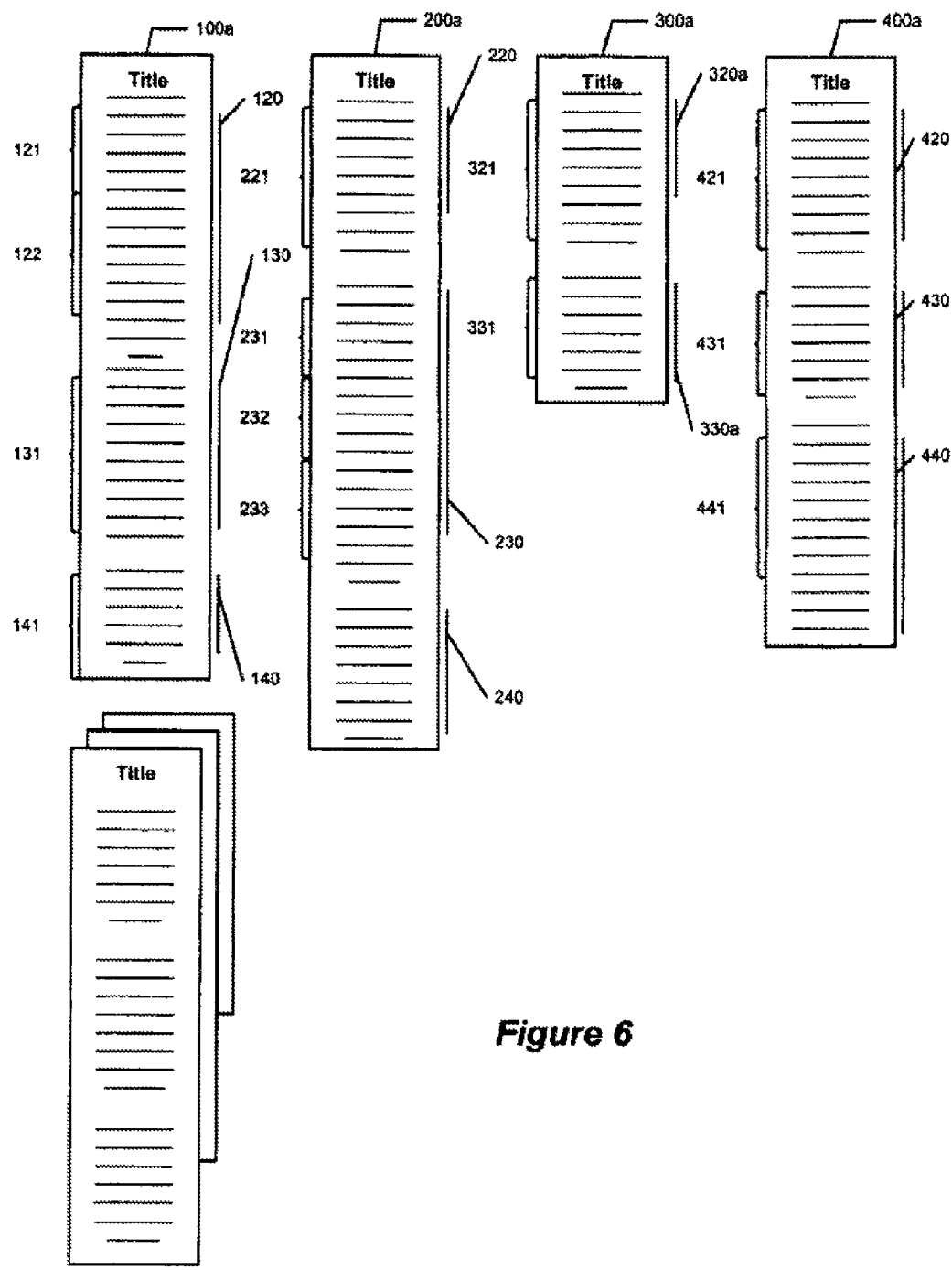
FIG. 6 is a representation of four search documents and three related documents showing various subdocument views.

FIG. 6 shows another representation of the four search documents showing subdocument views 121, 122, 131, 141, 221, 231, 232, 233, 321, 331, 421, 431, and 441. The subdocuments are shown in FIG. 6 as 120, 130, 140, 220, 230, 240, 320A, 330A, 420, 430, and 440. A subdocument is any logically separable or identifiable portion of a document.

For example, if a document is a judicial opinion, there might be subdocuments for the title and citation for the case, for each of the headnotes, for the opinion itself, and for any dissenting opinions. A subdocument view is a view within a subdocument.

Subdocument views may be anticipated views because the user is often particularly interested in a particular portion of the search documents. If the search documents consist of a series of judicial opinions, for example, a user may only wish to view, for each of the search documents, the subdocument for the majority opinion (and not the headnotes, dissenting opinions, etc.). Thus, it may be appropriate for the anticipated views to be drawn primarily from a particular type of subdocument.

In other situations, however, the user may only wish to see the first subdocument view for each subdocument. It would be appropriate in these situations for the anticipated views to be primarily the first views from the various subdocuments within each document.

The retrieval system of the present invention identifies anticipated documents by focussing on the current display view. The current display view gives clues as to which view might be requested by the user because the display view identifies the user's progress in browsing the search documents. In other words, the current display view identifies which search document in the sequence of search documents is currently being viewed. This information is useful because the search document immediately following and preceding the current search document (as defined by the ordering characteristic) is often the search document next requested by the user.

The view displayed just prior to the displayed view might also be a consideration in determining the anticipated views if it tends to show a pattern that can identify the user's next requested view. For example, referring to FIG. 6, if the user requests view 131 of search document 100A, and then requests view 231 of search document 200A, the retrieval system can consider these two consecutive display views and determine that an appropriate anticipated view is view 331 of search document 300A. View 331 is the first view of subdocument 330A, which could be the same type as subdocuments 130 and 230, the two subdocuments previously viewed by the user. Since the goal is to accurately predict the next view, considering the views that the user requested in the past may be helpful if it tends to identify the views that the user will request in the future.

In general, any appropriate adaptive prediction scheme can be used that uses the user's history of requested views (and display views) to accurately determine which views are likely to be next requested by the user. It might be appropriate in some cases to consider many display views in determining appropriate anticipated views. Longer histories may tend to identify patterns that would not show up if only a small number of recent display views are considered.

Tendencies can even be monitored over more than one research session in situations where a particular user or group of users tend to request views in a particular pattern each time research is done. In addition, the user could be prompted to indicate the type of research being undertaken, which may give clues as to what type of anticipated views are appropriate for efficient operation. Finally, the particular databases used or type of research being done can be monitored by the database system and advantageously taken into account in determining anticipated views.

In the preferred embodiments of the present invention, the anticipated views are drawn from both related documents and search documents. A fundamental distinction between related documents and search documents is that related documents are statically-related to the search documents, whereas search documents are dynamically-related to one another. This difference is significant because unlike statically-related documents, no predefined link needs to be set up for search documents. A statically-related document is always associated with a particular document, regardless of the query (the related document is therefore statically-related). The search documents, on the other hand, are related to each other by the query. Since the query changes with each search, the search documents are considered dynamically-related to one another.

Some of the recent CD-ROM products have implemented features such as hyperlinked text, and timeline-linked text (clicking on a timeline item will take the user to a relevant article). See The Top 100 CD-ROMs, PC Magazine, Sep. 14, 1994, p. 115. Links of this nature are static because they always apply and do not depend on any particular query run by the user.

The search documents are ordered by an ordering characteristic as described previously. Thus, when a "next document" is requested, it is assumed that the search document requested by a "next document" command is the search document that is "next" according to the ordering characteristic. If the search documents are ordered by publication date, for example, the "next document" will be interpreted as a request for the search document with the next oldest publication date.

Figure 7:
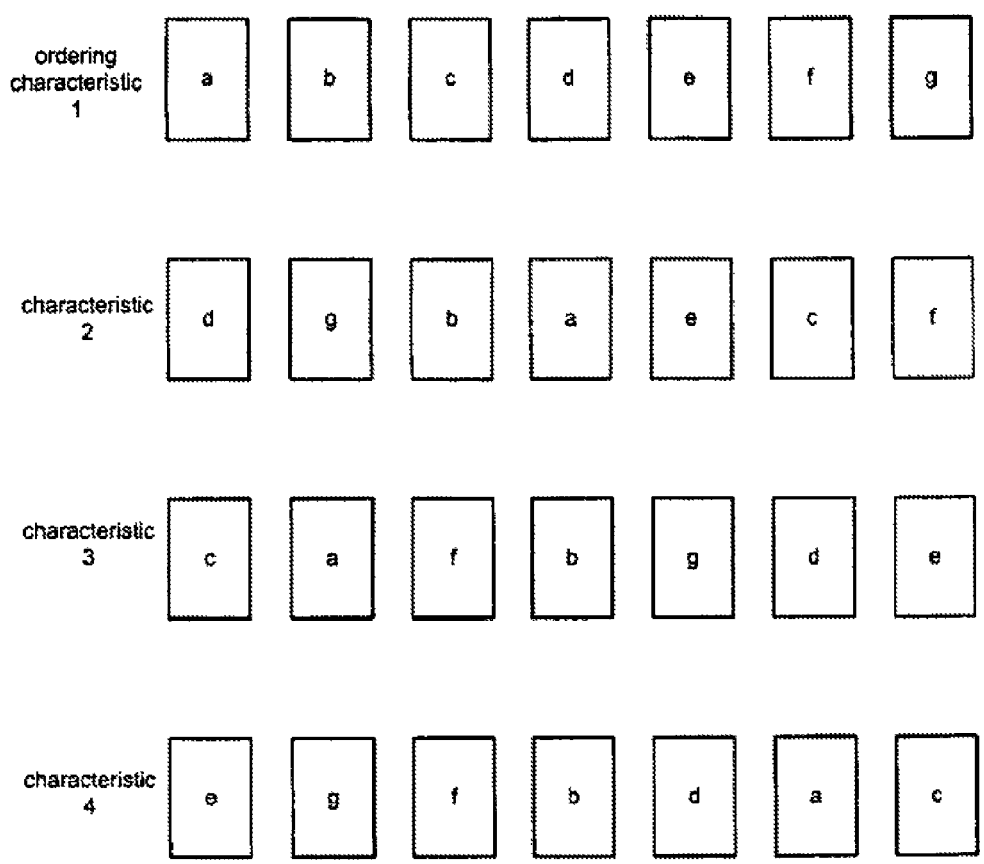
FIG. 7 shows seven documents ordered according to four different ordering characteristics.

In one embodiment of the present invention, it is possible to make a number of different ordering characteristics available for use by the user in browsing the search documents. For example, FIG. 7 shows seven documents labeled "a" through "g" ordered according to four different ordering characteristics. When the display view is in document "a," the "next document" command can be a request for four different documents (i.e., "b," "e," "f," or "c"), depending on the particular ordering characteristic used. More than one ordering characteristic must therefore be considered when determining anticipated views if the user is capable of moving to a "next document" in the context of more than one ordering characteristic. This feature can be enabled by an input device command that allows the user to select the desired ordering characteristic.

The present invention is applicable to single-user, multiple-user, and many-user databases, but the present invention is most effective when used in connection with single-user databases. The efficient operation of the invention depends on being able to retrieve data from the database very frequently, perhaps continually. The present invention is quite effective with single-user databases such as those on CD-ROM or other mass storage devices (this might also include a hard drive implementation). In a single-user database, no other demands are being made on the database by the other users, so the database is often idle.

But since a many-user or multiple-user database must be shared among more than one user, such a database will often be receiving simultaneous and continual requests for data. Databases in such a system are rarely idle, so there is little time to preload anticipated views into memory. In such a situation, the present invention will not be as effective in improving the response time to users' requests for requested views. But in many-user or multiple-user database systems where the database is not as busy, the present invention can be effective in reducing response times to users' requests for information.

Figure 8:
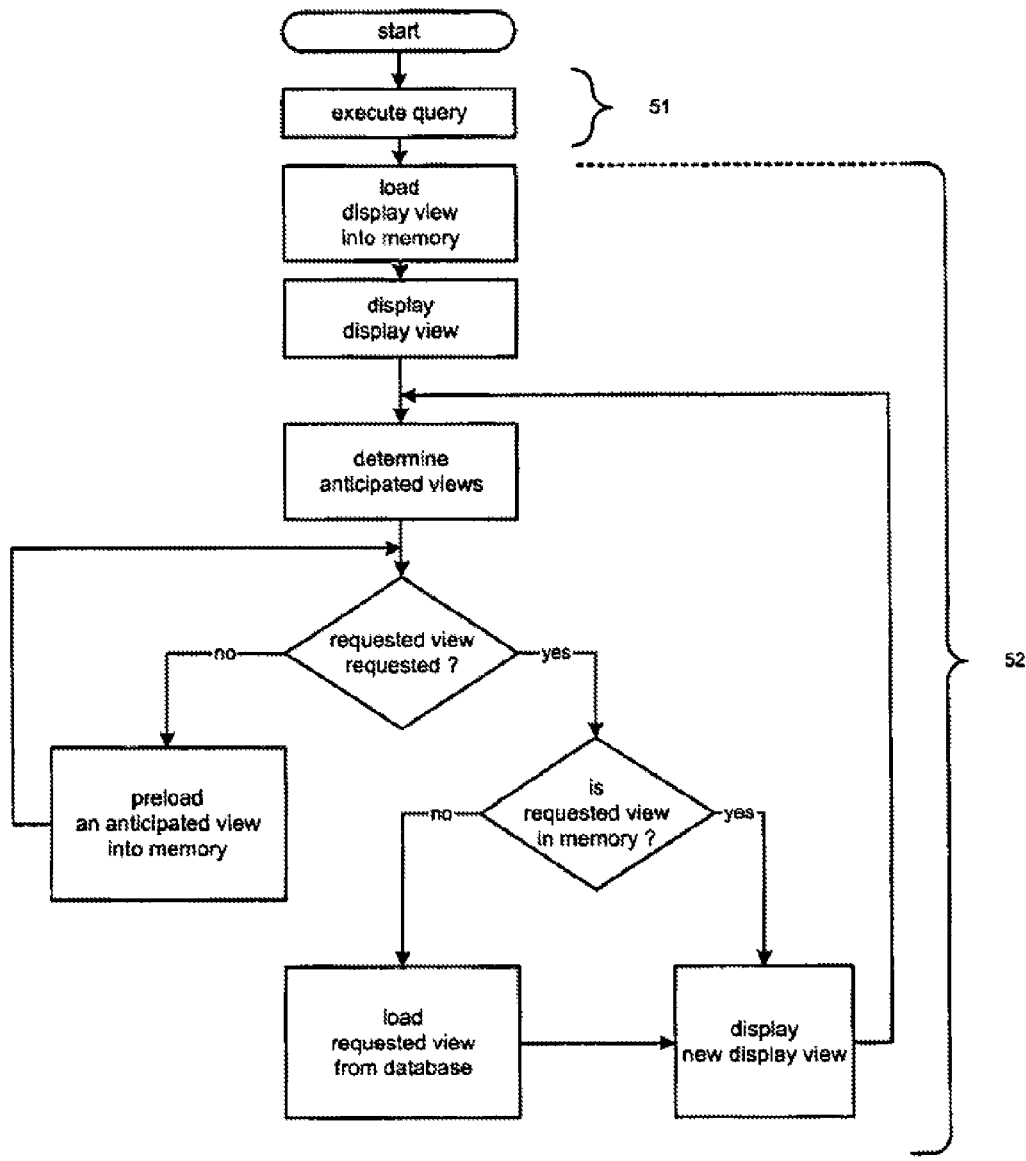
FIGS. 8, 9, and 10 are flow charts illustrating alternate embodiments of the present invention.

FIG. 8 is a flow chart of the operation of the database system in one embodiment of the present invention. A system in one embodiment of the present invention begins by executing a query to identify the search documents. This step is carried out by search logic 51. The remaining steps shown in FIG. 8 (described below) are carried out by retrieval logic 52.

Both the search logic 51 and the retrieval logic 52 are often software, but need not be. As one skilled in the art will recognize, in a software implementation the search logic 51 and the retrieval logic 52 may or may not be integral or intertwined parts of the same computer program.

As dictated by the retrieval logic 52, the database system then loads into memory a view from one of the search documents. See FIG. 8. This first display view is then displayed on the monitor. Normally the user will take a few moments to read or study the display view. During this time, one or more anticipated views are identified. The anticipated views are views that the user is likely to request be displayed on the monitor after the display view.

The database system then begins to preload these anticipated views into memory from the database, while also continually monitoring the input device to determine if the user has issued a request to display a different view (i.e., a "requested view") on the monitor. Anticipated views are loaded into memory until the user requests a requested view.

When the user does makes such a request, the database system then determines whether the requested view is in memory. The requested view may be in memory because it could have been preloaded into memory as an anticipated view. If the requested view is in memory, the requested view becomes the new display view, and it is displayed on the monitor. But if the requested view is not in memory, the requested view must first be loaded from the database before it can be displayed on the monitor as the display view.

The anticipated views are a function of the display view because the views that the user is likely to request depend to some degree on the view the user is currently reading. In other words, those views that are anticipated views when view 101A is the display view are not likely to be the same as the anticipated views when view 202A is the display view. Therefore, as shown in FIG. 8, the anticipated views are determined each time the display view changes.

When the display view is changed, the anticipated views for the prior display view can remain in memory so that they are available if they are ever requested by the user. But if memory is limited, the anticipated views for the prior display view can be deleted from memory, preferably in an efficient matter (e.g., anticipated views common to both the new display view and the prior display view are not deleted from memory). It is best to delete those views that are not likely to be requested by the user. It may also be appropriate to consider whether a view is likely to become an anticipated view in the future.

Figure 9:
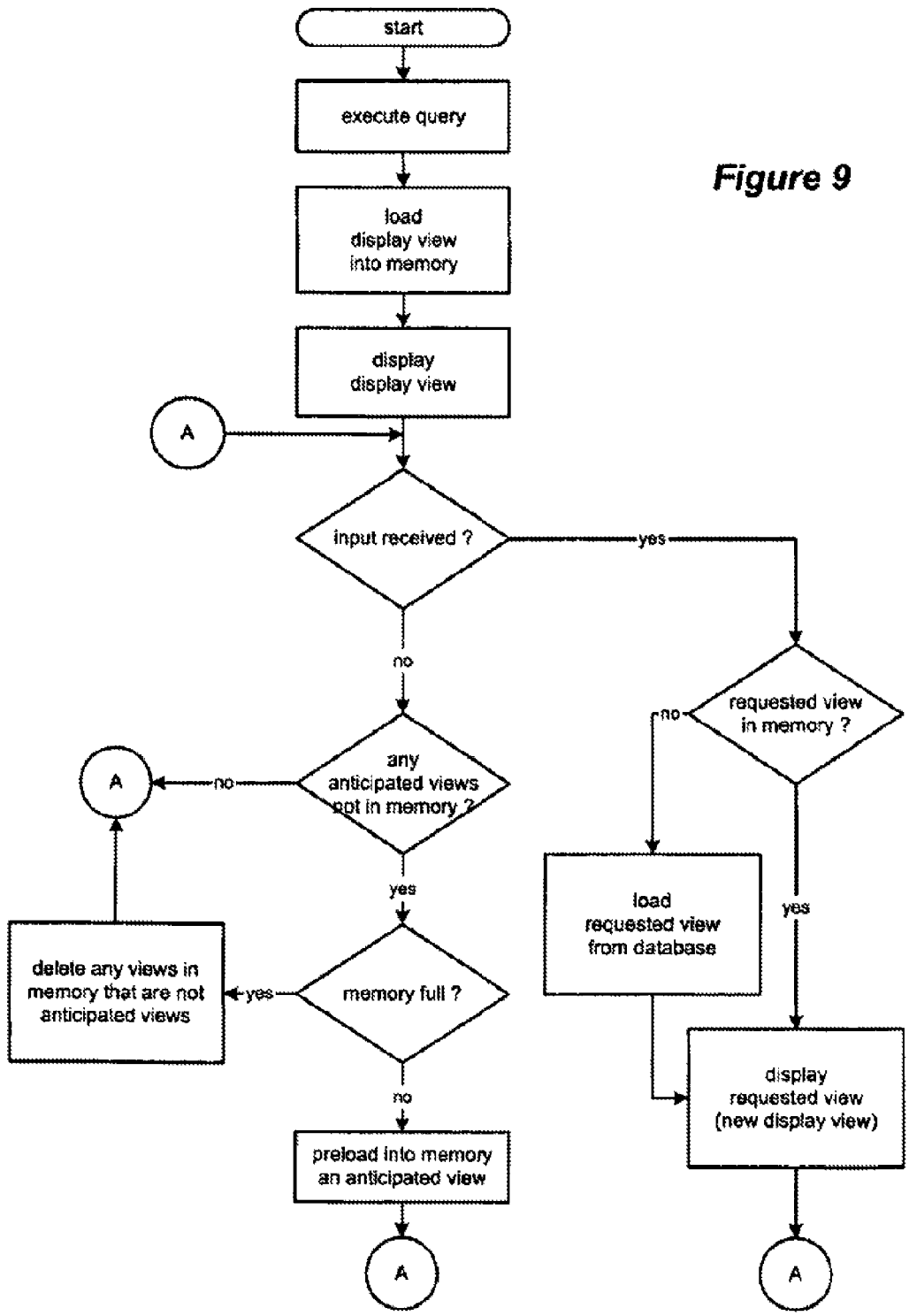

FIG. 9 shows a flow chart representing another embodiment of the present invention where anticipated views from prior display views are deleted if memory is full. The views deleted are those that are not anticipated views for the new display view. This will presumably make room for new anticipated views to be preloaded into memory (if not all of the anticipated views are already in memory).

The number of anticipated views for a given display view does not have to be a predetermined or constant number, but rather can vary depending on memory available. Typically, the number of anticipated views for a display view is a trade-off between the amount of memory available and the desired speed of retrieval. In instances where memory is plentiful, where the number of search documents is few, and/or where the search documents are small, it may be possible for all of the search documents to be completely loaded into memory. In such a situation, the number of anticipated views for a given display view could be as high as the total number of views in the search documents. At the other end of the spectrum, there might be only one or two anticipated views for each display view if memory is limited.

Embodiments of the present invention can vary as to how anticipated views are preloaded into memory. In the embodiments of FIGS. 8 and 9, one anticipated view at a time is preloaded into memory, and the retrieval system does not begin preloading a second anticipated view into memory until the prior anticipated view is completely preloaded into memory. In other embodiments, anticipated views are simultaneously preloaded.

Simultaneous preloading of multiple anticipated views can be done in a number of ways. In a multitasking operating system, for example, an appropriate time-slicing procedure can be used to preload the anticipated views so that they are preloaded simultaneously. In another embodiment, one segment from each anticipated view is preloaded in turn, and the cycle is repeated until all the anticipated views are fully preloaded into memory (or until the user's request for a requested view interrupts the preloading process). A segment is any portion of an anticipated view, such as one or two lines or even a single byte of the anticipated view.

Figure 10:
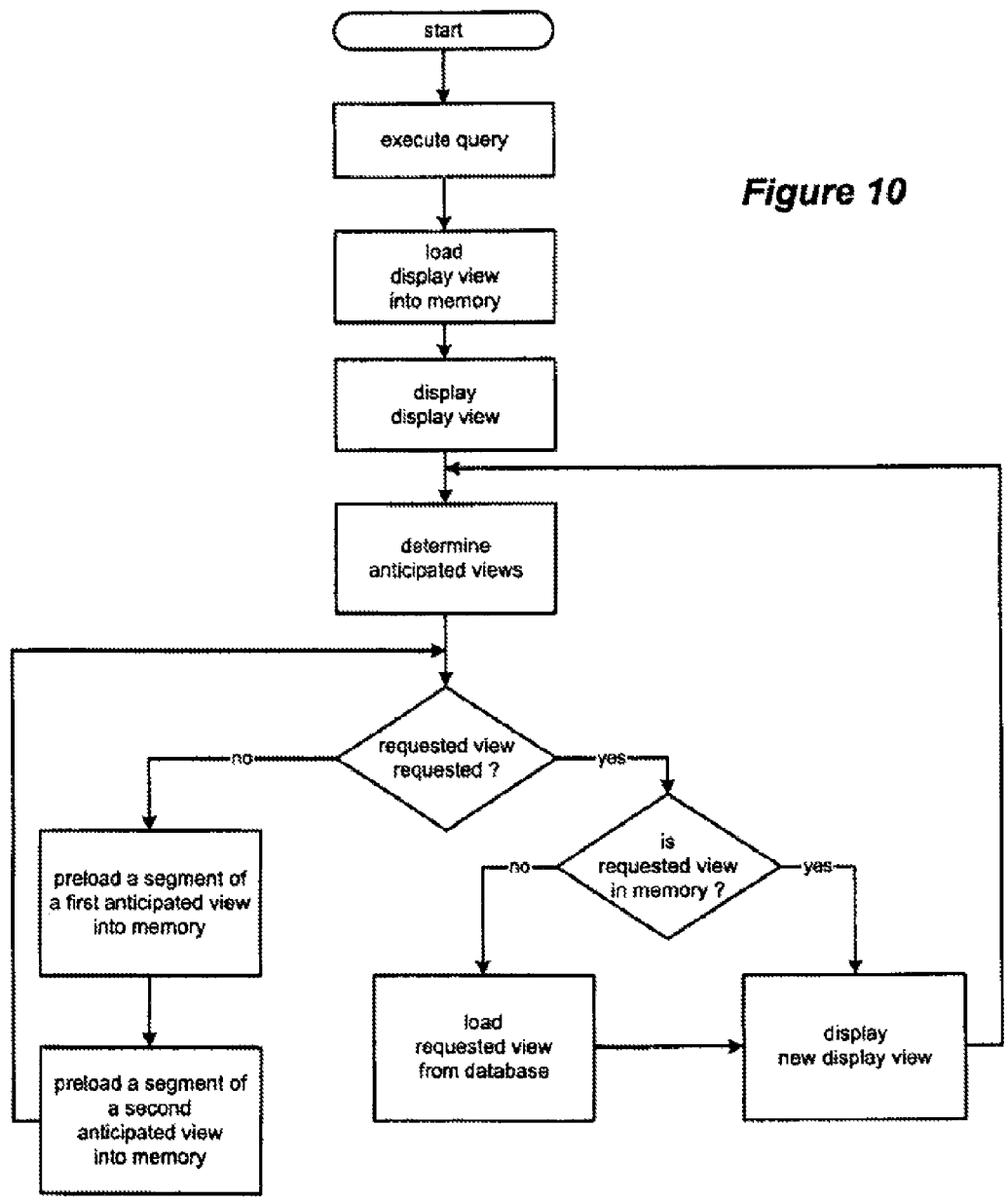

FIG. 10 shows a simple implementation of the simultaneous preload concept, where the database system preloads a segment of a first anticipated view into memory, and then preloads a segment of a second anticipated view into memory. These steps continue until either the user requests a requested view, or both anticipated views are fully preloaded into memory. When the user requests a requested view, the database system checks to see if that requested view is in memory. If the requested view is only partially preloaded into memory, that portion in memory can be written to the monitor and the remaining portion loaded from the database. The response time in this situation will still be better than if the entire requested view has to be loaded from the database.

Figure 11:
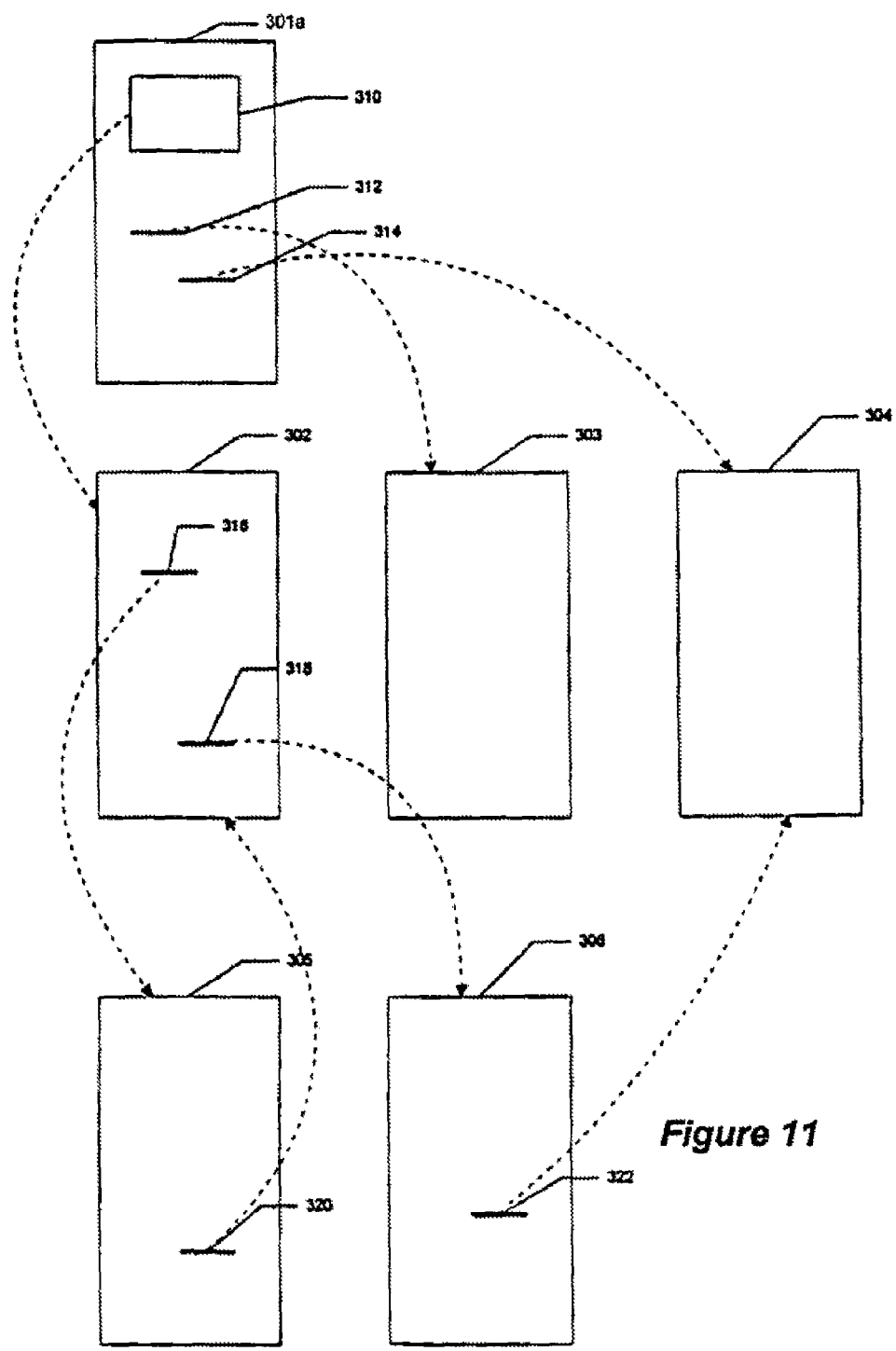
FIG. 11 is a diagram of the relationships between six statically-related documents.

In another embodiment of the invention, the use of profile information is employed to assist in the selection of views or documents to preload, as illustrated in FIGS. 11-12, 13a-13e, and 14-16. For example, FIG. 11 is a diagram of the relationships between six objects or documents 301-306. The six documents are linked to each other in the manner shown and hereinafter described. Document 301 contains three links (310, 312, and 314); one to each of the documents 302, 303, and 304. Document 302 contains two links, one link 316 to document 305, and another link 318 to document 306. Document 305 contains a link 320 back to document 302, and document 306 contains a link 322 to document 304. Each of these documents is stored on a server within a network, and may incorporate or have embedded within it objects stored on other servers. The documents 301-306 may be stored on the same server, or may be stored on various computers distributed throughout the network.

Figure 12:
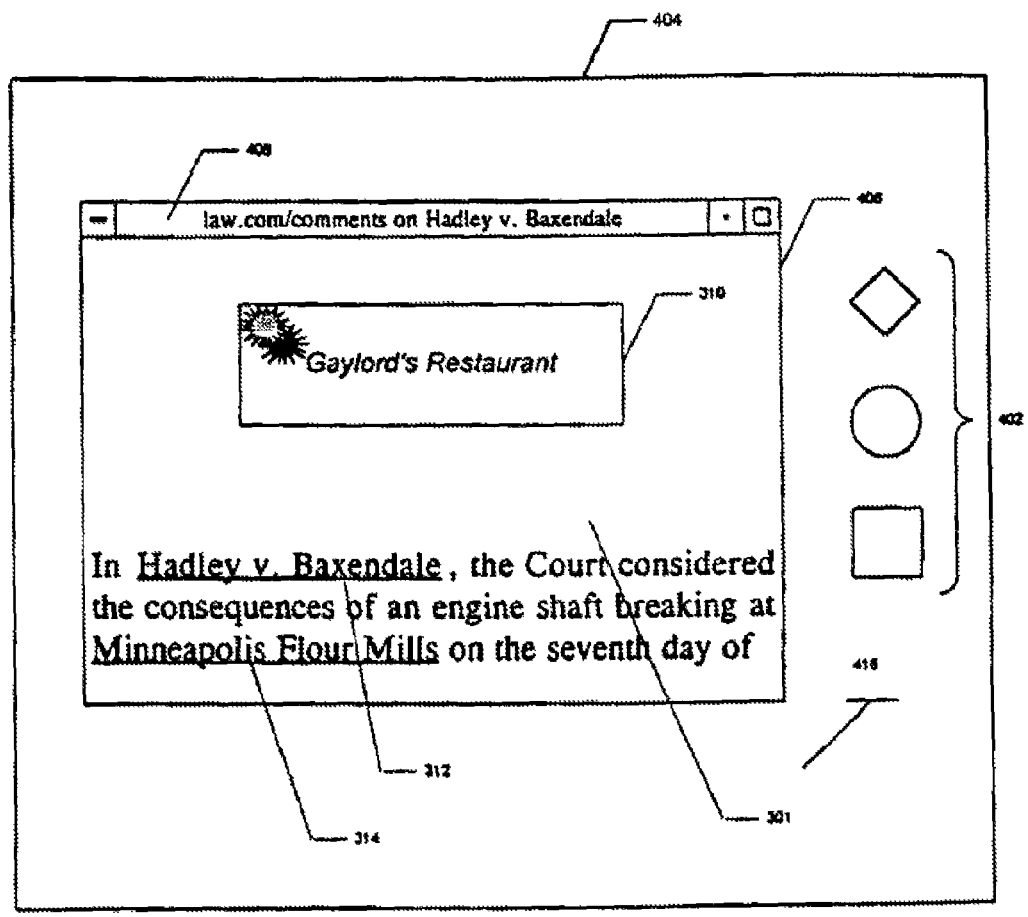

FIG. 12 shows a representation of a video display screen 404 for a computer such as that of FIG. 1. The area 404 represents the area on a screen within which images, text, video, and other types of data or multimedia objects can be displayed and manipulated. On the display 404 shown in FIG. 12, a number of icons or objects 402 are arranged, along with another type of object, window 406. The window 406 is a representation of a document retrieval, browsing, and/or viewing program that is used to view information either stored locally on the computer or retrieved over a network. The window 406 has a title area 408 that displays the title of the document being displayed. The title area 408 could also display the location or address of the document being displayed, or also the universal resource locator of the document being displayed. Alternatively, an additional area within the window could be used for displaying the universal resource locator. The contents of the document are shown in displayed within the window 406 in FIG. 12, but it should be understood that the contents could be displayed in other ways. For example, the contents could be displayed on the entire desktop, or a portion of the desktop. In another embodiment, the contents might be scrolled on the screen, perhaps under other windows. In addition, it should be understood that where a document has only a single view, or is treated as having only a single view, the "document" essentially becomes the same as the "view." In such a situation, a scroll bar (not shown) may be used to allow a user to effectively expand the size of the display, thereby allowing the user to see the entire document/view.

Shown within the document viewing area of the window 406 in FIG. 12 is the contents of the document 301 from FIG. 11. The document 301 has been displayed in the window 406 in response to a user query, which might involve a key word search or might involve the user specifying the identity, address, or resource locator of document 301. The document 301 could be also be displayed within the window 406 in response to the selection of a link in another document (not shown) that points to the document 301.

Figure 13A:
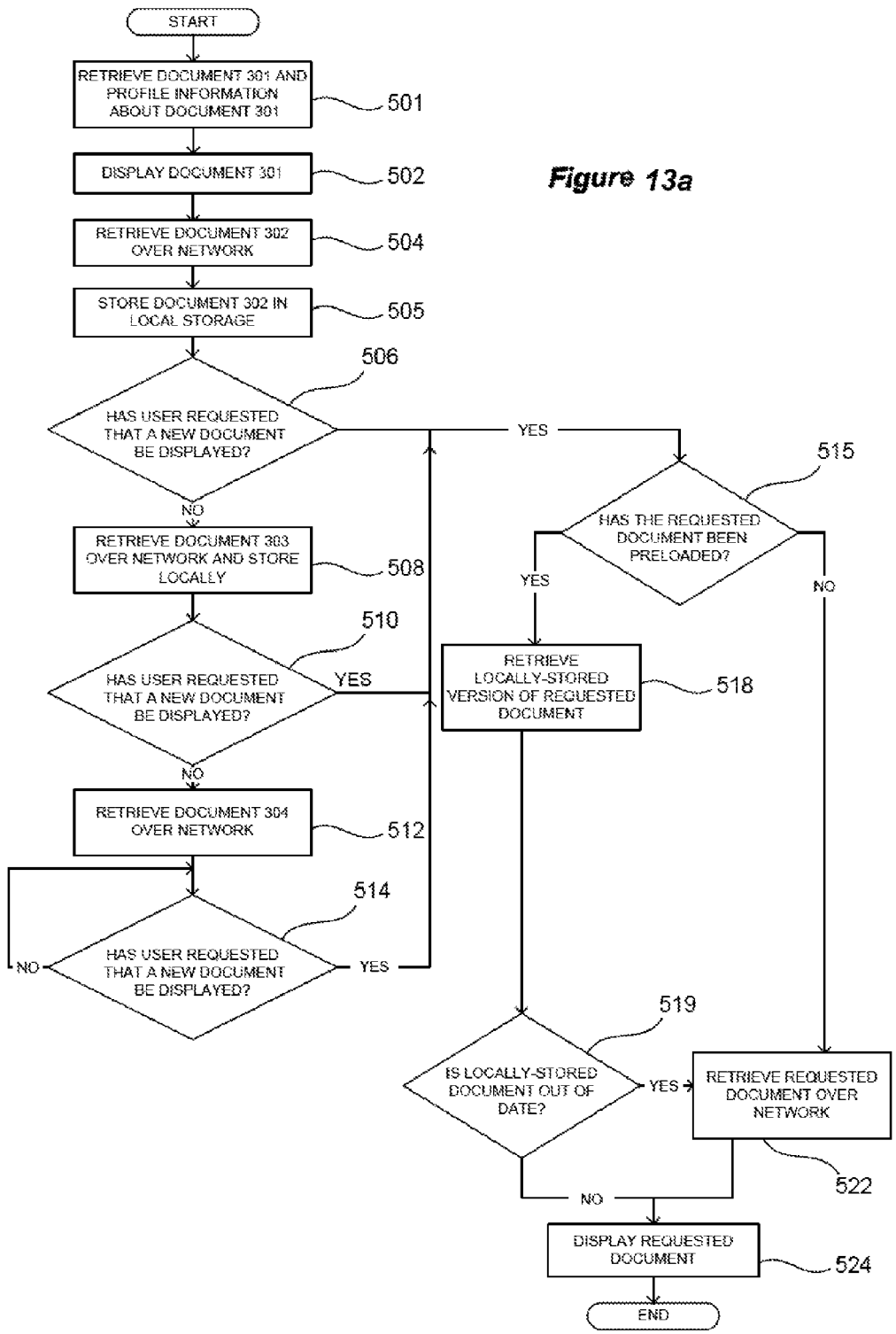
FIGS. 13a, 13b, 13c, 13d, and 13e are flow charts illustrating the operation of embodiments of the present invention.

FIG. 13a is flow chart representing the operation of one embodiment of the present invention in which profile information is used to assist in the selection of documents to preload. In FIG. 13a, the documents 302 and 303 are assumed to be stored on the network on a (preferably) remote database server. At 501 in FIG. 13a, document 301 is retrieved from the server by a document retrieval program that executes on a client computer, such as, for example, the computer 257 in FIG. 1b. The document 301 may be stored on any of the other computers shown in FIG. 1b, including computer 257. Along with the document 301, the document retrieval program retrieves profile information that is preferably (but not necessarily) embedded within or is stored with document 301. The profile information can be used to provide information about document 301, including information about documents that are related to document 301, as described below.

At 502, the document viewing program renders document 301 in the window 406, as shown in FIG. 12a. Once document 301 is retrieved, the viewing program begins at 504 retrieving from the network the document 302. During this time, document 301 continues to be displayed in window 406, and the user is free to read, scroll through, or otherwise interact with the document 301 shown in the window 406 in FIG. 12a. Thus, document 302 is retrieved over the network (504) and stored into the memory or local storage (505) while the user is viewing document 301.

After document 302 has been retrieved, if the user has not requested (e.g., through the input device) at 506 that another document be displayed, the document viewing program at 508 retrieves document 303 over the network, and this document is then stored in memory or local storage. The document 301 is still displayed in the window 406 at this point. If the user still has not requested that another document be displayed at 510, the document 304 is retrieved from the network and stored in memory or local storage by the document viewing program in 512.

At 514, the document viewing program in the embodiment of FIG. 13a stops preloading documents, and waits until the user requests that a new document be displayed. When the user does request that a new document be displayed in the viewing program at 514, the viewing program determines at 516 whether the requested document is one of the documents that has already been retrieved and stored in local storage. If so, then the locally-stored version of the requested document is retrieved from memory or local storage at 518. The locally-stored version of the requested document is then checked at 519 to see if it is out of date. If the requested document has content that may change often, it may be that the version of the requested document that is stored in local storage is not sufficiently new and is out of date or "stale." This condition can be determined by monitoring the amount of time since the document was originally preloaded, or by inspecting the time stamp on the requested document stored on the network and comparing it to the time stamp for the locally-stored version to determine whether the locally-stored version has changed.

If the locally stored version of the requested document at 519 is not out of date, then it is displayed at 524. If the preloaded version at 519 is out of date, or if the requested document has not been preloaded at all (516), then the requested document is retrieved over the network and is displayed at 524.

In another embodiment, the document viewing program may continue preloading additional documents at 512 in FIG. 13*a*. For example, the document viewing program could begin to preload the documents that are linked to by the documents that are already preloaded (i.e., documents 302, 303, and 304). In the set of documents shown in FIG. 11, this would mean that the document viewing program would download over the network additional documents 305 and 306. Thus, the present invention need not be limited to the preloading of only a single level of linked documents, but rather, could extend to the preloading of two or more levels.

As described in connection with FIG. 13*a*, the document viewing program retrieves over the network documents 302, 303, and 304 while the user is viewing document 301. And as shown in FIG. 13*a*, document 302 is preloaded first, followed by document 303, and then by document 304. In some embodiments, the document viewing program executing on the client computer in FIG. 13*a* uses the profile information to determine the order in which the documents 302, 303, and 304 are to be retrieved. In other words, in some embodiments, the database server determines the order in which the document viewing program executing on the client preloads the links within document 301. This procedure can be quite effective because the database server may have useful information that can help to predict the documents that the user will request be displayed at the client computer. For example, a server that keeps track of the frequency that users select the links within document 301 may find that one or two links are selected very often, whereas other links are selected rarely. The server can use this information to instruct the client as to the most efficient order in which to preload documents.

FIG. 14 is a chart illustrating one example of the type of profile information that could be provided with document 301 at 501 of FIG. 13*a*. As shown in FIG. 14, for each of the documents identified in the profile information, the historical percentage of users that have selected the document are identified. The first three documents (302, 303, and 304) are documents that are linked to by the document 301 as shown in FIGS. 3 and 4. The fourth document (document 319) is not linked to or otherwise related to document 301, but the profile information nevertheless tells us that 2% of the people request document 319 when document 301 is displayed. Thus, the profile information tells us that document 302 is, historically, the most likely document to be selected. The document viewing program can use this information to ensure that document 302 is preloaded when document 301 has been rendered in the window 406 because at least according to this statistical information, document 302 is likely to be requested by the user who is viewing (or who has at least retrieved) document 301.

Other data that might be included in the document profile might be the server or database in which each document is stored. This information is shown in FIG. 14, and identifies the document 302 as being from the server "gaylords.com," and document 303 as being from the "same" database server, which means the database server from which document 301 has been retrieved. Normally, the profile information of FIG. 14 would be stored in a particular format or data structure, or even as source code, and either embedded within the document 301, or downloaded by the document viewing program along with the document 301.

In operation, the server sends to the document viewing program the information of FIG. 14, and the document viewing program can choose to ignore it, or could choose to act upon it in some way. Thus, the document viewing program in one embodiment engages in some form of interpretation of the profile information and it exercises some control over how the information is used. In another embodiment, however, the profile information could simply consist of a list of documents that the document viewing program uses to select what documents to preload. The list of documents might be ordered so the document viewing program could determine relative priorities among the documents, but the document viewing program may not engage in interpretation of any statistical data or other data sent from the server. Such an embodiment may be implemented by actually programming a program embedded within a document to retrieve certain documents, thus effectively hard-coding the documents that are to be preloaded. Another embodiment may use a program embedded within an object or a document that reads a parameter list and uses the parameter list to select the documents to be preloaded. Where the profile information is not used, some type of predefined procedure could be followed for selecting documents to preload, and this procedure may involve preloading the documents that are linked to by the document 301 (the displayed document).

Figure 15:
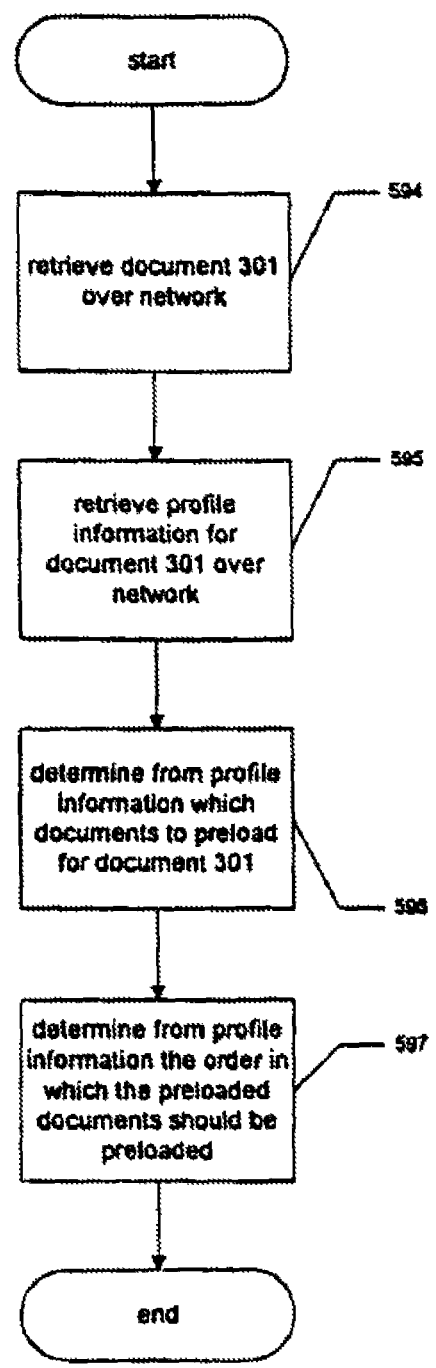
FIG. 15 is a flow chart illustrating how profile information can be used in an embodiment of the present invention.

FIG. 15 is a flow chart which illustrates how the profile information might be used in an embodiment of the present invention. At 594, the document 301 is retrieved over the network, and at 595, the profile information for document 301 is retrieved over the network. The profile information is then analyzed at 596 to determine which documents to preload when document 301 is being displayed. At 597, the profile information is further analyzed to determine the order in which the documents identified at 596 should be preloaded. Thus, in this embodiment, the profile information not only identifies the order in which to preload documents, but also identifies at 596 the documents that are to be preloaded.

Figure 13B:
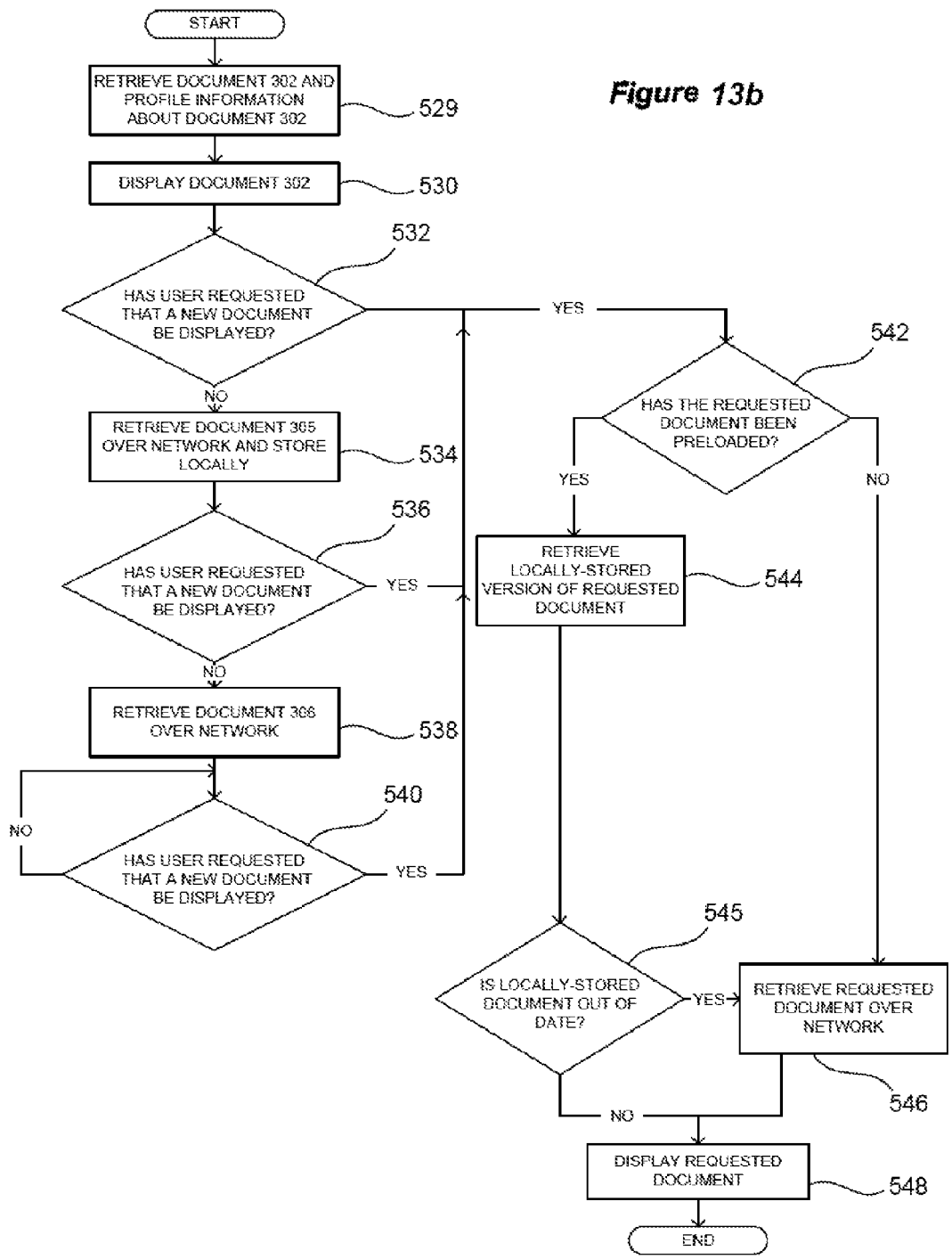

FIG. 13*b* is a continuation flow chart of FIG. 13*a*, where the user has requested that document 302 be displayed. In other words, the requested document at 516 of FIG. 12*a* is document 302. Thus, initially in FIG. 13*b* the document 302 and associated profile information associated with document 302 is retrieved at 529 and then displayed at 530 within window 406. At 532, the viewing program checks to see if the user has requested that another document be displayed. If not, document 305, which is linked to by document 302 (see FIGS. 3 and 4*b*), is retrieved from the network and stored in local storage. At 536, the viewing program checks again to determine whether the user has requested that another document be displayed, and then proceeds to preload document 306, which is the other document linked to by document 302. In this particular embodiment, the order in which documents 305 and 306 are preloaded is dictated by the profile information.

When the user does request that a different document be displayed in FIG. 13*b*, the viewing program determines at 542 whether the requested document has been already loaded into local storage. If it has been loaded into local storage, the requested document is retrieved from the higher-speed local storage (544) and the contents of the requested document are analyzed to determine if the information in the preloaded version is out of date (545). If not, the preloaded version of the document is rendered in the window 406 (546). Otherwise, the document is retrieved over the network (548), and then rendered in the window 406 (546).

Figure 13C:
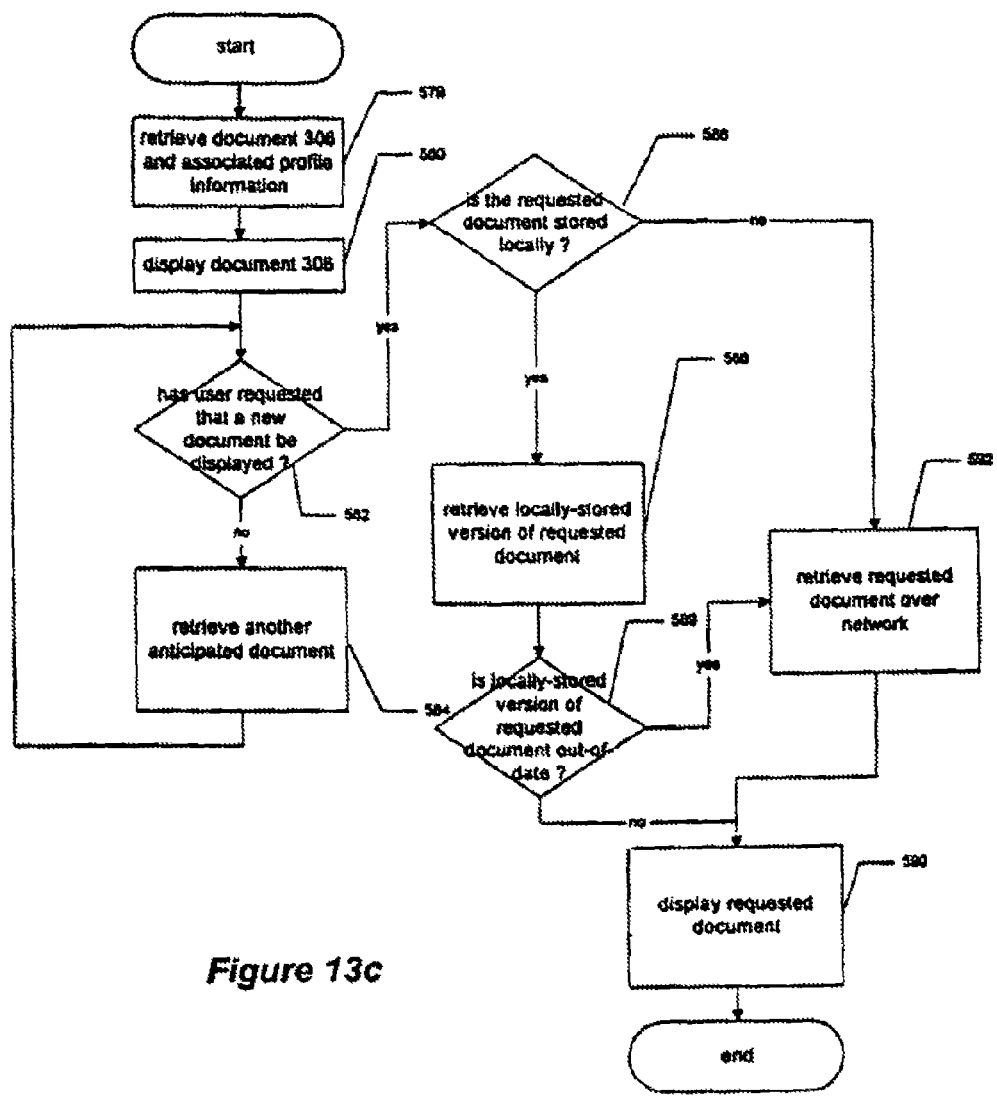

FIG. 13*c* is a continuation of the flow chart of FIG. 13*b*, where the user has requested in FIG. 13*b* that document 306 be displayed, and at 579 the document 306 and its profile information is retrieved, and then at 580 of FIG. 13*c*, document 306 is displayed. At 582, the viewing program checks to see if the user has requested that another document be displayed. If not, another document is preloaded into the memory unit or into local storage at 584. As can be seen in FIG. 11, document 306 contains only link 322, which is a link back to document 304. Thus, at 584, the document 306 may be preloaded into memory or local storage if it is still in memory from a preloading operation at 538 in FIG. 13*b*. If it is in memory, it is not necessary to preload it, so the document viewing program can preload from the network some other document that the user may be likely to request. Such a document could be identified in the profile information for document 306 (as described above), or such a document could be a document that was linked to a previously-viewed document, but wasn't fully preloaded into local memory. For example, if in FIG. 13*a* document 303 was not preloaded, this document could be preloaded at 584 because it may, at some point, be requested by the user. Alternatively, the document preloaded at 584 may be one of the bookmarked documents maintained by the document viewing program (e.g., at the client), or a document from some other popular site.

When the user requests a new document, the document viewing program checks at 586 to determine whether the requested document has been preloaded (586). If it has, the preloaded version is retrieved at 588 and analyzed to determine whether it is out of date at 589. If the preloaded document is not out of date, it is displayed at 590. Otherwise, the document is retrieved over the network at 592, and displayed at 590.

Figure 13D:
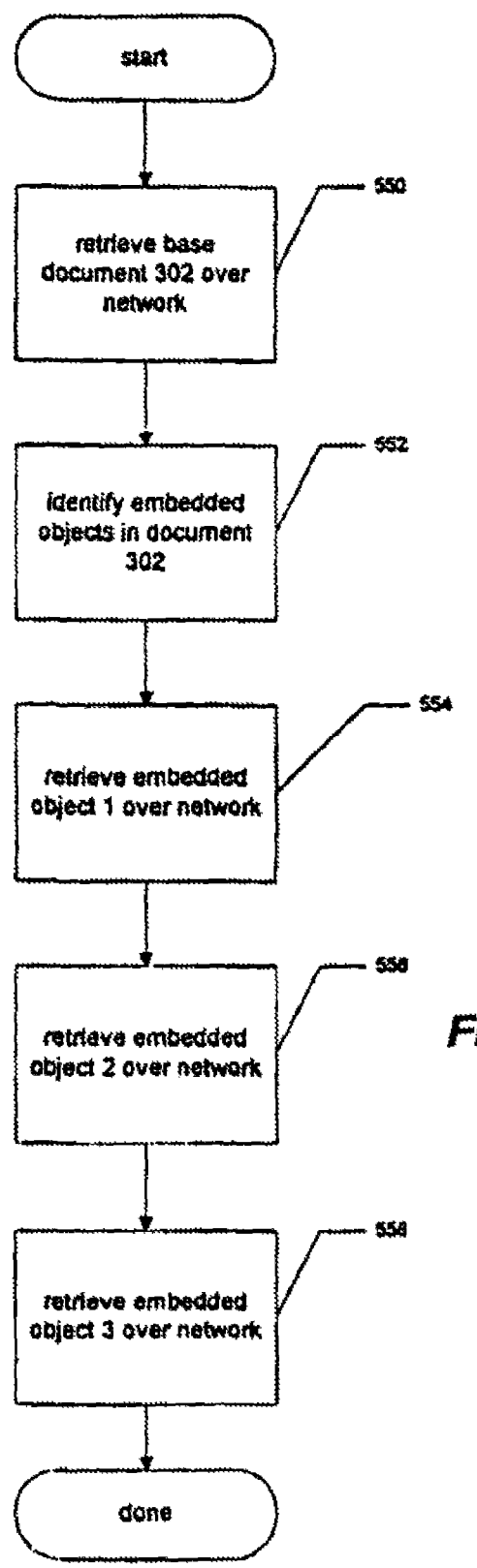

FIG. 13*d* is a partial flow chart in an alternate embodiment of the present invention that can be used to replace 504 in FIG. 13*a*. FIG. 13*d* illustrates that each document normally contains a number of objects, and in order to retrieve from the network the entire document, each of these embedded objects must be also be retrieved. In the embodiment of FIG. 13*d*, document 302 comprises a base document which is retrieved over the network at 550. The base document 302 contains references to the embedded objects within document 302. When the base document is retrieved from the network, it is analyzed at 552 to determine the additional embedded objects (if any) that must be retrieved to complete the document. If document 302 has three embedded objects, each is retrieved from the network as shown in FIG. 13*b* in succession (steps 554, 556, 558).

Figure 13E:
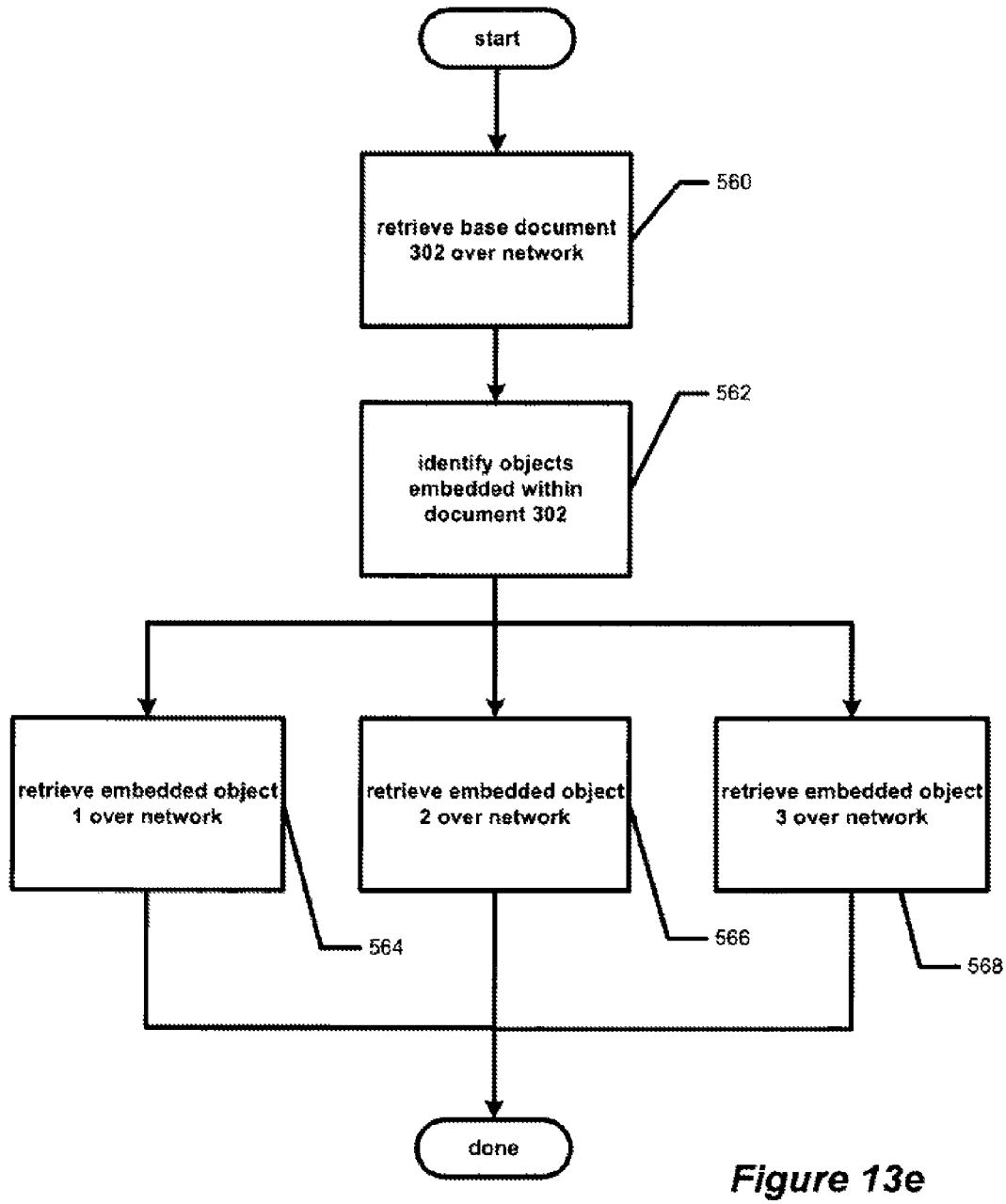

In an alternate embodiment, shown in FIG. 13*e*, a separate thread of execution is started for retrieving each of the embedded objects. This embodiment recognizes that it may be more efficient to download the embedded objects simultaneously, rather than one at a time as shown in FIG. 13*d*. The embodiment of FIG. 13*d*, however, has the advantage that it may be able to completely download at least one of the embedded objects before it is interrupted by a request to display another document. Depending on the implementation of the viewing program, a fully preloaded object may be more useful than a partially-preloaded object. Preloading documents simultaneously may increase the chance of having a large number of partially preloaded objects, and fewer fully-preloaded objects. Thus, where partially-preloaded objects are less useful than fully-preloaded objects, the embodiment of FIG. 13*d* may be more efficient than FIG. 13*e*. The elimination of field oxide also enables elimination of conventional active area stagger within the array, thus eliminating area consumed by word lines 96 and 99 of the FIG. 25 embodiment. Thus, the 4F lateral expanse consumed by a memory cell of FIG. 25 is capable of being reduced to 3F in the FIG. 26 embodiment (see dashed outline 240 in FIG. 26). This results in the area consumed by a single cell of $6F^2$, as compared to the $8F^2$ of the FIG. 25 embodiment.

FIG. 16 is flow chart of the operation of a system in which document 301 and its associated profile information is retrieved at 601, and the document 301 is displayed at 602. The documents 302 and 303 are then preloaded in two separate threads of execution (steps 604 and 606) so that they are retrieved from the network substantially simultaneously. Unlike FIG. 15, in the embodiment of FIG. 16 the document viewing program does not preload document 304 while document 301 is displayed. The decision not to preload document 304 may be based on the profile information for document 301 retrieved over the network at 601 in FIG. 16. For example, the profile information could instruct the document retrieval program to not preload document 304, or the profile information could indicate that the document 304 has been (historically) so rarely selected by other users that the document retrieval program decides not to retrieve document 304.

A third thread of execution in FIG. 16 (610) monitors the user's actions (e.g., manipulation of the input device) to determine if the user has requested that a different document be displayed. When the user does request a document at 610, the system (e.g., the document viewing program) determines (612) whether the requested document has been at least partially preloaded. Where it has not, the requested document is retrieved over the network at 618 and displayed at 616.

However, if the requested document has been at least partially preloaded, the preloaded version is checked for staleness at 617. At 613 the document viewing program determines whether the requested document has been partially or fully preloaded. If the requested document has been fully preloaded, it is retrieved from local storage (614) and rendered on the display (616). If it has been only partially preloaded, the partially preloaded version is retrieved from local storage (620), and any portion not in local storage is retrieved from the network (622), and then rendered on the display (616).

Figure 17A:
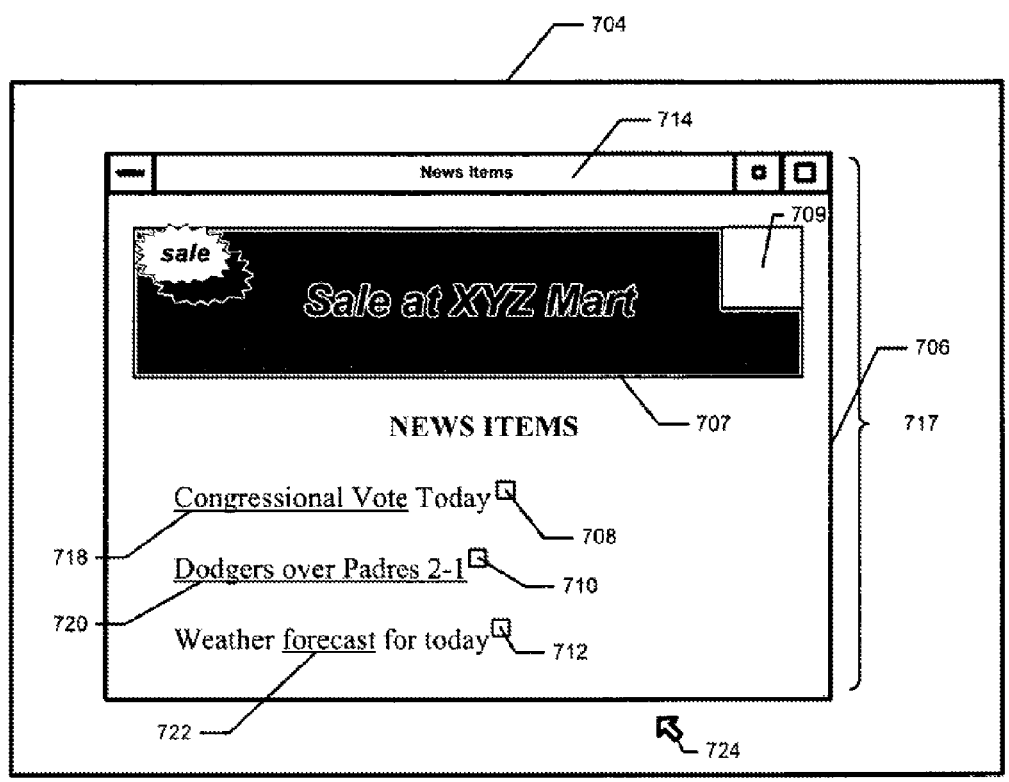
FIGS. 17a to 17f are representations of a video display screen illustrating various features and embodiments of the present invention.

In some situations, it may be useful to have the user exercise some direct control over the preloading process. For example, FIG. 17*a* shows a screen 704 having a window 706, which includes a title bar 714 and an area 717 in which to visually render the contents of a document. A cursor 724 corresponding to a pointing-type input device is also shown in the embodiment of FIG. 17*a*. The document shown in the window 706 includes hypertext links 718, 720, and 722, and the document also comprises graphical object 707, which includes area 709. The graphical object 707 also acts as a link to another document. Also shown in the window 706 are buttons 708, 710, and 712, which each correspond to one of the hypertext links. Button 708 corresponds to link 718, button 710 corresponds to link 720, and button 712 corresponds to link 722.

Figure 17B:
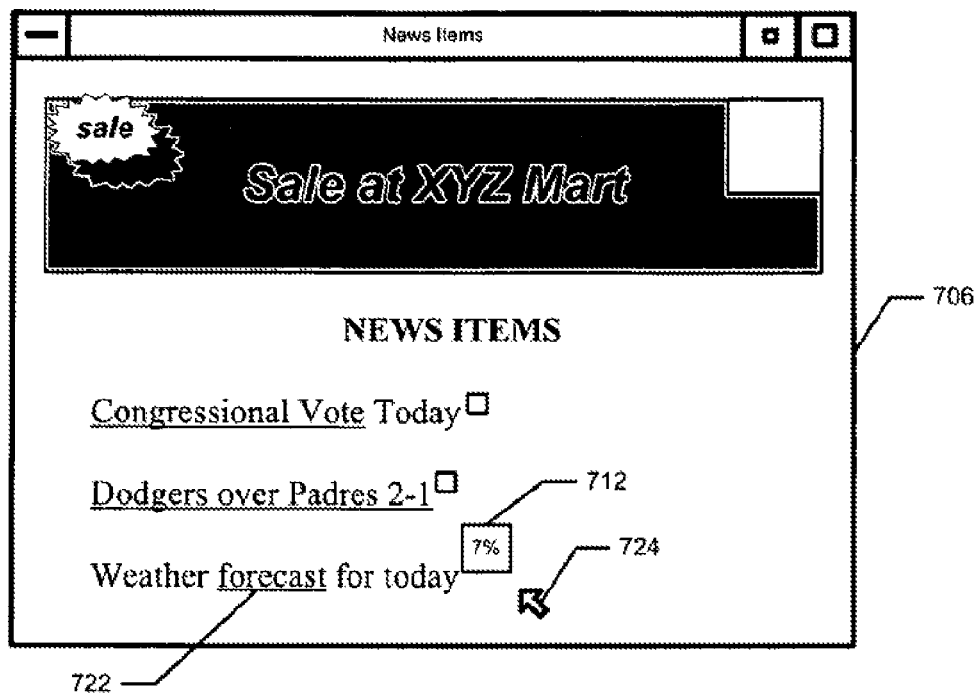

In FIG. 17*b*, the cursor 724 has been moved to the button 712 so that the button 712 is selected. Upon selection, the document viewing program begins preloading the document linked by the "forecast" hyperlink 722, which corresponds to the button 712. The "forecast" document is not yet displayed within the window 706, however, and the "News Items" document shown in FIGS. 17*a* and 17*b* continues to be displayed. While the document corresponding to link 722 is retrieved over the network, the progress of the preloading operation is displayed on the button 712. At the point shown in FIG. 17*b*, the document corresponding to the "forecast" link is 7% retrieved.

Figure 18A:
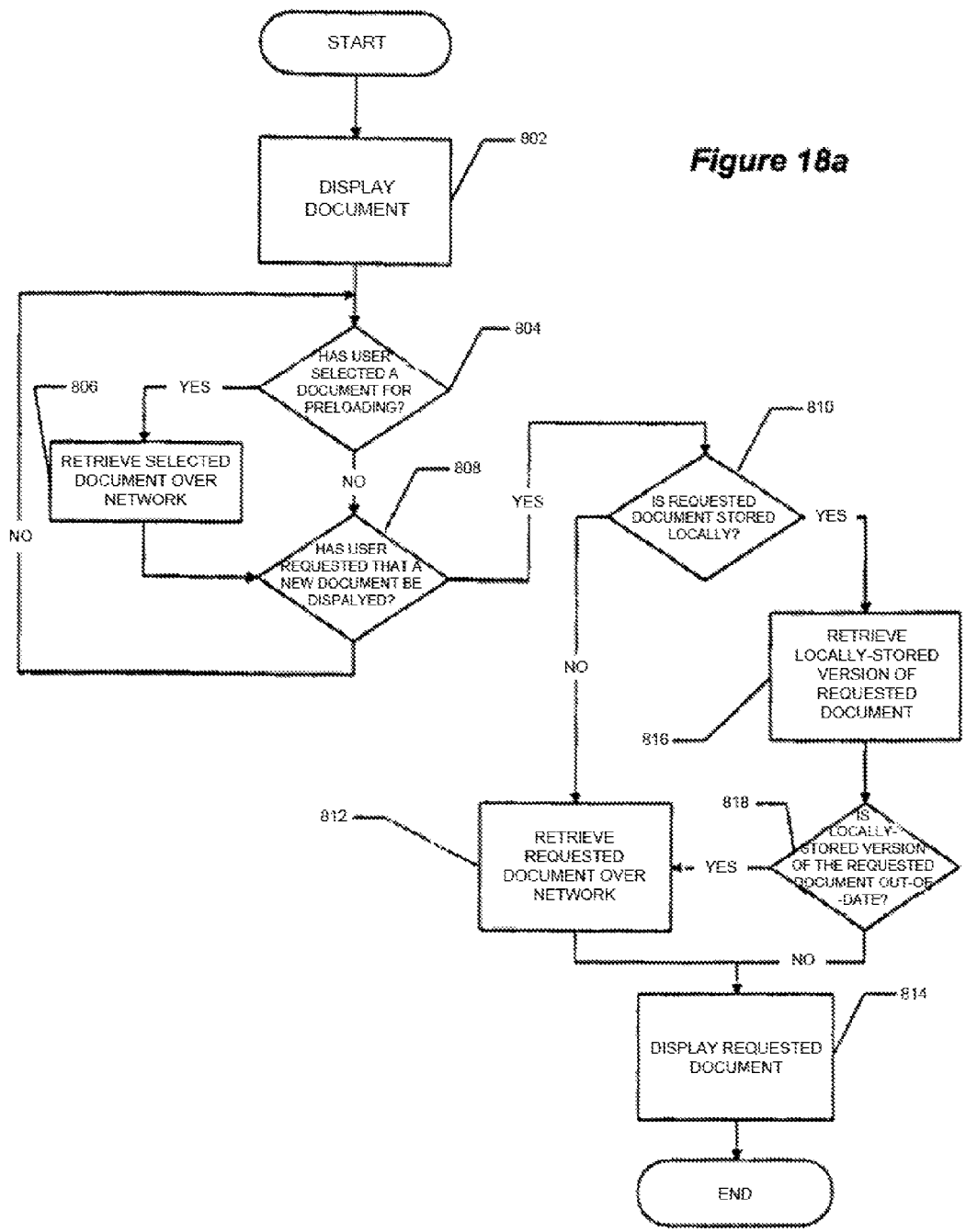
FIGS. 18a and 18b are flow charts illustrating the operation of various embodiments of the invention.

FIG. 18*a* is a flow chart illustrating the operation of an embodiment of the present invention that is similar to that described in connection with FIGS. 17*a* and 17*b*. Initially at 802, a document is displayed by the document viewing program. The document viewing program then alternatively monitors the user's input to determine whether the user has selected a document to preload (804) or a document to be displayed (808). A document is selected to be preloaded by the user when one of the buttons 708, 710, or 712 is selected, or when area 709 within the graphical object 707 is selected. Upon such a selection, the document corresponding to the selected button or to the selected graphical object is retrieved over the network and stored in local storage (806).

In the embodiment of FIG. 17*a*, the user requests a document to be displayed by selecting a hypertext link or by selecting the graphical object 707. When the user has requested a document to be displayed, the viewing program determines at 810 whether the requested document has already been retrieved into local memory or storage. If it has been preloaded, it is retrieved from local storage (816), and displayed in the window 706 (814).

In some embodiments, the document may also be checked at 818 to determine whether it is sufficiently new or current. If its download date, modification date, or other information indicates that the contents of the document are not sufficiently new, or are out of date, the requested document is again retrieved over the network at 812.

Figure 18B:
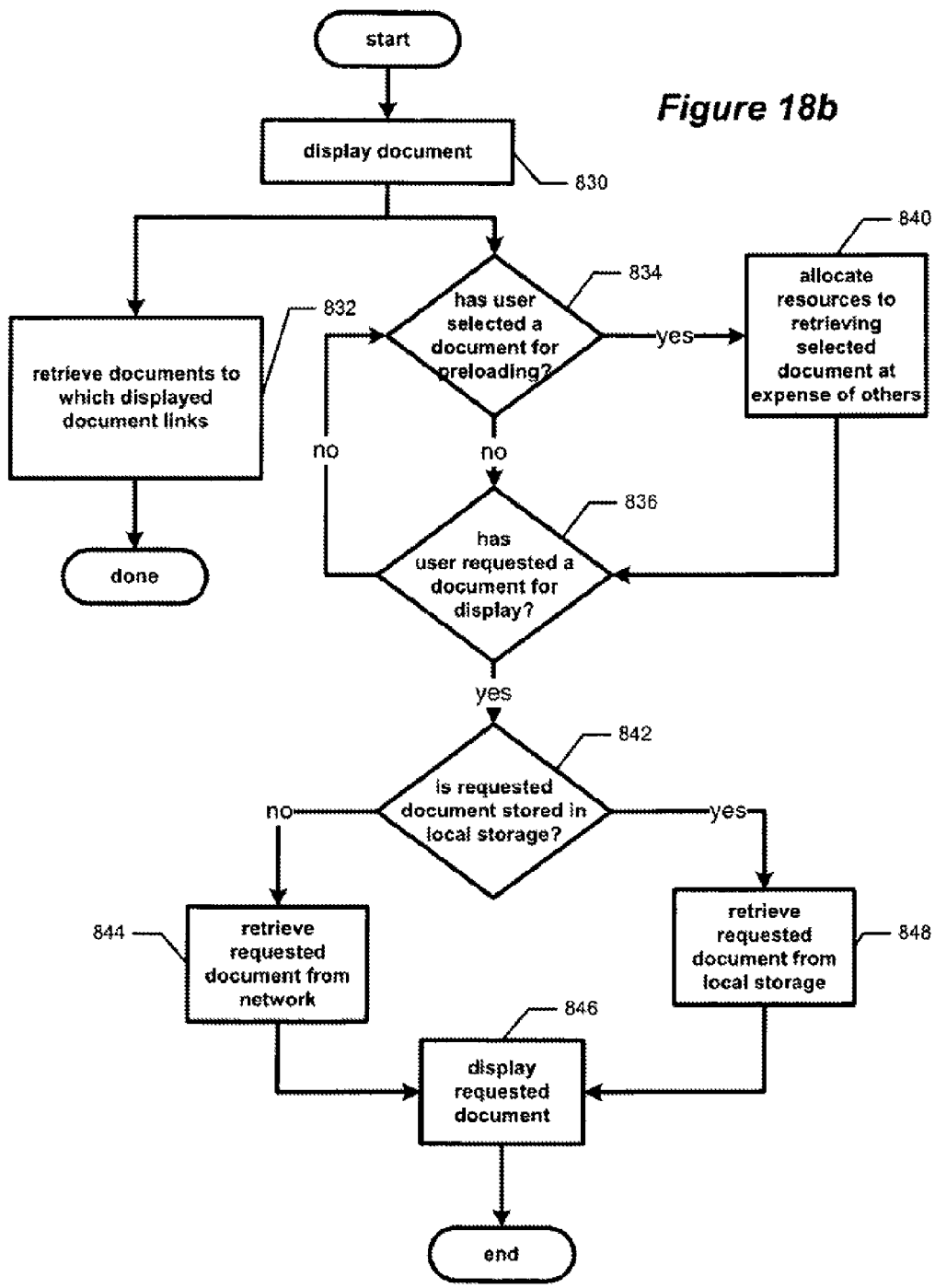

FIG. 18*b* illustrates an embodiment of the present invention in which a document is displayed at 830 by the viewing program, and then one or more threads of execution begin preloading the documents that are linked to by the displayed document (832). Another thread of execution monitors the user's input to determine whether the user has selected a link to preload (834) or whether the user has selected a link to display (836).

When the user selects a link to preload at 834, such as by selecting one or more of the buttons 708, 710, or 712 in FIG. 17*a*, the viewing program begins preloading the selected link, and does so at a higher priority at 840 than any of the other links that are being preloaded at 832. In other words, when the user selects a link to be preloaded, the viewing program allocates more resources to preloading the selected document at 840 than to any other preloading operations it is carrying out on any other documents at 832.

Where more than one link has been selected by the user, each could be preloaded at a priority higher than that of the documents being preloaded at 832. In another embodiment, the document most recently selected for preloading could be given a priority higher than any other, so that the resources of the document viewing program are being applied to the preloading of the most recently selected-document.

Once the user selects a document to be displayed, the viewing program determines at 842 whether the document has been preloaded into local storage. If so, the preloaded version is retrieved from local storage (848), and displayed (846). Otherwise, the requested document is retrieved over the network (844) and displayed (846).

In the embodiments described in FIGS. 18*a* and 18*b*, the user selects the document that he or she wishes to preload, and in the embodiments of FIGS. 17*a* and 17*b*, this is done by selecting button that corresponds to the desired link. In other embodiments, selecting the link that the user wishes to preload can be done in a number of other ways. For example, selection of a link to preload could be carried out by simply passing the mouse or pointing device cursor over the desired link or over an object that corresponds to the link. Such an action could communicate to the document viewing program the link that the user wishes to preload. In another embodiment, the user could select the desired link with a right mouse click (or some other keyboard or pointing device action), or by directing the document viewing program to preload a given link by selecting an appropriate option from a menu that is displayed when the link is selected with the pointing device.

Figure 17C:
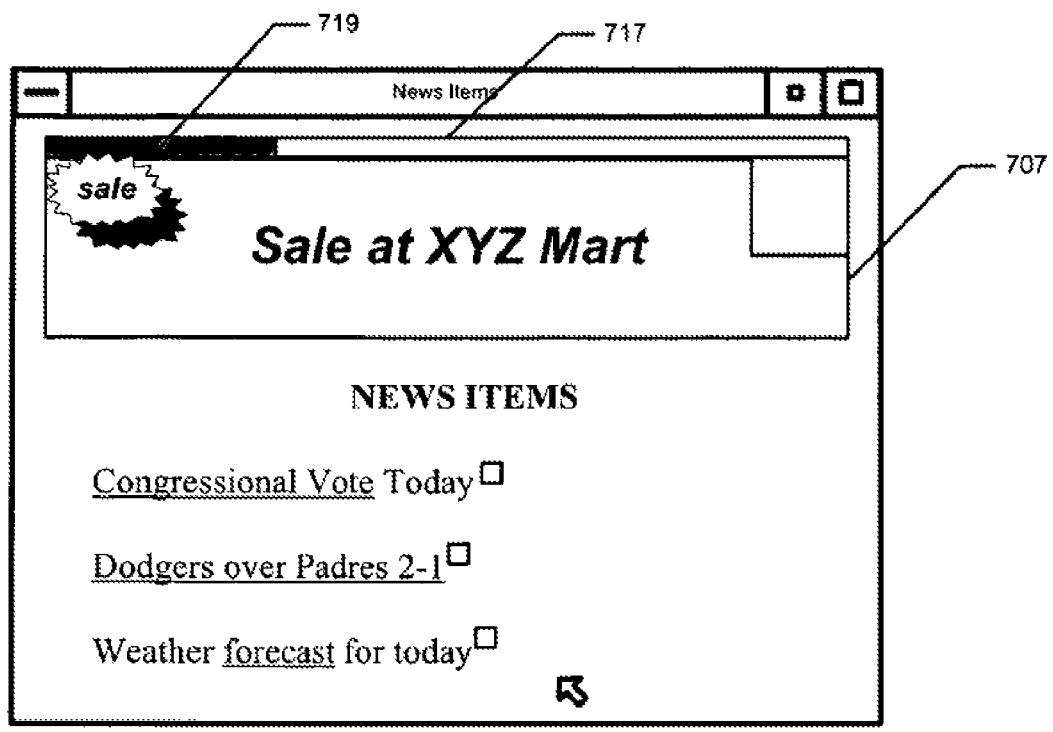

In FIG. 17*a*, selection of the document linked to by the graphical object 707 is carried out by the selection of the space 709 within the object 707, or by passing the cursor over the area 709 in FIG. 17*a*. Selection of any other portion of the object 707 constitutes a request that the document corresponding to the document to the object 707 be displayed, rather than preloaded. FIG. 17*b* shows one way in which the progress of the preloading can be communicated to the user. FIGS. 17*c*, 17*d*, 17*e*, and 17*f* show other embodiments in which the progress being made in the preloading operation is communicated to the user. In FIG. 17*c*, the graphical object 707 from FIGS. 17*a* and 17*b* has been selected for preloading, and a progress gauge 717 has a shaded area 719 which is used to show what portion of the document has been preloaded. When the shaded area 719 fills the gauge 717 entirely, the document linked to by the graphical object 707 has been preloaded.

Figure 17D:
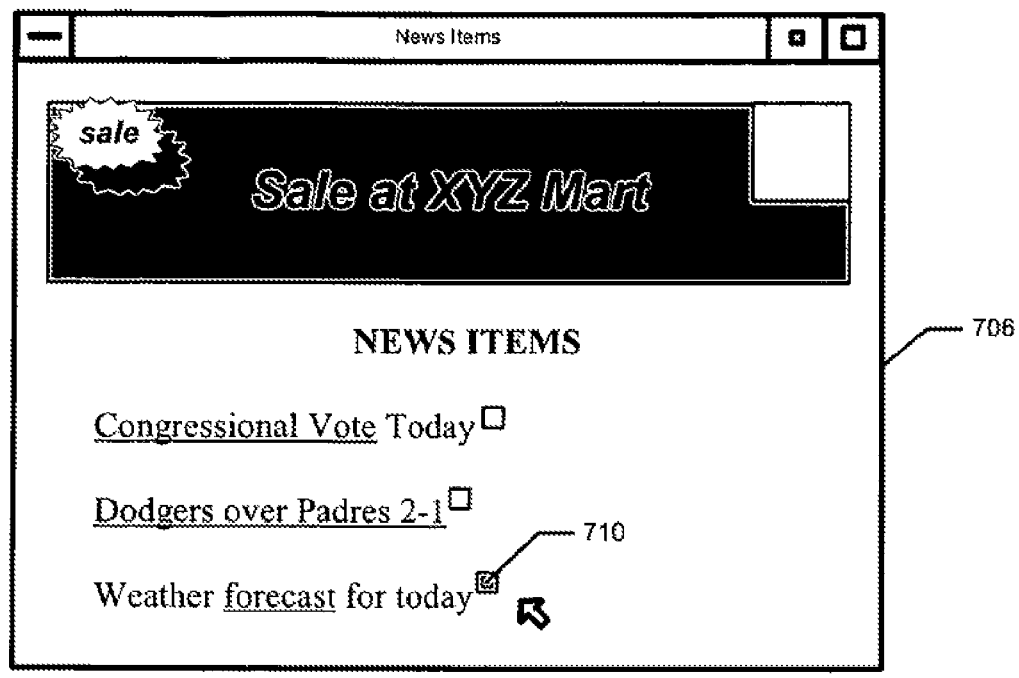
Figure 17E:
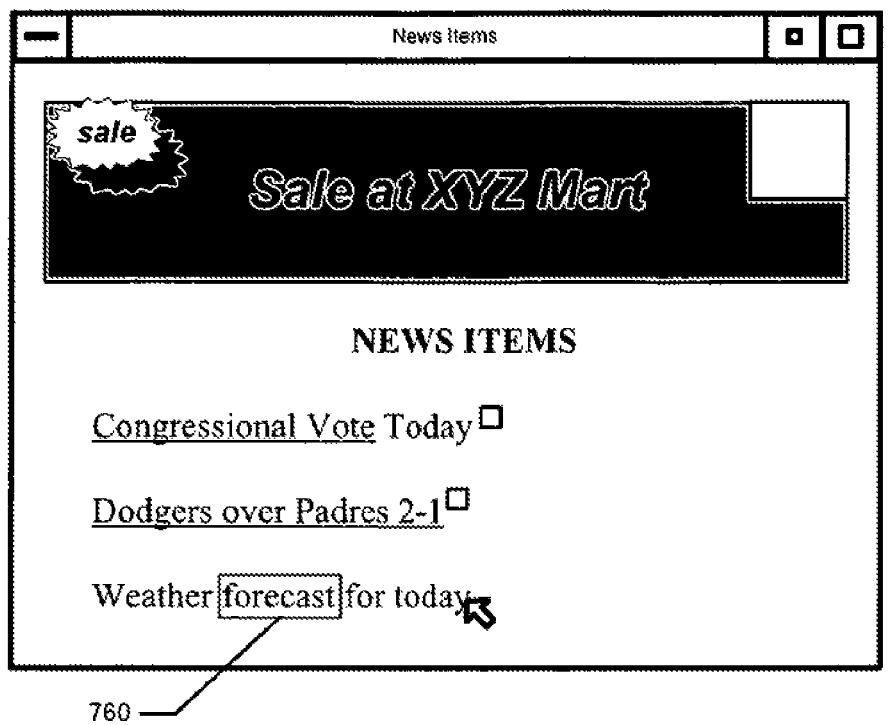
Figure 17F:
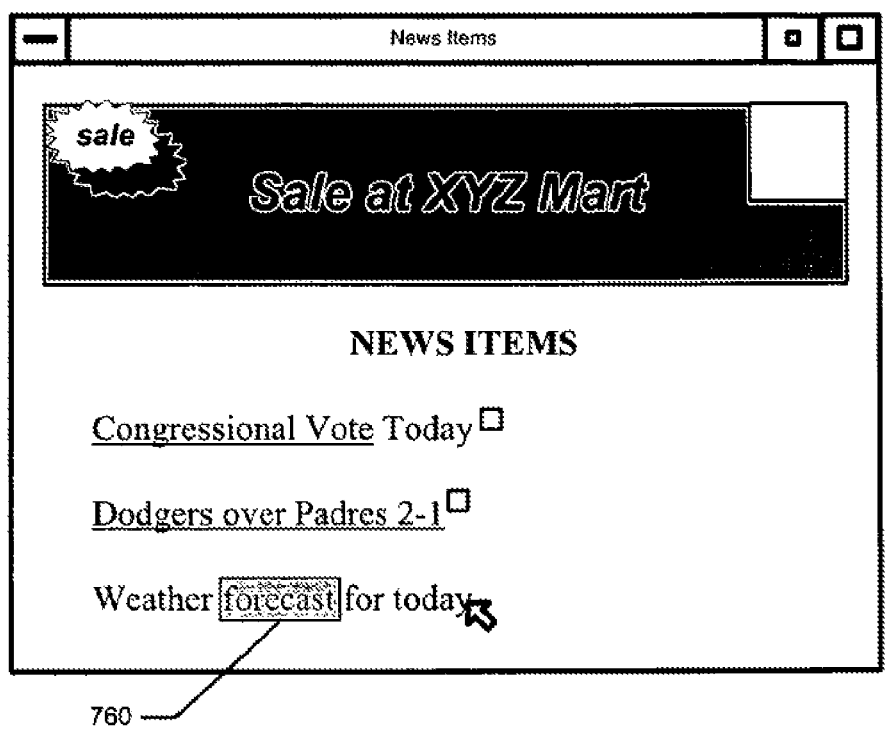

The button 710 in FIG. 17*d* operates in a manner similar to the button 712 of FIG. 17*b*, but it changes colors to indicate the progress of the preloading operation. For example, the button 710 could get progressively darker (or lighter) while the linked document is being preloaded. FIG. 17*e* shows a text button 760 that is used as a hyperlink. Selection of the button for preloading (e.g., by passing the cursor over the button) causes the button to change color or shade (see FIG. 17*f*) as the preloading proceeds. Any type of visual or audio progress indicator could be used to indicate progress of the preloading, and is useful to the user because he or she will know when a desired document has been preloaded. The user can continue to read or interact with the currently displayed document until the visual or audio indicator signifies that the document has been preloaded. Thus, the user can be assured that when the preloaded document is selected for display, it will be quickly displayed.

In some document retrieval systems, the user may incur a cost for each document or set of information that he or she retrieves from a database or over a network. In such a system, preloading documents before they are requested by the user could incur fees for documents that the user has never intended to see, use, or retrieve from the network. In other words, some documents may be retrieved in such a system simply because they are linked or otherwise related to one of the documents that the user did retrieve. This can undesirably increase costs for the user.

Figure 19:
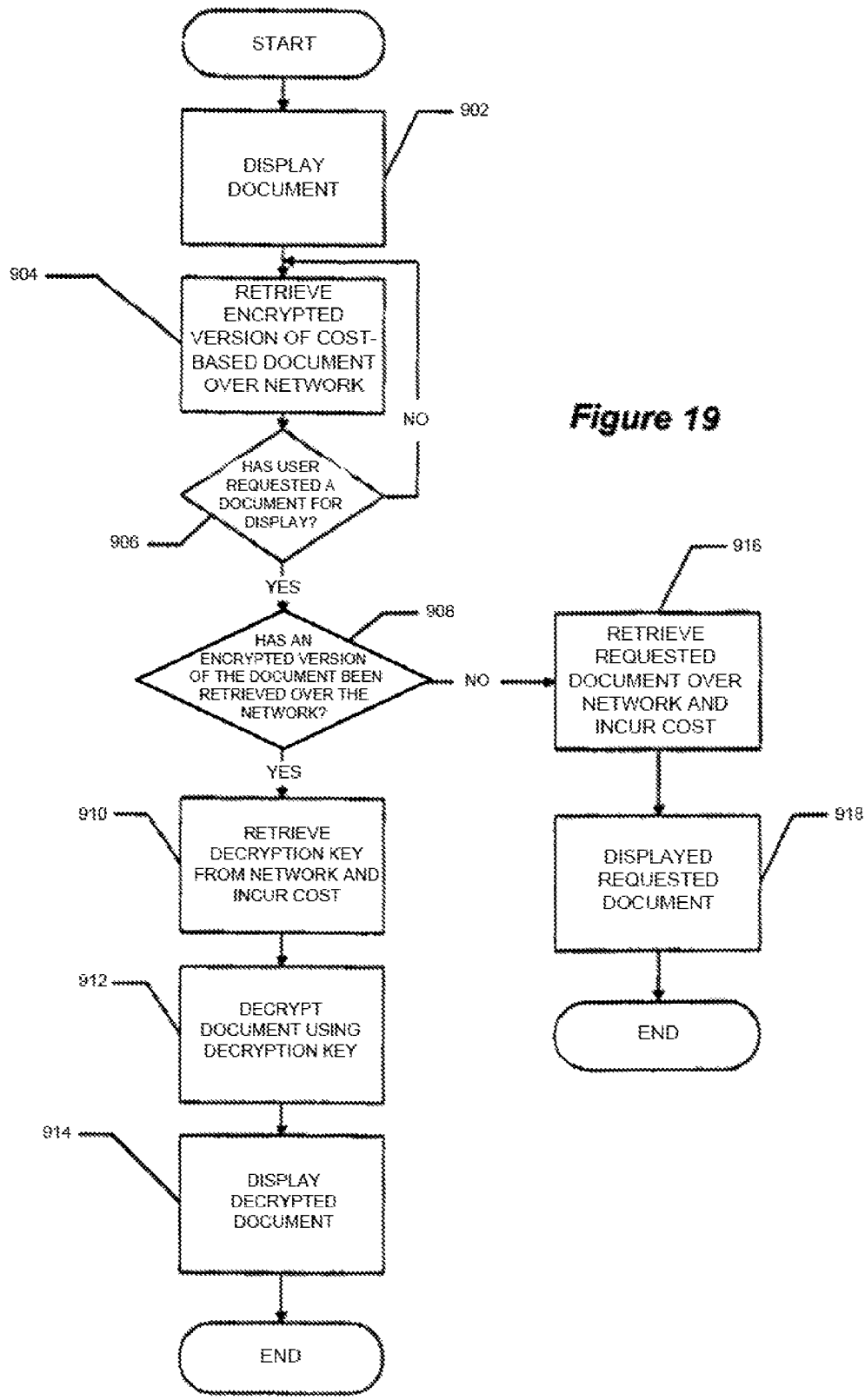
FIG. 19 is a flow chart illustrating how an embodiment of the present invention can effectively operate in a fee-based environment.

FIG. 19 is a flow chart illustrating how an embodiment of the present invention can effectively operate in an environment where the user incurs fees for each document or set of documents retrieved over the network. In this example, when a document is displayed at 902, the document viewing program proceeds to preload one or more documents that are linked to the document that the user is viewing. However, the viewing program does not preload the version of the linked documents that incur a fee. Instead, the viewing program preloads a free (or reduced cost) encrypted version of the linked document(s). This encrypted version is distributed free or at a lower charge because it is unreadable (or at least difficult to read) to anyone that attempts to view the encrypted version. However, the encrypted version can be easily converted into the normal, readable version of the content or the document by processing the encrypted version of the document with a password or a key.

When the user selects a document to be displayed at 906, the viewing program determines at 908 whether an encrypted version of the requested document has been preloaded. If so, the viewing program retrieves the password or key required to decrypt the encrypted version of the document, and at that time, the cost of retrieving the document is incurred at 910. The encrypted version of the document stored locally is decrypted at 912 and then displayed at 914.

By retrieving only the password or key over the network and then decrypting the locally-stored encrypted version of the requested document, the document will typically be displayed much more quickly than if the entire document would have to be retrieved from the network. Normally, the size of the key will be much smaller than the size of the document. Retrieving only the key, and processing the encrypted document at the client will therefore typically be much faster than retrieving the unencrypted version of the document over the network upon receiving a request for it.

The use of the procedures described herein may, in some environments, substantially increase the number of requests that are issued to network servers, and may also increase the amount of bandwidth required for a given network. This can be exacerbated where each document has embedded within it additional objects that must be separately requested from the server. Thus, it may be desirable to implement techniques to alleviate, eliminate, or avoid these effects. In one embodiment of the present invention, each time a request is issued to a network server, additional information is included within the request so that the database server (or any other network hardware or resources) is notified of the type of the request. This will allow requests to be prioritized so that server and/or other network resources are not allocated to tasks that may have less priority (e.g., a request to preload a document) than other tasks (e.g., a normal document request).

FIG. 20*a* is a flow chart of a system in which the document viewing program communicates to the database server (or to the network itself) a priority for each request. At 1102, the document viewing program issues a normal priority request to the database server for document A. The database server responds to this request, and at 1104, document A is retrieved over the network by the document viewing program. When it is received, it is displayed by the document viewing program at 1106.

The document viewing program then starts a thread that monitors the user input at 1108 to determine whether the user has requested a document for display. Another thread is also started, and this thread at 1120 issues a low priority request to the server for document B (one of the documents it seeks to preload). The user at this point has not requested that document B be displayed, so the retrieval of document B is done based on the expectation that the user may wish to view document B at some point. For this reason, the request for document B is issued on a low-priority basis. (Document B may be a document that is linked to document A, that is identified in profile information, or that is otherwise related to document A.) When the server responds to the request, document B is downloaded over the network at 1122, and stored locally at 1124.

The low-priority request allows the network server to respond to other normal or high priority requests in advance of responding to the low-priority request for document B. This can be used to ensure that when the user actually requests a document from the server, the server will service that request before other low-priority requests by either that user or by other users. This information can also be used by the network hardware (e.g., network routers) itself to prioritize the routing of the requests or the routing of packets of data.

When a request that a document be displayed is made by the user at 1108, the document viewing program determines whether the requested document is in local storage at 1110. If it is, it is retrieved from local storage at 1116, and displayed at 1118. However, if the requested document is not stored in local storage, a normal-priority request is issued to the server at 1112. The request is a "normal" priority request because the user has actually requested a document, in contrast to the request made at 1120 of FIG. 20*a*. The document is then retrieved over the network at 1114, and then displayed at 1118.

Figure 20B:
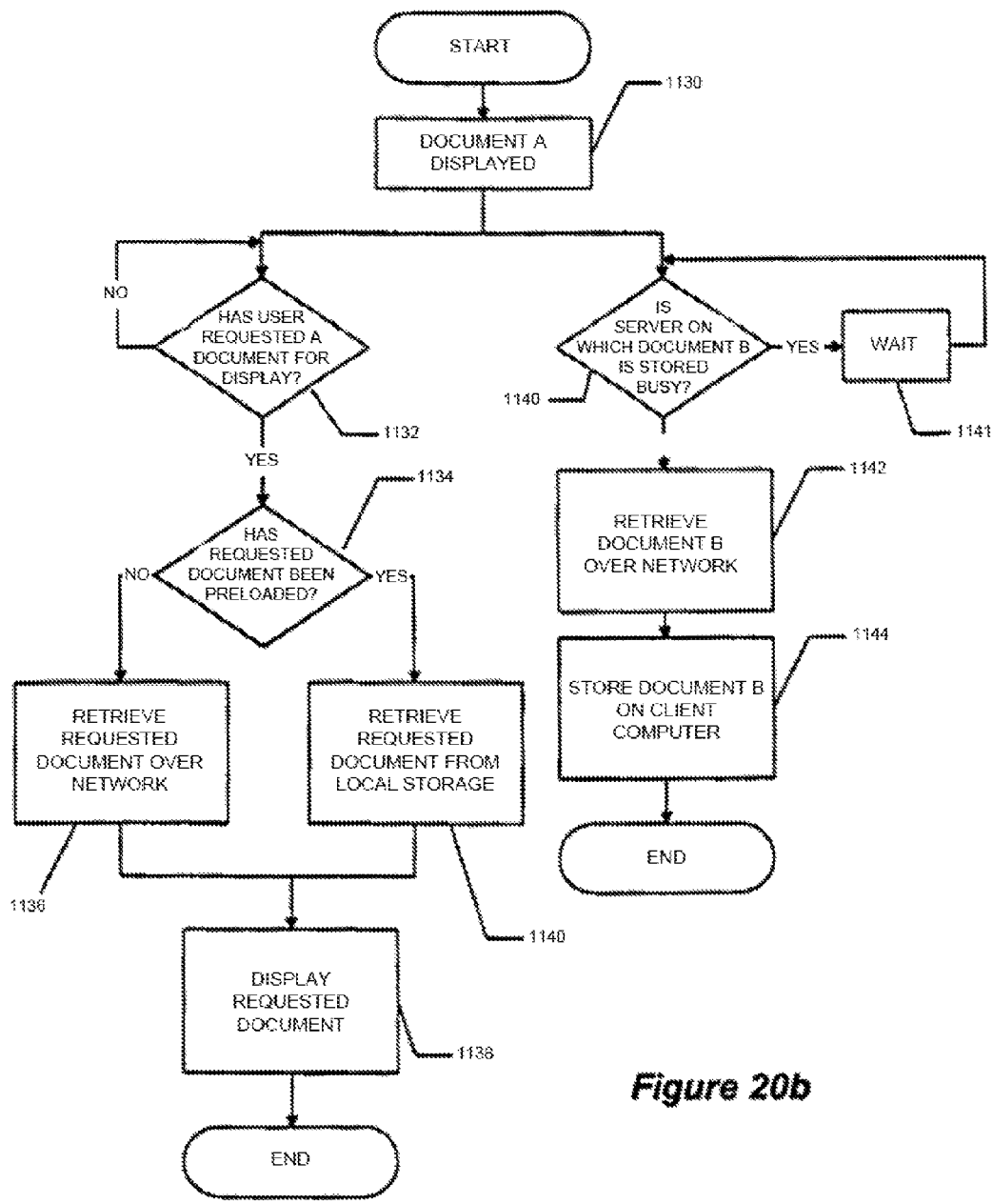

FIG. 20*b* is another embodiment of the present invention that deals generally with the types of problems addressed in FIG. 20*a*. After document A is displayed at 1130, a thread that monitors whether the user has requested a document for display is started at 1132. Another thread is started at 1140 to determine whether the server on which document B is stored is busy. If it is, a wait state is entered at 1141 so that requests are not issued to the server over the network. This procedure thus preserves network and/or server resources. After a period of time, the server is then checked again. When the server is not busy, document B is retrieved over the network at 1142, and stored on the client computer at 1144.

When the user requests a document for display, the document viewing program determines whether the requested document has already been preloaded. If necessary, the requested document is retrieved over the network at 1136; otherwise, it is retrieved from local storage at 1140. After it is retrieved, it is displayed at 1138.

Figure 20C:
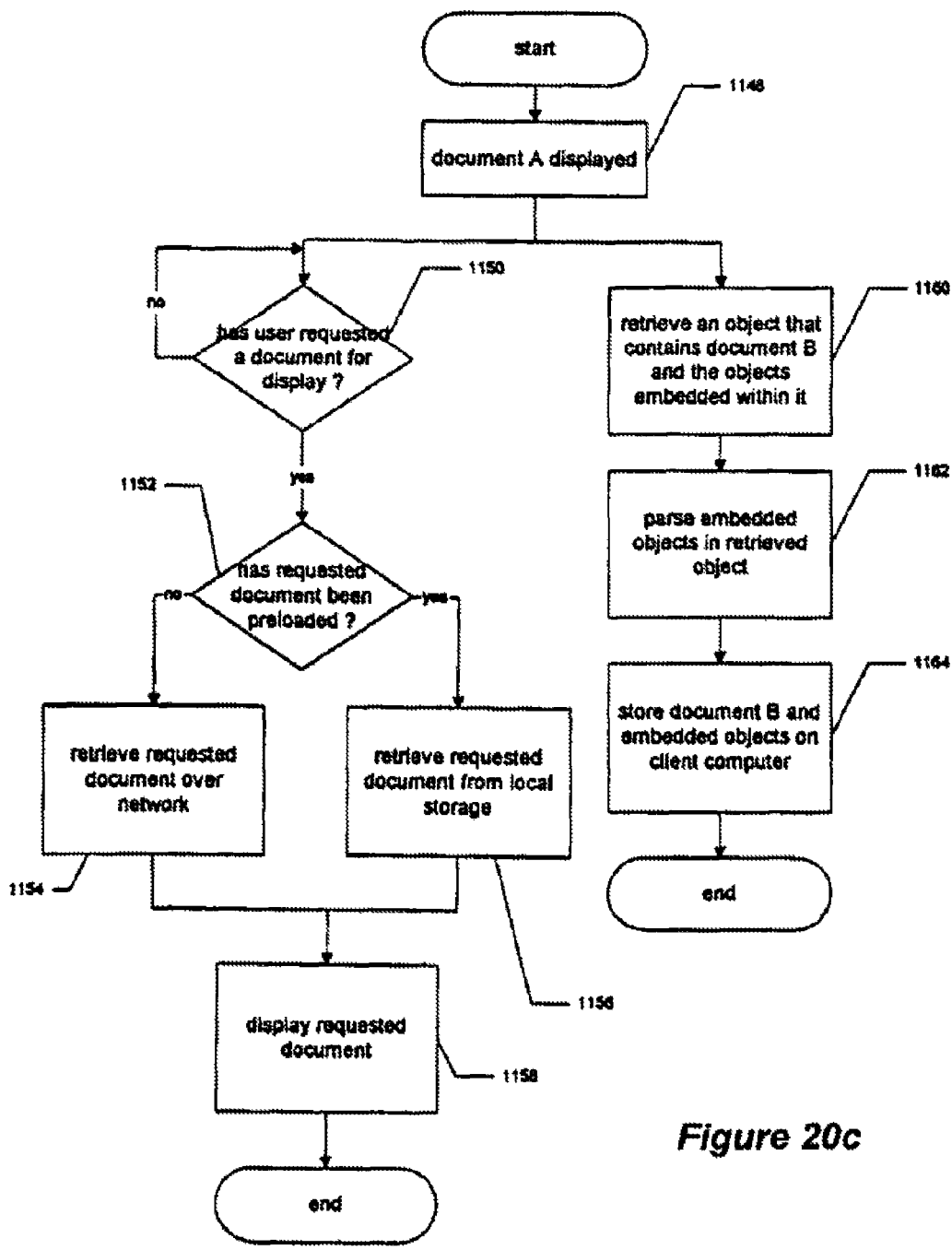

FIG. 20*c* is a flow chart of an embodiment of the present invention in which an anticipated document, document B, is stored in a file along with the objects that are embedded within the document B, are referenced by the document B, or are linked to by document B. By downloading such a file, the number of requests that must be issued to the server can be reduced. And if data compression is used to reduce the size of the file at the server and decompress the file at the client, the number of bits that must be downloaded to the client computer can be reduced.

Once document A is displayed at 1148 in FIG. 20*c*, the document viewing program monitors the user at 1150 for a request to display a new document. At the same time (i.e., in another thread of execution), an object that contains document B and the objects embedded within it is retrieved over the network at 1160. This object may also include one or more documents that are linked to by document B. When the object is downloaded, it is parsed at the client computer at 1162 so as to extract document B and the embedded objects, which are then stored at 1164 on the client computer. When the user requests a document for display, the document viewing program determines at 1152 whether the requested document has already been preloaded. If necessary, requested document is retrieved over the network (1154), but if possible, it is retrieved from local storage (1156). After it is retrieved, it is displayed at 1158.

The present invention is suitable for implementation as an ActiveX or Java control, which could be downloaded as part of a web page into a browser or an operating system for execution on a client computer. In such an embodiment, there may be security restrictions placed on the downloaded control. Appendix A is an outline of a Java program or psuedocode for applet written in Java that can be inserted into a web page, and appears on the web page as a button that it is associated with an HTML link. When the button is selected, the document corresponding to the associated link is preloaded onto the client, and the base HTML document and at least some of the embedded objects are stored on the client's local file storage system. The client's file system is typically much faster than the network.

In some Java environments, the client's local file system is not accessible because of security restrictions if the applet is downloaded from a remote host. These security restrictions can be avoided by using an insecure environment, or by using a code signing technique that allows the user to verify the author of the applet. Once the code is identified as being written by a trusted author, the security restrictions can be safely eased or eliminated.

In another embodiment, a secure means of accessing the client's file system can be used to securely and safely store data on the client's file system. In such a system, the applet may only be allowed to write files to certain directories. The applet may also be limited to reading only files that it had created. One such secure file system for Java has been referred to as "protected domains," and can be useful in implementing some embodiments of the present invention.

Appendix B is another listing of Java code/psuedocode in an implementation of the computer program or applet that does not use the local file system for storing preloaded documents. Instead, the Java program in Appendix B stores preloaded documents in memory, and implements a web server on the client to serve the documents back to the document viewing program running on the client. Thus, when the user selects a link, the link is redirected to the server running on the client, and that local server responds with the preloaded document if it is available. The document viewing program would, in effect, be retrieving preloaded documents from local memory, thereby making access to preloaded documents quite fast. Such an implementation may also avoid the security restrictions placed on accesses to the local file system in some embodiments.

Figure 21:
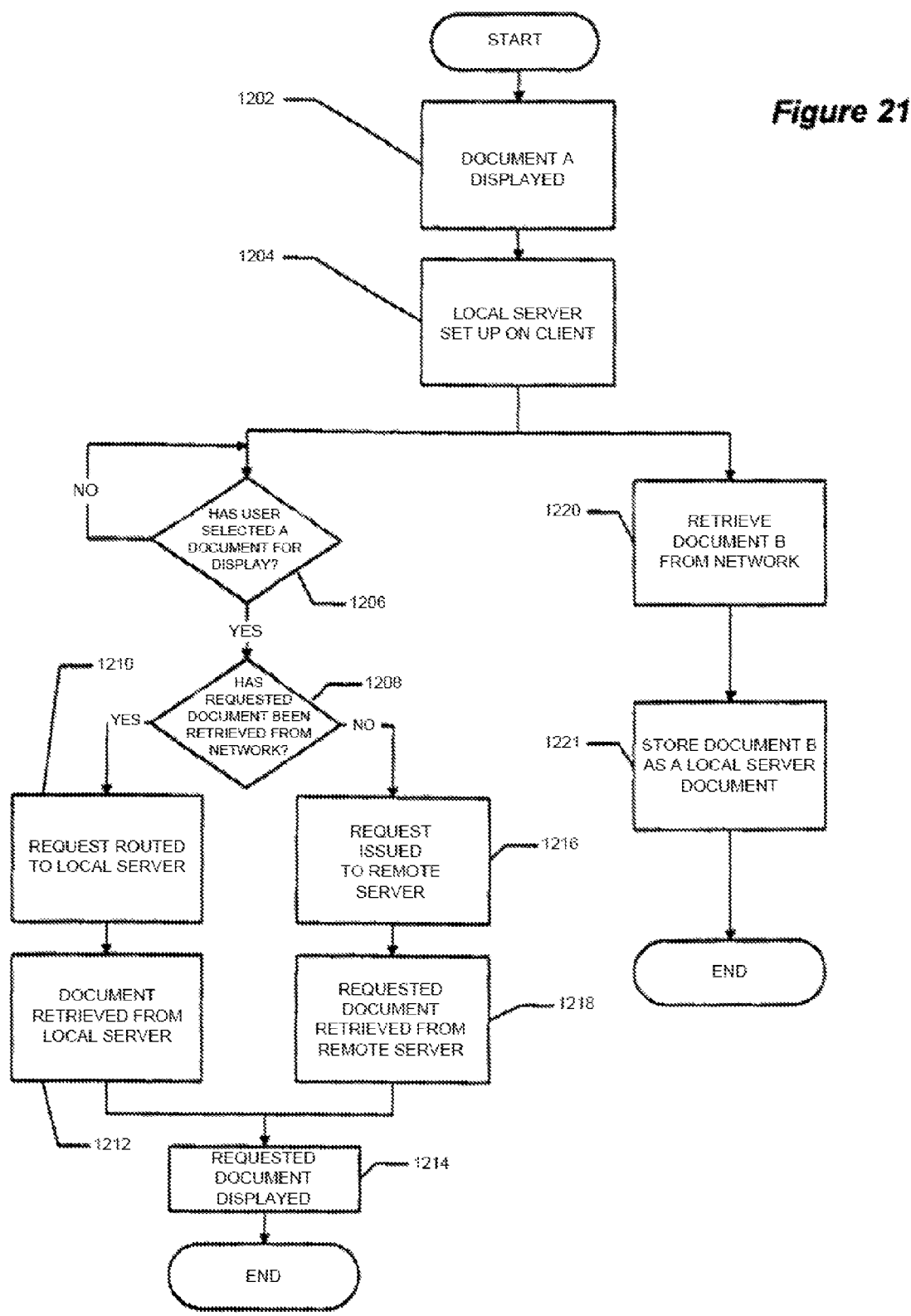
FIG. 21 is a flow chart that illustrates the operation of a computer program illustrating some aspects of the present invention.

FIG. 21 is a flow chart that illustrates the high-level operation of the pseudocode of Appendix B. At 1202, a document is displayed, and a local document or object server is then set up at 1204. Two threads of execution are started, one to retrieve an anticipated document (document B) from the network and store it as a document capable of being served by the local server (steps 1220 and 1221), and another to monitor the user's actions to determine when the user has selected a document for display (1204).

When the user selects a document for display at 1206, the request is routed to the local server (1210) if the requested document had been stored locally. Otherwise, the a request for the document requested by the user is issued to the server (usually a remote server) on the network (1216). When the document is retrieved (or as it is retrieved), the document is displayed at 1214.

Because a web page control may have to be downloaded with each page, it may be desirable to implement techniques to speed the amount of time that a user has to wait for a document to be retrieved from the network. One such procedure is to embed a small applet into the web page that is downloaded by the user, where the small applet then retrieves a larger program that carries out the remaining steps. Such a procedure will allow the user to begin interacting with the web page after the small applet is downloaded, and will not require that the user wait for a larger program to be downloaded before interacting with the web page. Once the small applet is downloaded, the larger applet is downloaded in the background while the user is viewing or interacting with the web page.

Figure 22:
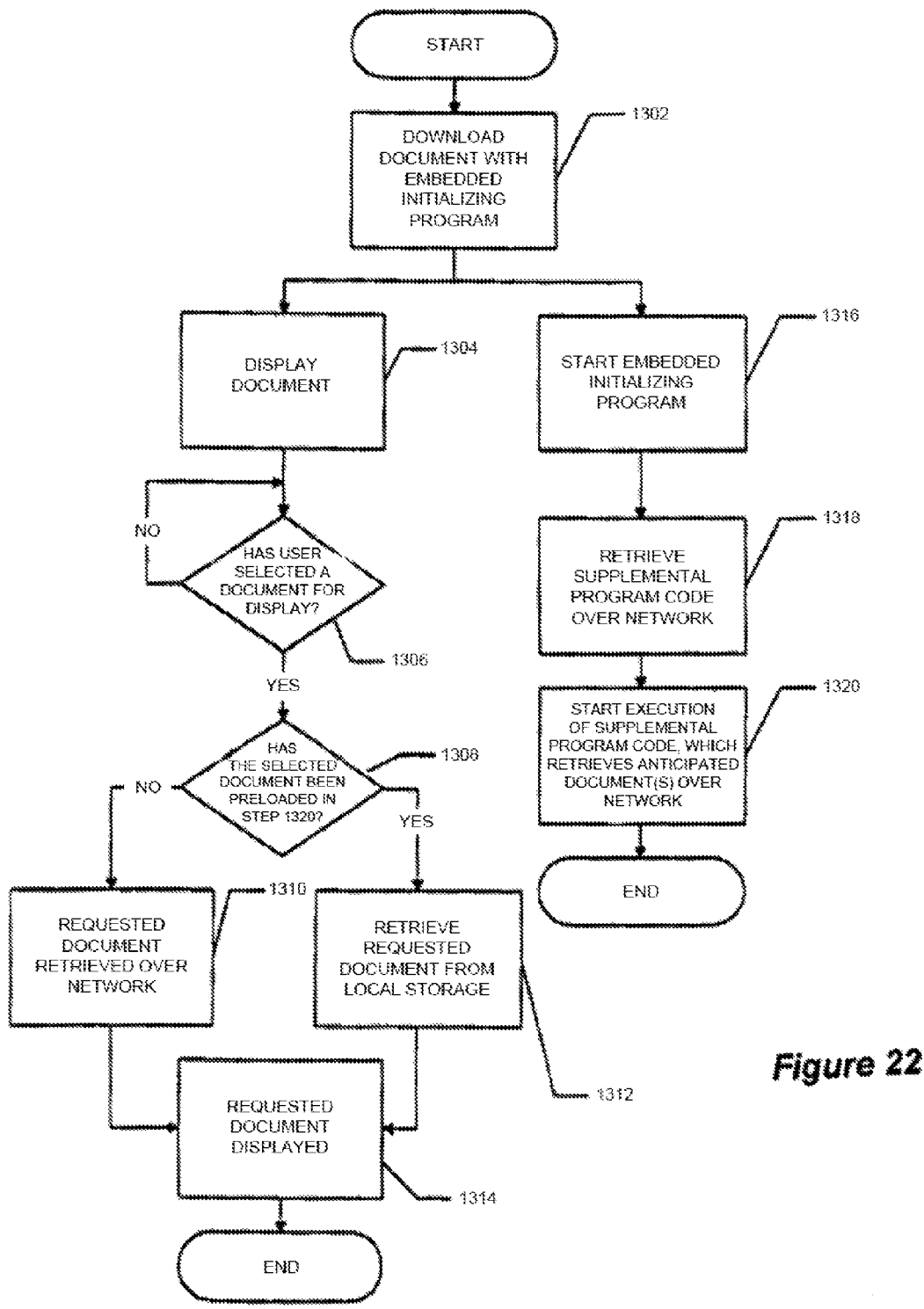
FIG. 22 is a flow chart that illustrates the use of an embedded program in connection with the present invention.

FIG. 22 is a flow chart that illustrates the use of a small embedded program that retrieves a larger embedded program, and causes the latter to execute. At 1302, a document or object with an embedded initializing program stored within it is downloaded from the network. The document (or object) is displayed on the screen at 1304, and in a separate thread of execution, the initializing program is started at 1316. The initializing program retrieves supplemental program code over the network, and execution of this code is started at 1320.

As indicated in FIG. 22, this new code retrieves anticipated documents over the network, also at 1320.

Because the initializing program is small, it takes relatively little time to download, and the document viewing program is able to promptly start the execution of the initializing program. This may allow the display of the document at 1304 to take place more quickly. The effect is a more responsive program that does not cause the user significant delay while an applet implementing the present invention is being downloaded.

Figure 23:
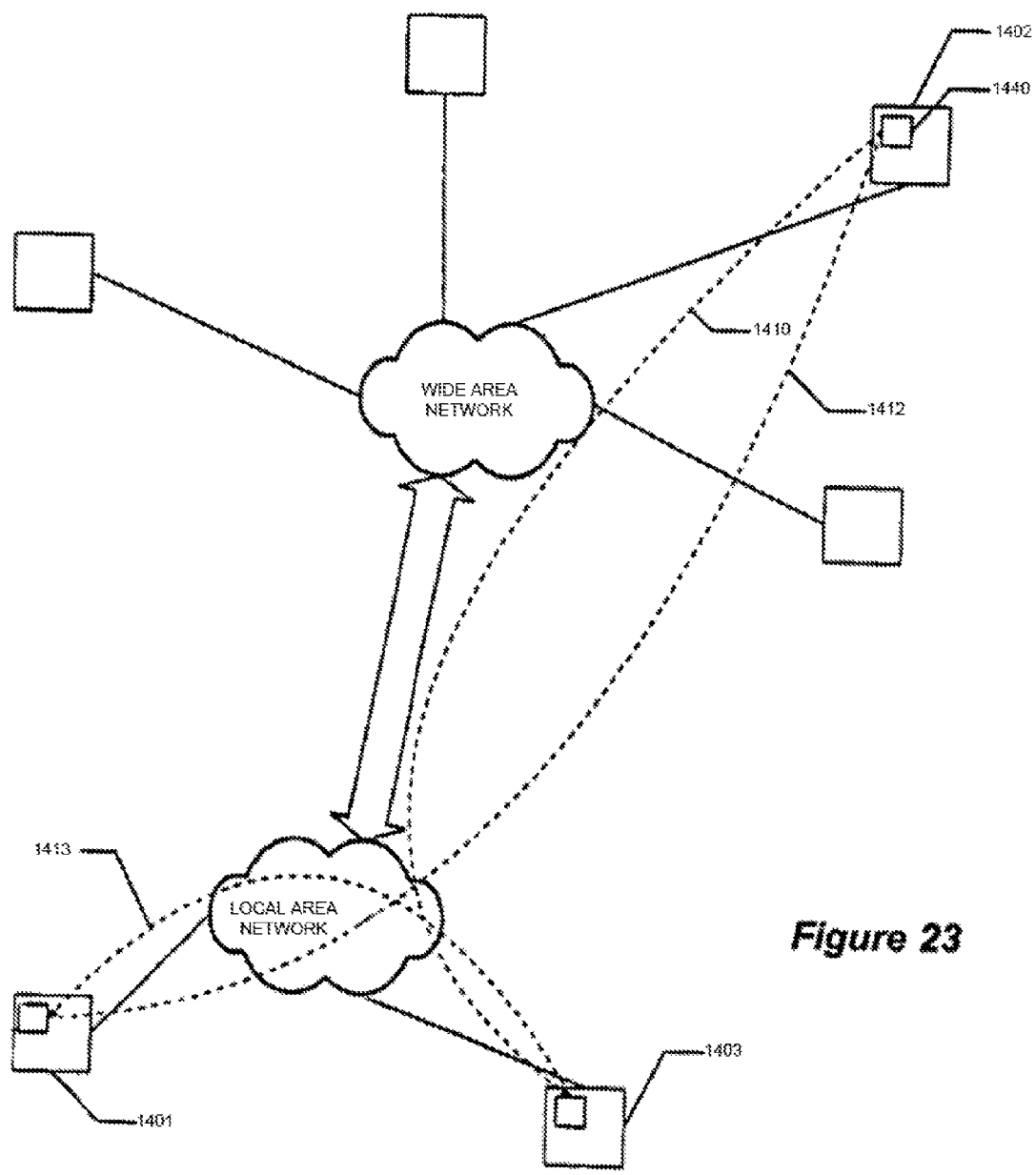
FIG. 23 is a network diagram illustrating an alternate method of preloading information on a network.

Many embodiments of the present invention have been described as storing preloaded documents into local storage at the client computer. However, the present invention need not be limited to contexts in which information is stored at the client computer or in local storage at the client computer. The present invention is useful in any environment where it is possible to store preloaded information in an area where access to the preloaded information is faster than that of the original location for the information. For example, FIG. 23 shows a network where computer 1401 is preloading (1412) a document 1440 on server 1402 while viewing another document on the network. In the embodiments described previously, the document 1440 is retrieved over the network and stored in local storage at the computer 1401. However, other embodiments of the present invention can be performed by storing the preloaded document elsewhere, but still in a location that can be accessed quickly.

An example is shown in FIG. 23 where the computer 1401 retrieves document 1440 from the server 1402 as part of a preloading procedure. At the direction (1412) of computer 1401, the preloaded document is retrieved (1410) and stored in the computer 1403, which is accessible by the computer 1401 over the LAN. Information on computer 1403 can be accessed by the computer 1401 quickly because these two computers are connected over a relatively fast (local) network. This is unlike the connection between the computers 1401 and 1402, which are connected over the lower speed WAN.

When the preloaded document 1440 is stored on the computer 1403, it can be more quickly retrieved from computer 1403 than from computer 1410. Thus, significant enhancements to the responsiveness of the document viewing program can be made in the present invention, even if the preloaded documents or objects are not stored directly in local storage, but instead, are stored elsewhere where they can be retrieved quickly.

Some embodiments of the present invention have been described in the context of accessing the database and identifying search documents through a search term query. The present invention can be applicable in other research-related contexts where search documents are identified using another type of entry path. For example, a time-line can be used for locating information or documents that are associated with a given time or time-frame. Another information access method uses a topic tree that permits a user to choose from successively narrowing topics until the desired topic is located. It is possible for the present invention to be applicable even in other non-research contexts where similar preloading techniques may permit efficient navigation of information and/or short response times. The present invention can also be used in combination with caching systems where previously-displayed documents or views are stored for repeated use.

The present invention has been primarily described in the context of a general purpose computer implementation. As one skilled in the art will recognize, however, it is possible to construct a specialized machine that can carry out the present invention.

The additional references listed below are hereby fully incorporated by reference to the extent that they enable, provide support for, provide a background for, or teach methodology, techniques, and/or procedures employed herein.

Reference 1: Yellin, The Java Application Programming Interface Volumes 1 & 2 (Addison Wesley 1996)
Reference 2: Campione, The Java Tutorial (Addison Wesley 1996
Reference 3: Chappell, Understanding ActiveX and OLE (Microsoft Press 1996) [0145] Reference 4: Denning, OLE Controls Inside Out (Microsoft 1995)
Reference 5: Brockschmidt, Inside OLE (2d ed. Microsoft 1995)
Reference 6: Graham, HTML Sourcebook (2d ed. John Wiley & Sons 1996)
Reference 7: Tanenbaum, Computer Networks (2d ed. Prentice Hall 1989) [0149]
Reference 8: Jamsa, Internet Programming (Jamsa Press 1995)
Reference 9: Corner, Internetworking with TCP/IP, Volumes 1, 2, & 3 (2d ed. Prentice Hall 1995)
Reference 10: Petzold, Programming Windows 95 (Microsoft 1996)
Reference 11: Prosise, Programming Windows 95 with MFC (Microsoft Press 1996)
Reference 12: Chapman, Building Internet Applications with Delphi 2 (Que 1996)
Reference 13: Schneier, Applied Cryptography (2nd edition John Wiley & Sons 1995)
Reference 14: Chan, The Java Class Libraries (Addison Wesley 1997)
Reference 15: Siegel, CORBA Fundamentals and Programming (John Wiley & Sons 1996)
Reference 16: Lemay, Official Marimba Guide to Castanet (Sams.Net 1997)
Reference 17: Adkins, Internet Security Professional Reference (New Riders 1996)
Reference 18: Microsoft Corporation, Windows NT Server Resource Kit (Microsoft Press 1996)
Reference 19: Russel, Running Windows NT Server (Microsoft Press 1997)
Reference 20: Lemay et al., Java in 21 Days (Sams.Net 1996)
Reference 21: Danesh, JavaScript in a Week (Sams.Net 1996)
Reference 22: Kovel et al., The Lotus Notes Idea Book (Addison Wesley 1996)
Reference 23: Sun Microsystems, Inc., The JavaBeans 1.0 API Specification (Sun Microsystems 1996) (available at http://java.sun.com/beans)
Reference 24: Sun Microsystems, Inc., The Java 1.1 API Specification (Sun Microsystems 1997) (available at http://java.sun.com/)
Reference 25: Bell, "Make Java fast: Optimize!," JavaWorld April 1997 (JavaWorld 1997) (available at http://www.javaworld.com/)
Reference 26: Vanhelsuwe, "How to make Java applets start faster," JavaWorld December 1996 (JavaWorld 1996) (available at http://www.javaworld.com/)

Although the present invention has been shown and described with respect to preferred embodiments, various changes and modifications, even if not shown or specifically described herein, are deemed to lie within the spirit and scope of the invention and the following claims. Any specific features or aspects of the embodiments described or illustrated herein are not intended to limit the scope and interpretation of the claims in a manner not explicitly required by the claims.

The invention claimed is:

1. A computer-implemented method for preloading a web page retrieved over a network, the method comprising:
    providing a first web page in a web browser associated with a client computer where the first web page includes a plurality of links to at least one second web page;
    receiving data identifying a target link, chosen from the plurality of links, as a preloading target;
    performing a preload operation, using a processor, by retrieving information over the network from a target web page associated with the target link, where retrieving information from the target web page is carried out without providing the target web page in a visible browser window in a manner that allows a user to interact with links within the target web page, and where the information comprises at least a portion of content of the target web page;
    receiving a selection operation performed on a selected link, the selected link chosen from the plurality of links, and the selection operation indicating an intent to view a selected web page associated with the selected link;
    determining that the selected link is the target link; and
    in response to determining that the selected link is the target link:
        determining whether the information retrieved is partially preloaded,
        if the information retrieved is partially preloaded, retrieving updated information over the network from the target web page that is different from the partially preloaded information, and
        displaying the target web page using the information retrieved over the network.

2. The method of claim 1, wherein the data identifying the target link comprises an indication of a selection operation performed by a user input device.

3. The method of claim 2, wherein the selection operation is an alternative selection operation of the user input device, and the alternative selection operation is at least one of a right-click, a middle-click, or a control-click.

4. The method of claim 1, wherein the data identifying the target link comprises profile data received from a server.

5. The method of claim 4, wherein the profile data comprises a list of documents used to select the target link.

6. The method of claim 5, wherein the list of documents indicates a document priority for preloading.

7. The method of claim 4, wherein:
    the profile data comprises historical data indicating a rate at which destination links are visited from the first web page; and
    the method further comprises determining the target link using the historical data.

8. The method of claim 1, further comprising displaying a visual indication of progress of the preload operation.

9. The method of claim 1, wherein the preload operation is performed at a lower priority than a request for a target web page that is not associated with the preload operation.

10. The method of claim 1, wherein the information retrieved from the target web page during the preload operation is different from the information retrieved from the target web page in response to a request for the target web page that is not associated with the preload operation.

11. A non-transitory computer readable storage medium comprising instructions that, when executed by a processor, cause the processor to perform a method for preloading a web page over a network, the method comprising:

providing a first web page in a web browser associated with a client computer where the first web page includes a plurality of links to at least one second web page;

receiving data identifying a target link, chosen from the plurality of links, as a preloading target;

performing a preload operation, using a processor, by retrieving information over the network from a target web page associated with the target link, where retrieving information from the target web page is carried out without providing the target web page in a visible browser window in a manner that allows a user to interact with links within the target web page, and where the information comprises at least a portion of content of the target web page;

receiving a selection operation performed on a selected link, the selected link chosen from the plurality of links, and the selection operation indicating an intent to view a selected web page associated with the selected link;

determining that the selected link is the target link; and in response to determining that the selected link is the target link:
  determining whether the information retrieved is partially preloaded,
  if the information retrieved is partially preloaded, retrieving updated information over the network from the target web page that is different from the partially preloaded information, and
  displaying the target web page using the information retrieved over the network.

12. The non-transitory computer readable medium of claim 11, wherein the data identifying the target link comprises an indication of a selection operation performed by a user input device.

13. The non-transitory computer readable medium of claim 12, wherein the selection operation is an alternative selection operation of the user input device, and the alternative selection operation is at least one of a right-click, a middle-click, or a control-click.

14. The non-transitory computer readable medium of claim 11, wherein the data identifying the target link comprises profile data received from a server.

15. The non-transitory computer readable medium of claim 14, wherein the profile data comprises a list of documents used to select the target link.

16. The non-transitory computer readable medium of claim 15, wherein the list of documents indicates a document priority for preloading.

17. The non-transitory computer readable medium of claim 14, wherein the profile data comprises historical data indicating a rate at which destination links are visited from the first web page and wherein the method further comprises determining the target link using the historical data.

18. The non-transitory computer readable medium of claim 11, further comprising displaying a visual indication of progress of the preload operation.

19. The non-transitory computer readable medium of claim 11, wherein the preload operation is performed at a lower priority than a request for a target web page that is not associated with a preload operation.

20. The non-transitory computer readable medium of claim 11, wherein the preload operation includes retrieving information from the target web page, wherein the information is different from the information retrieved from the target web page in response to a request for the target web page that is not associated with a preload operation.

21. A processing system for preloading a web page over a network, the processing system comprising:

a memory, coupled to at least one processor, storing executable instructions for a browser; and the at least one processor coupled to the memory, the at least one processor being configured to:

provide a first web page in the browser where the first web page includes a plurality of links to at least one second web page;

receive data identifying a target link, chosen from the plurality of links, as a preloading target;

perform a preload operation by retrieving information over the network from a target web page associated with the target link, where retrieving the information from the target web page is carried out without providing the target web page in a visible browser window in a manner that allows a user to interact with links within the target web page, and where the information comprises at least a portion of content of the target web page;

receive a selection operation performed on a selected link, the selected link chosen from the plurality of links and the selection operation indicating an intent to view a selected web page associated with the selected link;

determining that the selected link is the target link; and in response to determining that the selected link is the target link:
  determining whether the information retrieved is partially preloaded,
  if the information retrieved is partially preloaded, retrieving updated information over the network from the target web page that is different from the partially preloaded information, and
  displaying the target web page using the information retrieved over the network.

22. The processing system of claim 21, wherein the processing system further comprises a user input device, and wherein the data identifying the target link comprises an indication of a selection operation performed by the user input device.

23. The processing system of claim 22, wherein the selection operation is an alternative selection operation of the user input device, and the alternative selection operation is at least one of a right-click, a middle-click, or a control-click.

24. The processing system of claim 21, wherein the data identifying the target link comprises profile data received from a server.

25. The processing system of claim 24, wherein the profile data comprises a list of documents used to select the target link.

26. The processing system of claim 25, wherein the list of documents indicates a document priority for preloading.

27. The processing system of claim 24, wherein:
the profile data comprises historical data indicating a rate at which destination links are visited from the first web page; and
the method further comprises determining the target link using the historical data.

28. The processing system of claim 21, wherein the processor is further configured to display a visual indication of progress of the preload operation.

29. The processing system of claim 21, wherein the preload operation is performed at a lower priority than a request for a target web page that is not associated with a preload operation.

30. The processing system of claim 21, wherein the information retrieved from the target web page during the preload operation is different from the information retrieved from the target web page in response to a request for the target web page that is not associated with the preload operation.

* * * * *